(12) United States Patent
Lin et al.

(10) Patent No.: US 12,493,166 B2
(45) Date of Patent: Dec. 9, 2025

(54) IMAGING OPTICAL LENS SYSTEM, IMAGE CAPTURING UNIT AND ELECTRONIC DEVICE

(71) Applicant: LARGAN PRECISION CO., LTD., Taichung (TW)

(72) Inventors: Yu Jui Lin, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 639 days.

(21) Appl. No.: 17/895,864

(22) Filed: Aug. 25, 2022

(65) Prior Publication Data

US 2023/0393372 A1 Dec. 7, 2023

(30) Foreign Application Priority Data

Jun. 1, 2022 (TW) ................................. 111120428

(51) Int. Cl.
*G02B 9/64* (2006.01)
(52) U.S. Cl.
CPC ...................... *G02B 9/64* (2013.01)
(58) Field of Classification Search
CPC ....................................................... G02B 9/64
See application file for complete search history.

(56) References Cited

U.S. PATENT DOCUMENTS

2021/0302694 A1 9/2021 Jhang
2021/0302699 A1 9/2021 Jhang

FOREIGN PATENT DOCUMENTS

| CN | 111830676 A | 10/2020 | |
|---|---|---|---|
| CN | 112711122 | * 4/2021 | ......... G02B 13/0045 |
| JP | 2021-189188 A | 12/2021 | |
| WO | 2019/078222 A1 | 4/2019 | |
| WO | 2022011498 A | 1/2022 | |
| WO | 2023/207204 A1 | 11/2023 | |

OTHER PUBLICATIONS

Extended European Search Report dated Sep. 13, 2023 as received in Application No. 22192561.3.

\* cited by examiner

*Primary Examiner* — Joseph P Martinez
(74) *Attorney, Agent, or Firm* — Maschoff Brennan

(57) ABSTRACT

An imaging optical lens system includes a first lens element, a second lens element, a third lens element, a fourth lens element, a fifth lens element, a sixth lens element, a seventh lens element and an eighth lens element, in order from an object side to an image side along an optical path. The first lens element has an object-side surface being concave in a paraxial region thereof. The fourth lens element has negative refractive power. The fifth lens element has positive refractive power. At least one lens surface of at least one lens element of the imaging optical lens system has at least one critical point in an off-axis region thereof.

10 Claims, 26 Drawing Sheets

IMAGING OPTICAL LENS SYSTEM, IMAGE CAPTURING UNIT AND ELECTRONIC DEVICE

RELATED APPLICATIONS

This application claims priority to Taiwan Application 111120428, filed on Jun. 1, 2022, which is incorporated by reference herein in its entirety.

BACKGROUND

Technical Field

The present disclosure relates to an imaging optical lens system, an image capturing unit and an electronic device, more particularly to an imaging optical lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the first lens element is concave in a paraxial region thereof. The fourth lens element has negative refractive power. The fifth lens element has positive refractive power. The object-side surface of the fifth lens element is concave in a paraxial region thereof. The image-side surface of the fifth lens element is convex in a paraxial region thereof. The image-side surface of the eighth lens element is concave in a paraxial region thereof. At least one of the object-side surface and the image-side surface of at least one lens element of the imaging optical lens system has at least one critical point in an off-axis region thereof.

When a focal length of the first lens element is f1, and a focal length of the second lens element is f2, the following condition is satisfied:

$$|f1/f2|<0.80.$$

According to another aspect of the present disclosure, an imaging optical lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the first lens element is concave in a paraxial region thereof. The object-side surface of the second lens element is convex in a paraxial region thereof. The third lens element has positive refractive power. The fourth lens element has negative refractive power. The fifth lens element has positive refractive power. The eighth lens element has negative refractive power. The object-side surface of the eighth lens element is convex in a paraxial region thereof. The image-side surface of the eighth lens element is concave in a paraxial region thereof. At least one of the object-side surface and the image-side surface of at least one lens element of the imaging optical lens system has at least one critical point in an off-axis region thereof.

When a focal length of the imaging optical lens system is f, and a composite focal length of the first lens element and the second lens element is f12, the following condition is satisfied:

$$-17.0<f12/f<-1.45.$$

According to another aspect of the present disclosure, an imaging optical lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the first lens element is concave in a paraxial region thereof. The image-side surface of the second lens element is concave in a paraxial region thereof. The object-side surface of the third lens element is convex in a paraxial region thereof. The fourth lens element has negative refractive power. The fifth lens element has positive refractive power. The object-side surface of the fifth lens element is concave in a paraxial region thereof. The image-side surface of the fifth lens element is convex in a paraxial region thereof. The eighth lens element has negative refractive power. At least one of the object-side surface and the image-side surface of at least one lens element of the imaging optical lens system has at least one critical point in an off-axis region thereof.

When a curvature radius of the image-side surface of the second lens element is R4, and a curvature radius of the object-side surface of the third lens element is R5, the following condition is satisfied:

$$0<R5/R4<6.6.$$

According to another aspect of the present disclosure, an image capturing unit includes one of the aforementioned imaging optical lens systems and an image sensor, wherein the image sensor is disposed on an image surface of the imaging optical lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
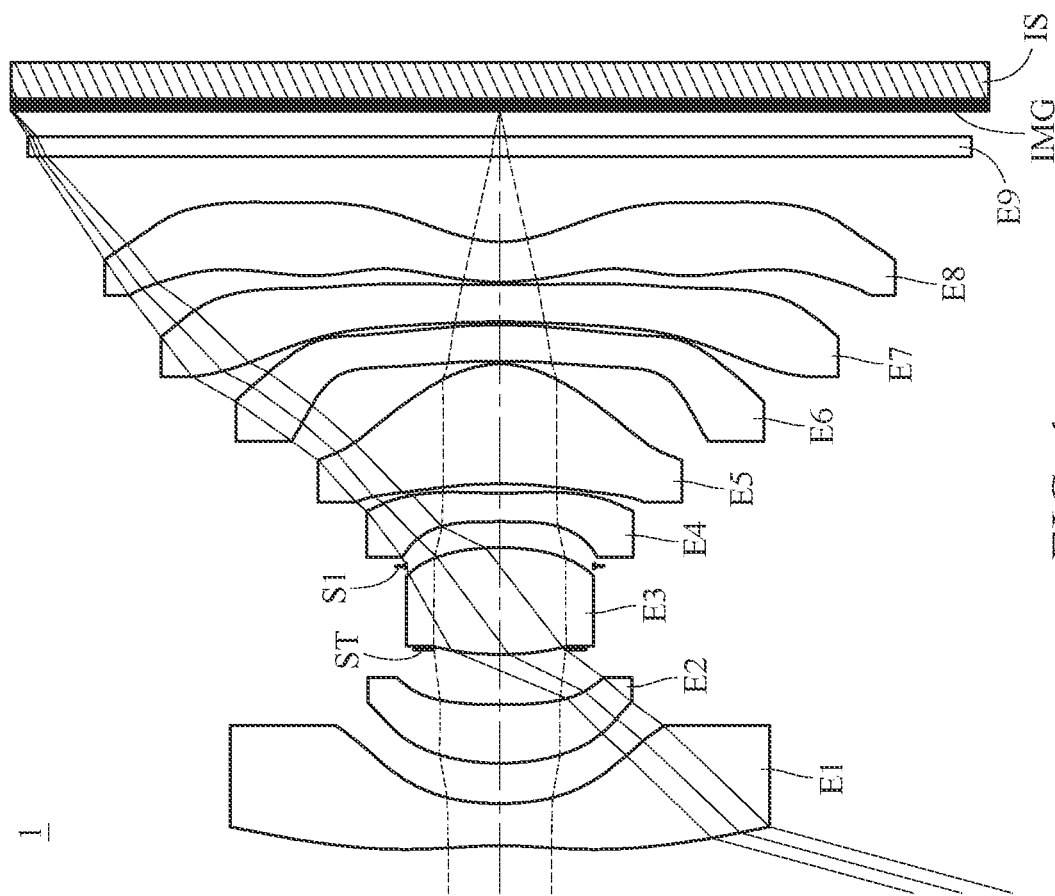
FIG. 1 is a schematic view of an image capturing unit according to the 1st embodiment of the present disclosure.

An imaging optical lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element can have negative refractive power. Therefore, it is favorable for the refractive power distribution of the imaging optical lens system so as to enlarge the field of view. The object-side surface of the first lens element is concave in a paraxial region thereof. Therefore, it is favorable for controlling the travelling direction of light entering the imaging optical lens system so as to reduce the outer diameter of the imaging optical lens system at the object side while enlarge the field of view.

The object-side surface of the second lens element can be convex in a paraxial region thereof. Therefore, it is favorable for controlling the incident angle on the second lens element so as to prevent reflection on the lens surface. The image-side surface of the second lens element can be concave in a paraxial region thereof. Therefore, it is favorable for adjusting the surface shape of the second lens element so as to correct aberrations such as astigmatism.

The third lens element can have positive refractive power. Therefore, it is favorable for obtaining a compact configuration of the imaging optical lens system at the object side. The object-side surface of the third lens element can be convex in a paraxial region thereof. Therefore, it is favorable for controlling the travelling direction of light so as to enlarge the field of view. The image-side surface of the third lens element can be convex in a paraxial region thereof. Therefore, it is favorable for controlling the angle of emergence on the third lens element so as to reduce flare.

The fourth lens element has negative refractive power. Therefore, it is favorable for balancing the refractive power distribution of the imaging optical lens system so as to correct aberrations such as spherical aberration.

The fifth lens element has positive refractive power. Therefore, it is favorable for obtaining a compact configuration of the of the imaging optical lens system at the image side. The object-side surface of the fifth lens element can be concave in a paraxial region thereof. Therefore, it is favorable for controlling the travelling direction of light so as to balance size distribution of the imaging optical lens system at the object side and the image side. The image-side surface of the fifth lens element can be convex in a paraxial region thereof. Therefore, it is favorable for adjusting the light travelling direction, thereby increasing the image surface.

The eighth lens element can have negative refractive power. Therefore, it is favorable for balancing the refractive power distribution of the imaging optical lens system at the image side so as to correct aberrations. The object-side surface of the eighth lens element can be convex in a paraxial region thereof. Therefore, it is favorable for adjusting the surface shape and the refractive power of the eighth lens element so as to correct aberrations. The image-side surface of the eighth lens element can be concave in a paraxial region thereof. Therefore, it is favorable for a proper back focal length.

Figure 23:
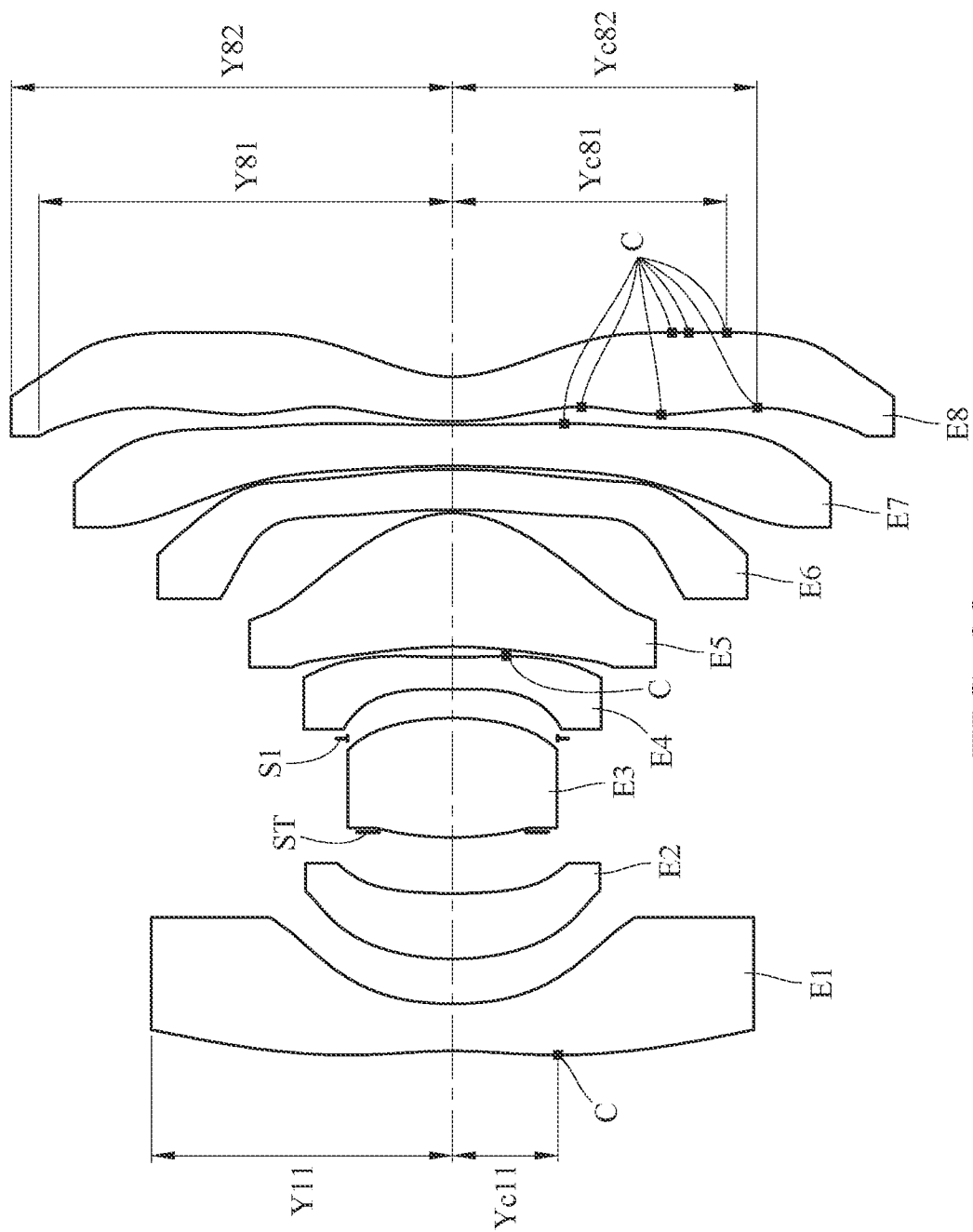
FIG. 23 shows a schematic view of Y11, Y81, Y82, Yc11, Yc81, Yc82, and critical points of some lens elements according to the 1st embodiment of the present disclosure.

At least one of the object-side surface and the image-side surface of at least one lens element of the imaging optical lens system has at least one critical point in an off-axis region thereof. Therefore, it is favorable for enhancing variation of the lens surface so as to reduce size, enlarge the field of view and correct aberrations. Moreover, at least one of the object-side surface and the image-side surface of each of at least two lens elements of the imaging optical lens system can have at least one critical point in an off-axis region thereof. The object-side surface of the first lens element can have at least one critical point in an off-axis region thereof. Therefore, it is favorable for controlling the incident angle of the imaging optical lens system so as to improve image quality in a wide field of view, and reduce the outer diameter of the first lens element. When a vertical distance between a critical point on the object-side surface of the first lens element and an optical axis is Yc11, and a maximum effective radius of the object-side surface of the first lens element is Y11, the object-side surface of the first lens element can have at least one critical point in the off-axis region thereof satisfying the following condition: 0.28<Yc11/Y11<0.80. Therefore, it is favorable for further improving image quality and reducing the outer diameter of the first lens element. The object-side surface of the eighth lens element can have at least one critical point in an off-axis region thereof. Therefore, it is favorable for adjusting the surface shape of the eighth lens element so as to correct off-axis aberrations such as field curvature. When a vertical distance between a critical point on the object-side surface of the eighth lens element and the optical axis is Yc81, and a maximum effective radius of the object-side surface of the eighth lens element is Y81, the object-side surface of the eighth lens element can have at least one critical point in the off-axis region thereof satisfying the following condition: 0.10<Yc81/Y81<0.55. Therefore, it is favorable for further correcting aberrations. The image-side surface of the eighth lens element can have at least one critical point in an off-axis region thereof. Therefore, it is favorable for controlling incident angle on the image surface so as to increase relative illuminance and image quality on the periphery. When a vertical distance between a critical point on the image-side surface of the eighth lens element and the optical axis is Yc82, and a maximum effective radius of the image-side surface of the eighth lens element is Y82, the image-side surface of the eighth lens element can have at least one critical point in the off-axis region thereof satisfying the following condition: 0.25<Yc82/Y82<0.80. Therefore, it is favorable for further improving image quality. Please refer to FIG. 23, which shows Y11, Y81, Y82, Yc11, Yc81, Yc82, and critical points C of some lens elements according to the 1st embodiment of the present disclosure. The abovementioned critical points C on the object-side surface of the first lens element, the image-side of the fourth lens element, the image-side of the seventh lens element, the object-side surface of the eighth lens element and the image-side of the eighth lens element in FIG. 23 are only exemplary. Each of lens surfaces in various embodiments of the present disclosure may also have one or more critical points in an off-axis region thereof. Two of the critical points C on the eighth lens element in FIG. 23 are depicted for exemplary representation of Yc81, Yc82, and vertical distances (Yc81, Yc82) between the rest critical points C on the eighth lens element and the optical axis can be deduced from this way.

When a focal length of the first lens element is f1, and a focal length of the second lens element is f2, the following condition can be satisfied: |f1/f2|<0.80. Therefore, it is favorable for adjusting the refractive power distribution of the imaging optical lens system at the object side so as to enlarge the field of view and reduce the outer diameter at the object side. Moreover, the following condition can also be satisfied: |f1/f2|<0.70. Moreover, the following condition can also be satisfied: |f1/f2|<0.60.

When a focal length of the imaging optical lens system is f, and a composite focal length of the first lens element and the second lens element is f12, the following condition can be satisfied: −17.0<f12/f<−1.45. Therefore, it is favorable for adjusting the refractive power distribution of the imaging optical lens system at the object side so as to enlarge the field of view and reduce the outer diameter at the object side. Moreover, the following condition can also be satisfied: −14.0<f12/f<−1.60. Moreover, the following condition can also be satisfied: −11.0<f12/f<−1.75. Moreover, the following condition can also be satisfied: −8.00<f12/f<−1.90.

When a curvature radius of the image-side surface of the second lens element is R4, and a curvature radius of the object-side surface of the third lens element is R5, the following condition can be satisfied: 0<R5/R4<6.6. Therefore, it is favorable for the lens elements at object side to cooperate with one another so as to enlarge the field of view and reduce the outer diameter at the object side. Moreover, the following condition can also be satisfied: 0.10<R5/R4<5.4. Moreover, the following condition can also be satisfied: 0.15<R5/R4<4.2. Moreover, the following condition can also be satisfied: 0.20<R5/R4<3.0. Moreover, the following condition can also be satisfied: 0.30<R5/R4<1.8. Moreover, the following condition can also be satisfied: 0.40<R5/R4<1.4.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, and an Abbe number of the eighth lens element is V8, the following condition can be satisfied: 1.8<(V1+V3+V5+V7)/(V2+V4+V6+V8)<6.0. Therefore, it is favorable for selecting proper material for the lens elements so as to correct aberrations such as chromatic aberration. Moreover, the following condition can also be satisfied: 2.0<(V1+V3+V5+V7)/(V2+V4+V6+V8)<5.0. Moreover, the following condition can also be satisfied: 2.2<(V1+V3+V5+V7)/(V2+V4+V6+V8)<4.0.

When a sum of axial distances between each of all adjacent lens elements of the imaging optical lens system is ΣAT, and an axial distance between the second lens element and the third lens element is T23, the following condition can be satisfied: 2.0<ΣAT/T23<4.0. Therefore, it is favorable for the arrangement of the lens elements so as to reduce the total track length.

When the focal length of the imaging optical lens system is f, a curvature radius of the object-side surface of the fifth lens element is R9, and a curvature radius of the image-side surface of the fifth lens element is R10, the following condition can be satisfied: −15<(R9/f)+(R10/f)<−1.2. Therefore, it is favorable for adjusting the surface shape and the refractive power of the fifth lens element so as to obtain a compact configuration of the imaging optical lens system at the image side. Moreover, the following condition can also be satisfied: −10<(R9/f)+(R10/f)<−1.3. Moreover, the following condition can also be satisfied: −5.0<(R9/f)+(R10/f)<−1.4.

When a focal length of the sixth lens element is f6, a focal length of the seventh lens element is f7, and a focal length of the eighth lens element is f8, the following condition can be satisfied: |f8/f6|+|f8/f7|<1.5. Therefore, it is favorable for balancing the refractive power distribution of the imaging optical lens system at the image side so as to correction aberrations. Moreover, the following condition can also be satisfied: |f8/f6|+|f8/f7|<1.1. Moreover, the following condition can also be satisfied: |f8/f6|+|f8/f7|<0.70.

When half of a maximum field of view of the imaging optical lens system is HFOV, the following condition can be satisfied: 60.0 [deg.]<HFOV. Therefore, it is favorable for meeting the requirement of wide angle imaging. Moreover, the following condition can also be satisfied: 65.0 [deg.] <HFOV<90.0 [deg.]. Therefore, it is favorable for preventing aberrations such as distortion generated due to overly large viewing angle.

When the maximum effective radius of the object-side surface of the first lens element is Y11, and the maximum effective radius of the image-side surface of the eighth lens element is Y82, the following condition can be satisfied: 0.50<Y11/Y82<0.95. Therefore, it is favorable for controlling the traveling direction of light so as to obtain a balance among the field of view, the configuration of the imaging optical lens system and the size of the image surface. Moreover, the following condition can also be satisfied: 0.60<Y11/Y82<0.85. Please refer to FIG. 23, which shows Y11 and Y82 according to the 1st embodiment of the present disclosure.

When the axial distance between the second lens element and the third lens element is T23, and an axial distance between the third lens element and the fourth lens element is T34, the following condition can be satisfied: 0.85<T23/T34<15. Therefore, it is favorable for the lens elements at the object side to cooperate with one another so as to enlarge the field of view and obtain a compact configuration of the imaging optical lens system at the object side. Moreover, the following condition can also be satisfied: 1.0<T23/T34<10. Moreover, the following condition can also be satisfied: 1.2<T23/T34<5.0.

When an axial distance between the object-side surface of the first lens element and an image surface is TL, and a maximum image height of the imaging optical lens system (which can be half of a diagonal length of an effective photosensitive area of an image sensor) is ImgH, the following condition can be satisfied: 1.0<TL/ImgH<2.0. Therefore, it is favorable for obtaining a proper balance in reduction of the total track length and large image surface. Moreover, the following condition can also be satisfied: 1.2<TL/ImgH<1.7.

When an f-number of the imaging optical lens system is Fno, the following condition can be satisfied: 1.0<Fno<3.0. Therefore, it is favorable for a balance between illuminance and depth of field. Moreover, the following condition can also be satisfied: 1.5<Fno<2.6.

When a curvature radius of the object-side surface of the first lens element is R1, and the focal length of the imaging optical lens system is f, the following condition can be satisfied: −3.3<R1/f<−0.10. Therefore, it is favorable for adjusting the surface shape and the refractive power of the first lens element so as to enlarge the field of view and reduce the size of the lens element. Moreover, the following condition can also be satisfied: −2.6<R1/f<−0.60.

When a focal length of the fourth lens element is f4, and a focal length of the fifth lens element is f5, the following condition can be satisfied: −18<f4/f5<−0.60. Therefore, it is favorable for the refractive power of the fourth lens element to cooperate with that of the fifth lens element so as to correct aberrations such as spherical aberration. Moreover, the following condition can also be satisfied: −13<f4/f5<−1.0. Moreover, the following condition can also be satisfied: −8.0<f4/f5<−1.4. Moreover, the following condition can also be satisfied: −4.0<f4/f5<−1.7.

When the focal length of the imaging optical lens system is f, a curvature radius of the object-side surface of the eighth lens element is R15, and a curvature radius of the image-side surface of the eighth lens element is R16, the following condition can be satisfied: 0.40<(R15/f)+(R16/f)<2.0. Therefore, it is favorable for adjusting the surface shape and the refractive power of the eighth lens element so as to correct aberrations. Moreover, the following condition can also be satisfied: 0.70<(R115/f)+(R16/f)<1.6.

When a maximum value among maximum effective radii of all lens surfaces of the imaging optical lens system is Y max, and a minimum value among maximum effective radii of all lens surfaces of the imaging optical lens system is Y min, the following condition can be satisfied: 4.4<Y max/Y min<6.5. Therefore, it is favorable for controlling the traveling direction of light so as to balance the configuration of the imaging optical lens system.

When a central thickness of the second lens element is CT2, and an axial distance between the first lens element and the second lens element is T12, the following condition can be satisfied: 0<CT2/T12<3.1. Therefore, it is favorable for the first lens element to cooperate with the second lens element so as to reduce the size of the imaging optical lens system at the object side. Moreover, the following condition can also be satisfied: 0.40<CT2/T12<2.7.

When the maximum image height of the imaging optical lens system is ImgH, and the focal length of the imaging optical lens system is f, the following condition can be satisfied: 1.2<ImgH/f<4.0. Therefore, it is favorable for a balance in wide field of view and large image surface. Moreover, the following condition can also be satisfied: 1.4<ImgH/f<3.0.

When the axial distance between the object-side surface of the first lens element and the image surface is TL, and an entrance pupil diameter of the imaging optical lens system is EPD, the following condition can be satisfied: 3.5<TL/EPD<8.0. Therefore, it is favorable for obtaining a proper balance in reduction of the total track length and large aperture stop.

When the curvature radius of the object-side surface of the third lens element is R5, and the focal length of the imaging optical lens system is f, the following condition can be satisfied: 0<R5/f<5.8. Therefore, it is favorable for adjusting the surface shape and the refractive power of the third lens element so as to obtain a compact configuration. Moreover, the following condition can also be satisfied: 0.25<R5/f<4.7. Moreover, the following condition can also be satisfied: 0.50<R5/f<3.7. Moreover, the following condition can also be satisfied: 0.75<R5/f<2.7.

When the focal length of the imaging optical lens system is f, and a curvature radius of the object-side surface of the second lens element is R3, the following condition can be satisfied: 0.65<f/R3<1.4. Therefore, it is favorable for adjusting the surface shape and the refractive power of the second lens element so as to correct aberrations. Moreover, the following condition can also be satisfied: 0.70<f/R3<1.2.

When the focal length of the imaging optical lens system is f, and the focal length of the first lens element is f1, the following condition can be satisfied: −1.0<f/f1<−0.20. Therefore, it is favorable for adjusting the refractive power of the first lens element so as to enlarge the field of view.

When a focal length of the third lens element is f3, and a curvature radius of the image-side surface of the third lens element is R6, the following condition can be satisfied: −1.6<f3/R6<−0.70. Therefore, it is favorable for adjusting the surface shape and the refractive power of the third lens element so as to reduce the size of the imaging optical lens system. Moreover, the following condition can also be satisfied: −1.5<f3/R6<−0.92.

According to the present disclosure, the aforementioned features and conditions can be utilized in numerous combinations so as to achieve corresponding effects.

According to the present disclosure, the lens elements of the imaging optical lens system can be made of either glass or plastic material. When the lens elements are made of glass material, the refractive power distribution of the imaging optical lens system may be more flexible, the focal length of the imaging optical lens system may be more consistent at different temperatures, and the influence on imaging caused by external environment temperature change may be reduced. The glass lens element can either be made by grinding or molding. When the lens elements are made of plastic material, the manufacturing costs can be effectively reduced, and the length of the imaging optical lens system can be reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging optical lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, the image surface of the imaging optical lens system, based on the corresponding image sensor, can be flat or curved, especially a curved surface being concave facing towards the object side of the imaging optical lens system.

According to the present disclosure, an image correction unit, such as a field flattener, can be optionally disposed between the lens element closest to the image side of the imaging optical lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 24:
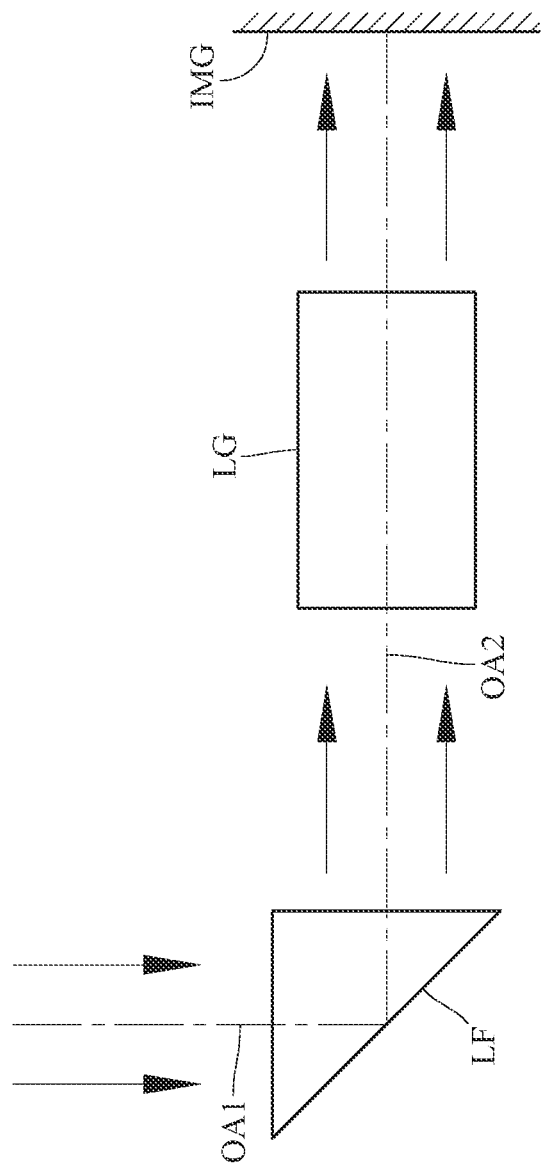
FIG. 24 shows a schematic view of a configuration of a light-folding element in an imaging optical lens system according to one embodiment of the present disclosure.
Figure 25:
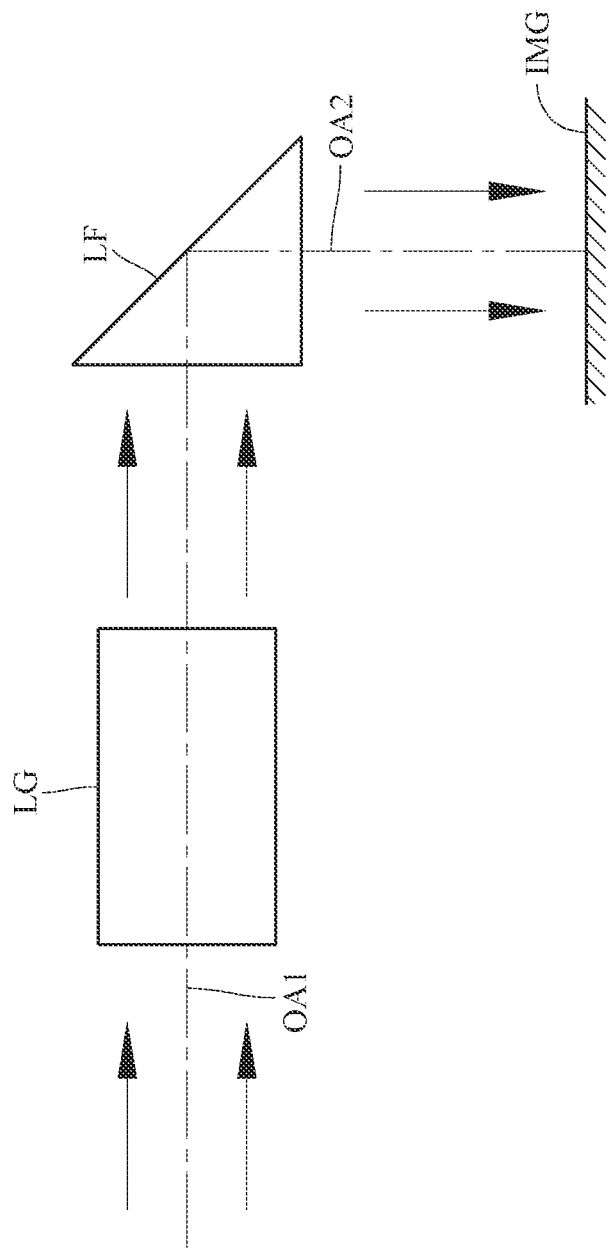
FIG. 25 shows a schematic view of another configuration of a light-folding element in an imaging optical lens system according to one embodiment of the present disclosure.
Figure 26:
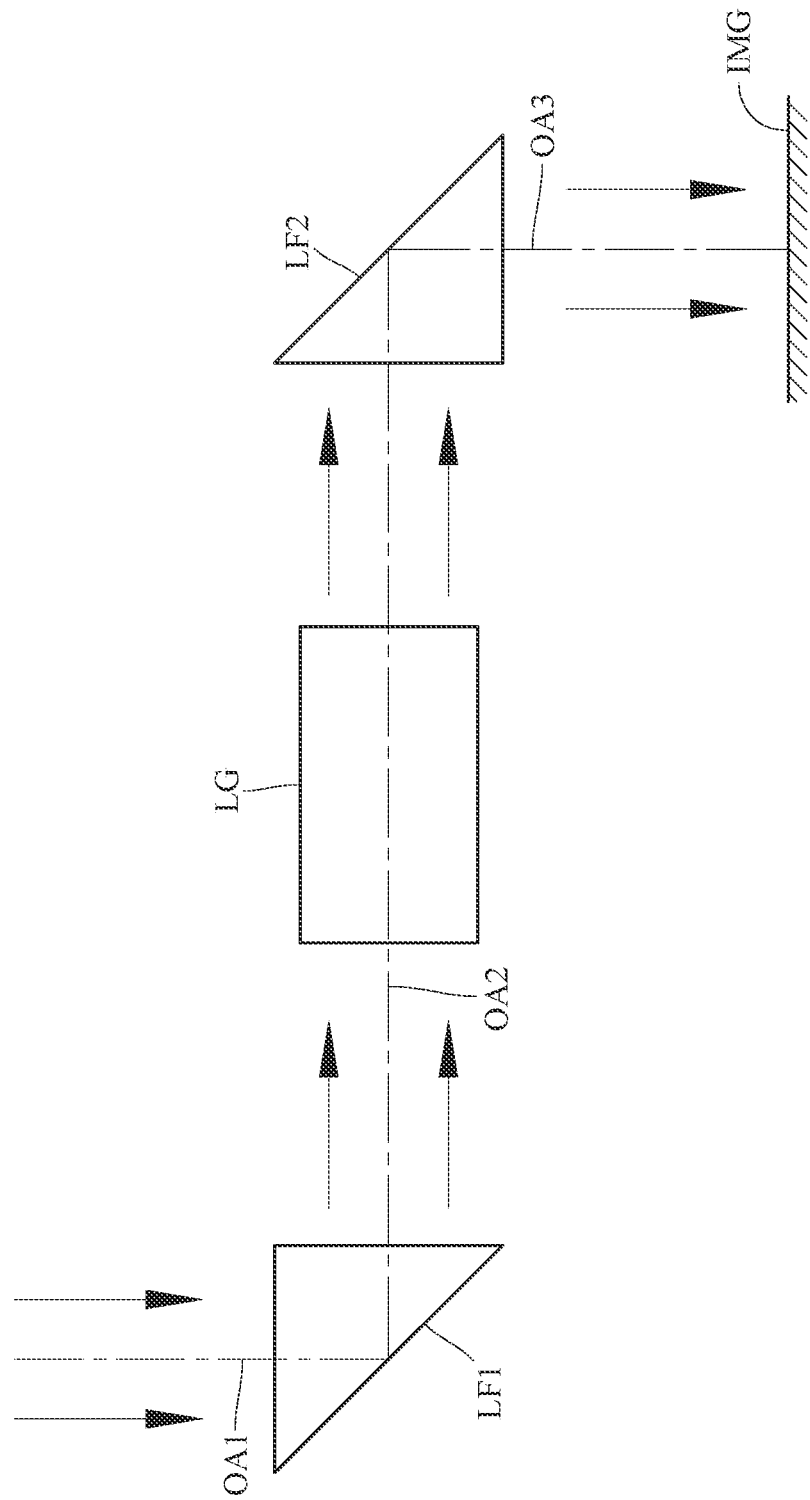
FIG. 26 shows a schematic view of a configuration of two light-folding elements in an imaging optical lens system according to one embodiment of the present disclosure.

According to the present disclosure, at least one light-folding element, such as a prism or a mirror, can be optionally disposed between an imaged object and the image surface on the imaging optical path, such that the imaging optical lens system can be more flexible in space arrangement, and therefore the dimensions of an electronic device is not restricted by the total track length of the imaging optical lens system. Specifically, please refer to FIG. 24 and FIG. 25. FIG. 24 shows a schematic view of a configuration of a light-folding element in an imaging optical lens system according to one embodiment of the present disclosure, and FIG. 25 shows a schematic view of another configuration of a light-folding element in an imaging optical lens system according to one embodiment of the present disclosure. In FIG. 24 and FIG. 25, the imaging optical lens system can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the imaging optical lens system as shown in FIG. 24 or disposed between a lens group LG of the imaging optical lens system and the image surface IMG as shown in FIG. 25. Furthermore, please refer to FIG. 26, which shows a schematic view of a configuration of two light-folding elements in an imaging optical lens system according to one embodiment of the present disclosure. In FIG. 26, the imaging optical lens system can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging optical lens system, the second light-folding element LF2 is disposed between the lens group LG of the imaging optical lens system and the image surface IMG, and the travelling direction of light on the first optical axis OA1 can be the same direction as the travelling direction of light on the third optical axis OA3 as shown in FIG. 26. The imaging optical lens system can be optionally provided with three or more light-folding elements, and the present disclosure is not limited to the type, amount and position of the light-folding elements of the embodiments disclosed in the aforementioned figures.

According to the present disclosure, the imaging optical lens system can 15 include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens system and thereby provides a wider field of view for the same.

According to the present disclosure, the imaging optical lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the optical imaging lens system can include one or more optical elements for limiting the form of light passing through the optical imaging lens system. Each optical element can be, but not limited to, a filter, a polarizer, etc., and each optical element can be, but not limited to, a single-piece element, a composite component, a thin film, etc. The optical element can be located at the front side or the rear side of the optical imaging lens system or between any two adjacent lens elements so as to allow light in a specific form to pass through, thereby meeting application requirements.

According to the above description of the present disclosure, the following specific embodiments are provided for further explanation.

1st Embodiment

Figure 2:
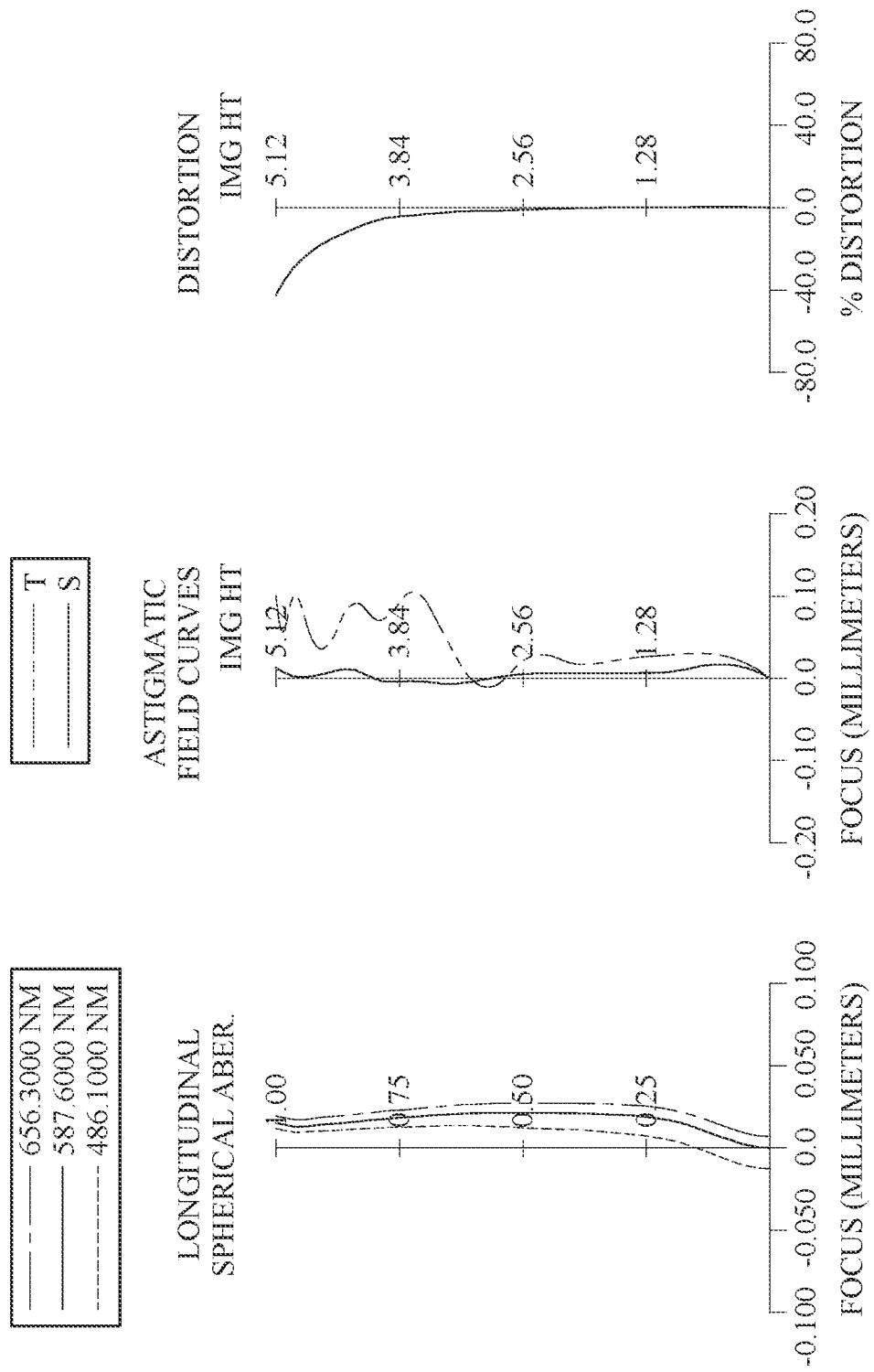
FIG. 2 shows spherical aberration curves, astigmatic field curves and a distortion curve of the image capturing unit according to the 1 st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a stop S1, a fourth lens element E4, a fifth lens element E5, a sixth lens element E6, a seventh lens element E7, an eighth lens element E8, a filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one critical point in an off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has three critical points in an off-axis region thereof. The image-side surface of the eighth lens element E8 has three critical points in an off-axis region thereof.

The filter E9 is made of glass material and located between the eighth lens element E8 and the image surface IMG, and will not affect the focal length of the imaging optical lens system. The image sensor IS is disposed on or near the image surface IMG of the imaging optical lens system.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,
X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, 28 and 30.

In the imaging optical lens system of the image capturing unit according to the 1 st embodiment, when a focal length of the imaging optical lens system is f, an f-number of the imaging optical lens system is Fno, and half of a maximum field of view of the imaging optical lens system is HFOV, these parameters have the following values: f=2.44 millimeters (mm), Fno=2.25, HFOV=74.7 degrees (deg.).

When an Abbe number of the first lens element E1 is V1, an Abbe number of the second lens element E2 is V2, an Abbe number of the third lens element E3 is V3, an Abbe number of the fourth lens element E4 is V4, an Abbe number of the fifth lens element E5 is V5, an Abbe number of the sixth lens element E6 is V6, an Abbe number of the seventh lens element E7 is V7, and an Abbe number of the eighth lens element E8 is V8, the following condition is satisfied: (V1+V3+V5+V7)/(V2+V4+V6+V8)=2.50.

When a sum of axial distances between each of all adjacent lens elements of the imaging optical lens system is ΣAT, and an axial distance between the second lens element E2 and the third lens element E3 is T23, the following condition is satisfied: ΣAT/T23=2.69. In this embodiment, ΣAT is a sum of axial distances between any two adjacent lens elements among the first lens element E1, the second lens element E2, the third lens element E3, the fourth lens element E4, the fifth lens element E5, the sixth lens element E6, the seventh lens element E7 and the eighth lens element E8. In this embodiment, an axial distance between two adjacent lens elements is a distance in a paraxial region between two adjacent lens surfaces of the two adjacent lens elements.

When a central thickness of the second lens element E2 is CT2, and an axial distance between the first lens element E1 and the second lens element E2 is T12, the following condition is satisfied: CT2/T12=1.46.

When the axial distance between the second lens element E2 and the third lens element E3 is T23, and an axial distance between the third lens element E3 and the fourth lens element E4 is T34, the following condition is satisfied: T23/T34=1.92.

When an axial distance between the object-side surface of the first lens element E1 and the image surface IMG is TL, and an entrance pupil diameter of the imaging optical lens system is EPD, the following condition is satisfied: TL/EPD=7.13.

When the axial distance between the object-side surface of the first lens element E1 and the image surface IMG is TL, and a maximum image height of the imaging optical lens system is ImgH, the following condition is satisfied: TL/ImgH=1.51.

When a curvature radius of the object-side surface of the first lens element E1 is R1, and the focal length of the imaging optical lens system is f, the following condition is satisfied: R1/f=−1.77.

When a curvature radius of the object-side surface of the third lens element E3 is R5, and the focal length of the imaging optical lens system is f, the following condition is satisfied: R5/f=1.25.

When a curvature radius of the image-side surface of the second lens element E2 is R4, and the curvature radius of the object-side surface of the third lens element E3 is R5, the following condition is satisfied: R5/R4=0.55.

When the focal length of the imaging optical lens system is f, a curvature radius of the object-side surface of the fifth lens element E5 is R9, and a curvature radius of the image-side surface of the fifth lens element E5 is R10, the following condition is satisfied: (R9/f)+(R10/f)=−2.29.

When the focal length of the imaging optical lens system is f, a curvature radius of the object-side surface of the eighth lens element E8 is R15, and a curvature radius of the image-side surface of the eighth lens element E8 is R16, the following condition is satisfied: (R15/f)+(R16/f)=1.56.

When a focal length of the first lens element E1 is f1, and a focal length of the second lens element E2 is f2, the following condition is satisfied: |f1/f2|=0.49.

When a focal length of the sixth lens element E6 is f6, a focal length of the seventh lens element E7 is f7, and a focal length of the eighth lens element E8 is f8, the following condition is satisfied: |f8/f6|+|f8/f7|=0.25.

When the focal length of the imaging optical lens system is f, and the focal length of the first lens element E1 is f1, the following condition is satisfied: f/f1=−0.74.

When the focal length of the imaging optical lens system is f, and a curvature radius of the object-side surface of the second lens element E2 is R3, the following condition is satisfied: f/R3=1.01.

When the focal length of the imaging optical lens system is f, and a composite focal length of the first lens element E1 and the second lens element E2 is f12, the following condition is satisfied: f12/f=−2.84.

When a focal length of the third lens element E3 is f3, and a curvature radius of the image-side surface of the third lens element E3 is R6, the following condition is satisfied: f3/R6=−1.05.

When a focal length of the fourth lens element E4 is f4, and a focal length of the fifth lens element E5 is f5, the following condition is satisfied: f4/f5=−3.04.

When the maximum image height of the imaging optical lens system is ImgH, and the focal length of the imaging optical lens system is f, the following condition is satisfied: ImgH/f=2.10.

When a maximum effective radius of the object-side surface of the first lens element E1 is Y11, and a maximum effective radius of the image-side surface of the eighth lens element E8 is Y82, the following condition is satisfied: Y11/Y82=0.68.

When a maximum value among maximum effective radii of all lens surfaces of the imaging optical lens system is Y max, and a minimum value among maximum effective radii of all lens surfaces of the imaging optical lens system is Y min, the following condition is satisfied: Y max/Y min=5.73. In this embodiment, the maximum effective radius of the image-side surface of the eighth lens element E8 is larger than maximum effective radii of other lens surfaces of the imaging optical lens system, such that Y max is equal to the maximum effective radius of the image-side surface of the eighth lens element E8. In this embodiment, a maximum effective radius of the object-side surface of the third lens element E3 is smaller than maximum effective radii of other lens surfaces of the imaging optical lens system, such that Y min is equal to the maximum effective radius of the object-side surface of the third lens element E3.

When a vertical distance between a critical point on the object-side surface of the first lens element E1 and the optical axis is Yc11, and the maximum effective radius of the object-side surface of the first lens element E1 is Y11, the non-axial critical point on the object-side surface of the first lens element E1 satisfies the following condition: Yc11/Y11=0.35.

When a vertical distance between a critical point on the object-side surface of the eighth lens element E8 and the optical axis is Yc81, and a maximum effective radius of the object-side surface of the eighth lens element E8 is Y81, the three non-axial critical points on the object-side surface of the eighth lens element E8 respectively satisfy the following conditions: Yc81/Y81=0.31; Yc81/Y81=0.50 and Yc81/Y81=0.74.

When a vertical distance between a critical point on the image-side surface of the eighth lens element E8 and the optical axis is Yc82, and the maximum effective radius of the image-side surface of the eighth lens element E8 is Y82, the three non-axial critical points on the image-side surface of the eighth lens element E8 respectively satisfy the following conditions: Yc82/Y82=0.50; Yc82/Y82=0.54; and Yc82/Y82=0.62.

The detailed optical data of the 1 st embodiment are shown in Table 1A and the aspheric surface data are shown in Table 1 B below.

TABLE 1A

1st Embodiment
f = 2.44 mm, Fno = 2.25, HFOV = 74.7 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −4.3013 | (ASP) | 0.444 | Plastic | 1.545 | 56.1 | −3.28 |
| 2 |  | 3.1679 | (ASP) | 0.422 |  |  |  |  |
| 3 | Lens 2 | 2.4087 | (ASP) | 0.616 | Plastic | 1.587 | 28.3 | 6.74 |
| 4 |  | 5.5720 | (ASP) | 0.578 |  |  |  |  |
| 5 | Ape. Stop | Plano |  | −0.050 |  |  |  |  |
| 6 | Lens 3 | 3.0449 | (ASP) | 1.123 | Plastic | 1.544 | 56.0 | 2.81 |
| 7 |  | −2.6670 | (ASP) | −0.191 |  |  |  |  |
| 8 | Stop | Plano |  | 0.466 |  |  |  |  |
| 9 | Lens 4 | −13.8853 | (ASP) | 0.298 | Plastic | 1.660 | 20.4 | −6.70 |
| 10 |  | 6.5432 | (ASP) | 0.099 |  |  |  |  |
| 11 | Lens 5 | −4.5357 | (ASP) | 1.259 | Plastic | 1.544 | 56.0 | 2.21 |
| 12 |  | −1.0423 | (ASP) | 0.030 |  |  |  |  |
| 13 | Lens 6 | −10.6717 | (ASP) | 0.380 | Plastic | 1.660 | 20.4 | 65.33 |
| 14 |  | −8.6755 | (ASP) | 0.033 |  |  |  |  |
| 15 | Lens 7 | −11.6848 | (ASP) | 0.390 | Plastic | 1.544 | 56.0 | −19.50 |
| 16 |  | 116.8305 | (ASP) | 0.031 |  |  |  |  |
| 17 | Lens 8 | 2.6204 | (ASP) | 0.419 | Plastic | 1.660 | 20.4 | −3.72 |
| 18 |  | 1.1869 | (ASP) | 0.900 |  |  |  |  |
| 19 | Filter | Plano |  | 0.210 | Glass | 1.517 | 64.2 | — |
| 20 |  | Plano |  | 0.268 |  |  |  |  |
| 21 | Image | Plano |  | — |  |  |  |  |

Note:
Reference wavelength is 587.6 nm (d-line).
An effective radius of the stop S1 (Surface 8) is 0.990 mm.

TABLE 1B

Aspheric Coefficients

| Surface # | 1 | 2 | 3 | 4 |
|---|---|---|---|---|
| k= | −8.82491E+01 | 5.61829E−02 | 0.00000E+00 | 1.16537E+01 |
| A4= | 3.758976227E−02 | 2.018454338E−01 | 4.149548140E−02 | 5.698903478E−02 |
| A6= | 7.578503092E−03 | −4.354972472E−01 | −1.865746580E−01 | 2.440388140E−02 |
| A8= | −3.799732467E−02 | 1.284383144E+00 | 1.106274229E+00 | 1.191292607E−01 |
| A10= | 3.954157243E−02 | −2.994617057E+00 | −4.027472187E+00 | −2.553405908E−01 |
| A12= | −2.441585890E−02 | 4.896742096E+00 | 1.025139458E+01 | 2.993917553E−01 |
| A14= | 1.024622665E−02 | −5.598498676E+00 | −1.832997223E+01 | −1.338894132E−01 |
| A16= | −3.067783431E−03 | 4.551840001E+00 | 2.333100464E+01 | −1.044259594E−02 |
| A18= | 6.685669108E−04 | −2.662850531E+00 | −2.126322048E+01 | 1.284922309E−02 |
| A20= | −1.064518732E−04 | 1.122022064E+00 | 1.379937226E+01 | — |
| A22= | 1.225840025E−05 | −3.368002644E−01 | −6.253578777E+00 | — |
| A24= | −9.938760849E−07 | 7.012486905E−02 | 1.902615764E+00 | — |
| A26= | 5.379068019E−08 | −9.608783057E−03 | −3.613433964E−01 | — |
| A28= | −1.743568647E−09 | 7.781558740E−04 | 3.704088264E−02 | — |
| A30= | 2.558495031E−11 | −2.818245945E−05 | −1.410036770E−03 | — |

| Surface # | 6 | 7 | 9 | 10 |
|---|---|---|---|---|
| k= | −7.45880E−01 | 3.13552E+00 | 0.00000E+00 | −8.71069E+00 |
| A4= | −3.300613699E−02 | −5.872826151E−02 | −3.019821349E−01 | −1.110989366E−01 |
| A6= | 2.073201092E+00 | −7.327274074E−02 | 7.153061676E−01 | −4.313041314E−01 |
| A8= | −4.530745893E+01 | 5.533825188E−01 | −9.952522089E+00 | 2.098862678E+00 |
| A10= | 6.255251236E+02 | −2.419878692E+00 | 8.249950637E+01 | −5.940587549E+00 |

TABLE 1B-continued

Aspheric Coefficients

| A12= | −5.803834331E+03 | 6.735331424E+00 | −4.395041460E+02 | 1.255936762E+01 |
|---|---|---|---|---|
| A14= | 3.743516952E+04 | −1.279330456E+01 | 1.604184522E+03 | −2.036950110E+01 |
| A16= | −1.710529639E+05 | 1.612079351E+01 | −4.160706831E+03 | 2.500308008E+01 |
| A18= | 5.569950580E+05 | −1.284721446E+01 | 7.804788774E+03 | −2.282175097E+01 |
| A20= | −1.283306479E+06 | 5.850243352E+00 | −1.062711301E+04 | 1.522337682E+01 |
| A22= | 2.042768525E+06 | −1.160360116E+00 | 1.040047625E+04 | −7.267548695E+00 |
| A24= | −2.135862108E+06 | — | −7.124971894E+03 | 2.405544806E+00 |
| A26= | 1.319272019E+06 | — | 3.240525992E+03 | −5.225155309E−01 |
| A28= | −3.646583760E+05 | — | −8.781459790E+02 | 6.682057391E−02 |
| A30= | — | — | 1.072060700E+02 | −3.806463664E−03 |

| Surface # | 11 | 12 | 13 | 14 |
|---|---|---|---|---|
| k= | 2.65998E+00 | −2.54950E+00 | −8.41227E+00 | 7.55021E+00 |
| A4= | 8.924181892E−02 | −6.464406134E−02 | −9.483341343E−02 | −1.470983605E−01 |
| A6= | −4.374578902E−01 | −1.047037069E−01 | 1.715587562E−01 | 4.172789667E−01 |
| A8= | 1.093740304E+00 | 6.089321521E−01 | −1.220133844E−02 | −5.812718632E−01 |
| A10= | −1.069281984E+00 | −1.397536254E+00 | −2.876933908E−01 | 5.227678644E−01 |
| A12= | −4.237702269E−01 | 2.005267403E+00 | 4.512482456E−01 | −3.304510910E−01 |
| A14= | 2.396451653E+00 | −1.945852330E+00 | −3.776065197E−01 | 1.530805821E−01 |
| A16= | −3.077258701E+00 | 1.318539045E+00 | 2.042182598E−01 | −5.271780585E−02 |
| A18= | 2.200883002E+00 | −6.348102145E−01 | −7.560356293E−02 | 1.346894979E−02 |
| A20= | −9.577358846E−01 | 2.184738155E−01 | 1.950365074E−02 | −2.526489288E−03 |
| A22= | 2.370612749E−01 | −5.337496566E−02 | −3.494503681E−03 | 3.417704881E−04 |
| A24= | −2.004899458E−02 | 9.035285330E−03 | 4.251754176E−04 | −3.234959328E−05 |
| A26= | −5.248322330E−03 | −1.006598473E−03 | −3.340607326E−05 | 2.029542144E−06 |
| A28= | 1.568530569E−03 | 6.629541112E−05 | 1.523609062E−06 | −7.574627563E−08 |
| A30= | −1.255291786E−04 | −1.952735677E−06 | −3.051459964E−08 | 1.272337361E−09 |

| Surface # | 15 | 16 | 17 | 18 |
|---|---|---|---|---|
| k= | 7.81800E+00 | 0.00000E+00 | −3.95915E+01 | −6.46942E+00 |
| A4= | −7.580424431E−03 | 3.204373977E−02 | 7.444077300E−02 | 4.450969651E−02 |
| A6= | 2.933492704E−02 | −4.649714779E−02 | −5.988422668E−02 | −6.959665509E−02 |
| A8= | −2.763404632E−02 | 2.992798749E−02 | −1.823521472E−02 | 3.296369760E−02 |
| A10= | 1.537291668E−02 | −1.325734163E−02 | 3.091116642E−02 | −8.090660316E−03 |
| A12= | −6.412747161E−03 | 4.361525449E−03 | −1.408531301E−02 | 8.328008147E−04 |
| A14= | 2.061371804E−03 | −1.040007140E−03 | 3.647179206E−03 | 1.084247187E−04 |
| A16= | −4.957662342E−04 | 1.753265090E−04 | −6.221458745E−04 | −5.400415445E−05 |
| A18= | 8.714629833E−05 | −2.060046832E−05 | 7.399077055E−05 | 9.579761237E−06 |
| A20= | −1.104016619E−05 | 1.655353874E−06 | −6.268154837E−06 | −1.018940090E−06 |
| A22= | 9.928143115E−07 | −8.717251008E−08 | 3.781000868E−07 | 7.091712176E−08 |
| A24= | −6.171357255E−08 | 2.699518128E−09 | −1.590085750E−08 | −3.262152138E−09 |
| A26= | 2.519220284E−09 | −3.225276932E−11 | 4.435524428E−10 | 9.579225940E−11 |
| A28= | −6.073889460E−11 | −5.276392358E−13 | −7.378526025E−12 | −1.629016159E−12 |
| A30= | 6.552835978E−13 | 1.531237702E−14 | 5.539738917E−14 | 1.221653294E−14 |

In Table 1A, the curvature radius, the thickness and the focal length are shown in millimeters (mm). Surface numbers 0-21 represent the surfaces sequentially arranged from the object side to the image side along the optical axis. In Table 1 B, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
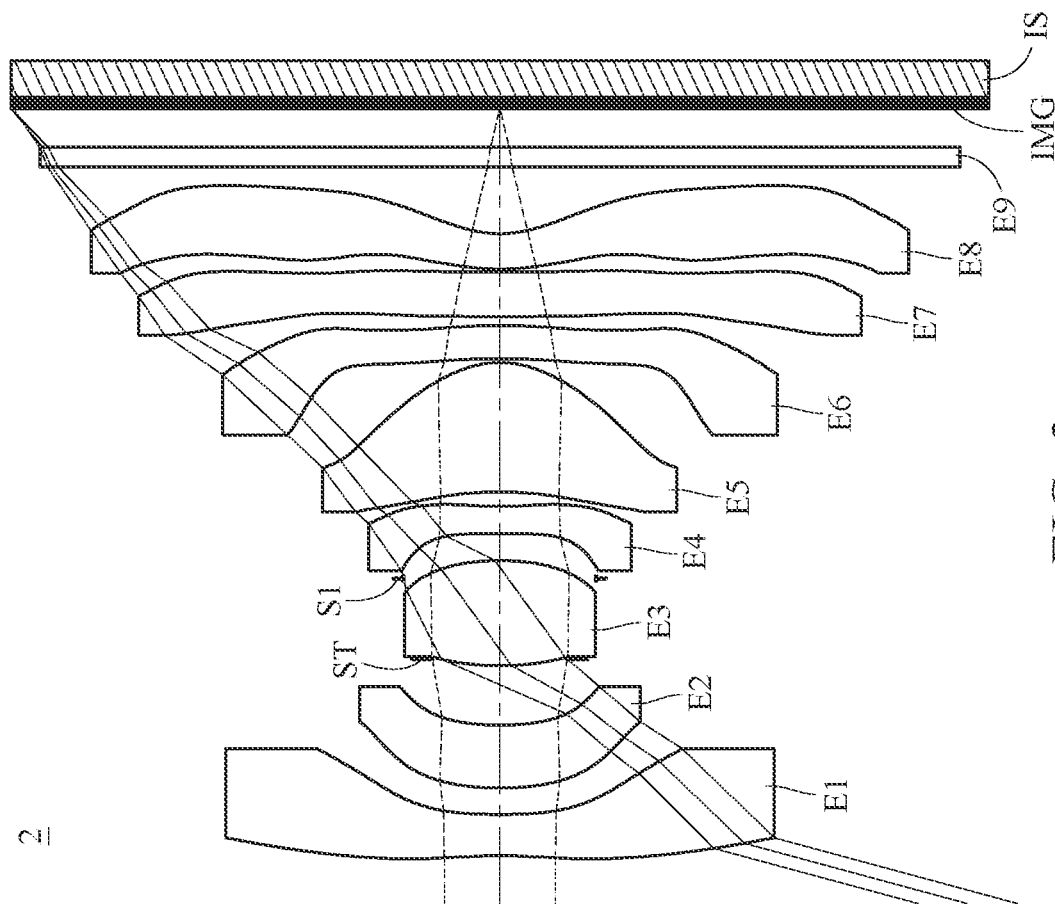
FIG. 3 is a schematic view of an image capturing unit according to the 2nd embodiment of the present disclosure.
Figure 4:
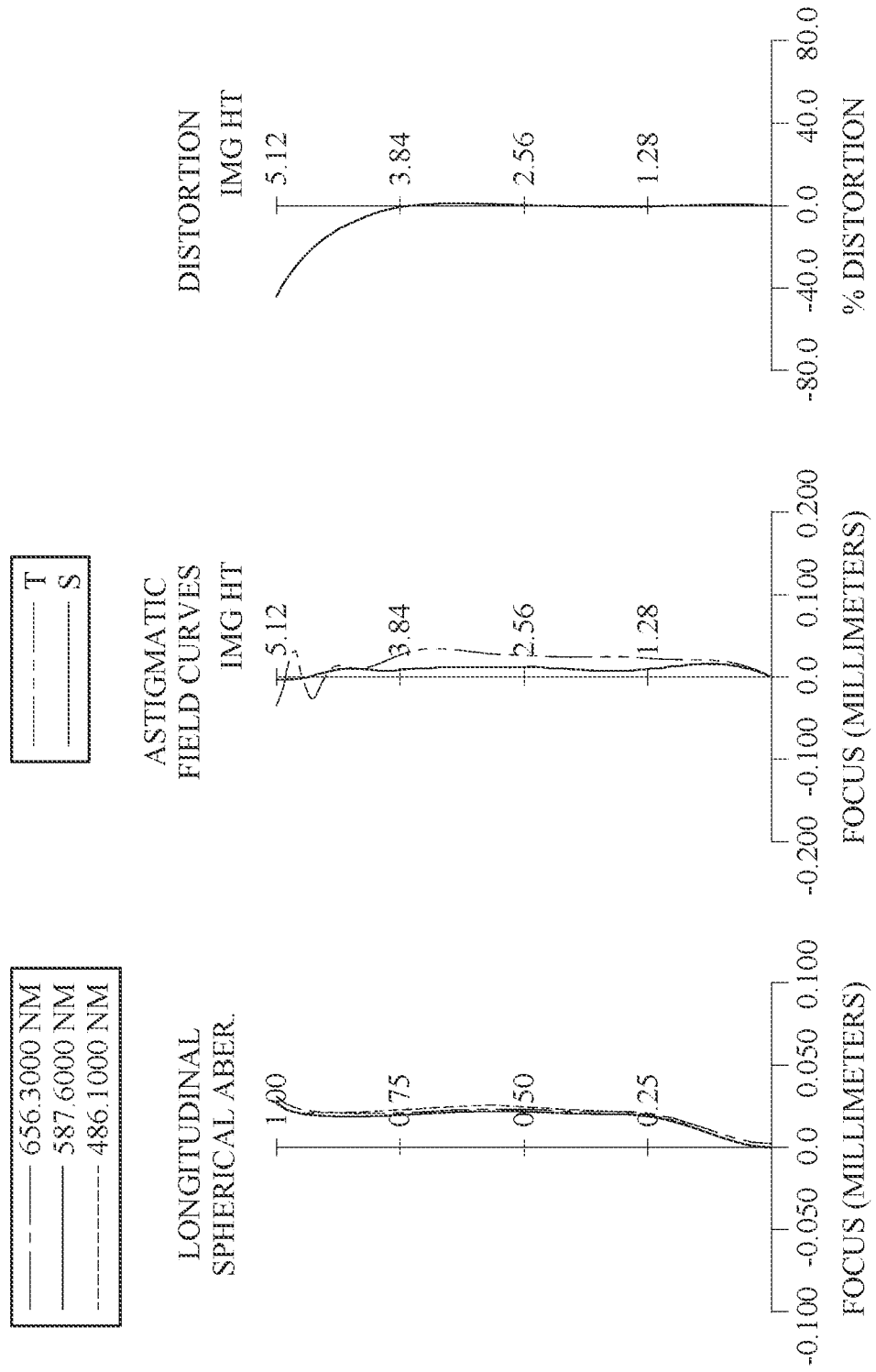
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a stop S1, a fourth lens element E4, a fifth lens element E5, a sixth lens element E6, a seventh lens element E7, an eighth lens element E8, a filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has two critical points in an off-axis region thereof.

The seventh lens element E7 with positive refractive power has an object-side surface being convex in a paraxial region thereof and an image-side surface being planar in a paraxial region thereof. The seventh lens element E7 is made of plastic material and has the object-side surface and the image-side surface being both aspheric. The object-side surface of the seventh lens element E7 has one critical point in an off-axis region thereof. The image-side surface of the seventh lens element E7 has three critical points in an off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has three critical points in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 2nd embodiment are shown in Table 2A and the aspheric surface data are shown in Table 2B below.

TABLE 2A

2nd Embodiment
f = 2.47 mm, Fno = 2.12, HFOV = 74.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.2446 | (ASP) | 0.434 | Plastic | 1.545 | 56.1 | −5.66 |
| 2 | | 7.7178 | (ASP) | 0.277 | | | | |
| 3 | Lens 2 | 3.2163 | (ASP) | 0.659 | Plastic | 1.614 | 25.6 | −266.24 |
| 4 | | 2.9084 | (ASP) | 0.693 | | | | |
| 5 | Ape. Stop | Plano | | −0.070 | | | | |
| 6 | Lens 3 | 2.7857 | (ASP) | 1.105 | Plastic | 1.544 | 56.0 | 2.64 |
| 7 | | −2.5469 | (ASP) | −0.188 | | | | |
| 8 | Stop | Plano | | 0.468 | | | | |
| 9 | Lens 4 | 19.2392 | (ASP) | 0.290 | Plastic | 1.650 | 21.8 | −8.09 |
| 10 | | 4.1029 | (ASP) | 0.150 | | | | |
| 11 | Lens 5 | −3.5924 | (ASP) | 1.358 | Plastic | 1.544 | 56.0 | 2.22 |
| 12 | | −1.0239 | (ASP) | 0.041 | | | | |
| 13 | Lens 6 | −9.4321 | (ASP) | 0.346 | Plastic | 1.639 | 23.5 | −50.71 |
| 14 | | −13.4987 | (ASP) | 0.097 | | | | |
| 15 | Lens 7 | 73.1701 | (ASP) | 0.468 | Plastic | 1.544 | 56.0 | 134.49 |
| 16 | | ∞ | (ASP) | 0.028 | | | | |
| 17 | Lens 8 | 2.1216 | (ASP) | 0.370 | Plastic | 1.686 | 18.4 | −3.49 |
| 18 | | 1.0455 | (ASP) | 0.700 | | | | |
| 19 | Filter | Plano | | 0.210 | Glass | 1.517 | 64.2 | — |
| 20 | | Plano | | 0.402 | | | | |
| 21 | Image | Plano | | — | | | | |

Note:

Reference wavelength is 587.6 nm (d-line).

An effective radius of the stop S1 (Surface 8) is 1.011 mm.

TABLE 2B

| | Aspheric Coefficients | | | |
|---|---|---|---|---|
| Surface # | 1 | 2 | 3 | 4 |
| k= | −7.99246E+01 | 5.15398E+00 | 0.00000E+00 | 3.67188E+00 |
| A4= | 4.778641031E−02 | 1.664987651E−01 | 9.725166291E−02 | 9.567141015E−02 |
| A6= | −1.809865137E−02 | −1.624650843E−01 | −1.121476053E−01 | 2.841919026E−02 |
| A8= | −7.796125490E−04 | 2.198003794E−01 | 4.668879458E−01 | 1.038393592E−01 |
| A10= | 6.134661837E−03 | −2.424309142E−01 | −1.287681675E+00 | −2.028444050E−01 |
| A12= | −4.636559804E−03 | 1.810481303E−01 | 2.810587714E+00 | 3.218428022E−01 |
| A14= | 2.094865639E−03 | −7.456397939E−02 | −4.837253979E+00 | −2.643850684E−01 |
| A16= | −6.509410576E−04 | −3.476239161E−03 | 6.431493917E+00 | 5.696946234E−02 |
| A18= | 1.446102277E−04 | 2.417989842E−02 | −6.455914160E+00 | 8.517817312E−03 |
| A20= | −2.318587400E−05 | −1.508286076E−02 | 4.783671940E+00 | — |
| A22= | 2.662373915E−06 | 5.091985711E−03 | −2.552525735E+00 | — |
| A24= | −2.134685434E−07 | −1.057363846E−03 | 9.471223853E−01 | — |
| A26= | 1.134427626E−08 | 1.347646141E−04 | −2.306728428E−01 | — |
| A28= | −3.588501288E−10 | −9.680187254E−06 | 3.301354467E−02 | — |
| A30= | 5.112095796E−12 | 2.997524211E−07 | −2.097214687E−03 | — |
| Surface # | 6 | 7 | 9 | 10 |
| k= | −8.15938E−01 | 3.07857E+00 | 0.00000E+00 | −2.50141E+01 |
| A4= | −6.560544713E−03 | −7.919501049E−02 | −3.663201428E−01 | −1.229425314E−01 |
| A6= | 6.616569460E−01 | 8.607674394E−04 | 8.369813200E−01 | −4.593706086E−01 |
| A8= | −8.706948545E+00 | 3.824577402E−01 | −1.121806759E+01 | 1.935652326E+00 |
| A10= | 6.873607428E+01 | −2.252975940E+00 | 9.238479593E+01 | −3.959097742E+00 |
| A12= | −3.493399797E+02 | 6.937725445E+00 | −4.880069174E+02 | 4.037409819E+00 |
| A14= | 1.153626455E+03 | −1.354508581E+01 | 1.761449089E+03 | 1.105444326E+00 |
| A16= | −2.410938097E+03 | 1.702019785E+01 | −4.512632481E+03 | −1.049514301E+01 |
| A18= | 2.829707086E+03 | −1.338444017E+01 | 8.354508900E+03 | 1.740741414E+01 |
| A20= | −8.129598883E+02 | 6.003875246E+00 | −1.121934946E+04 | −1.659360879E+01 |
| A22= | −2.481279564E+03 | −1.176813758E+00 | 1.082438378E+04 | 1.029121811E+01 |
| A24= | 3.584671106E+03 | — | −7.309824618E+03 | −4.226618347E+00 |
| A26= | −1.967241123E+03 | — | 3.278514714E+03 | 1.112235354E+00 |
| A28= | 3.944441408E+02 | — | −8.767885559E+02 | −1.700900219E−01 |
| A30= | — | — | 1.057471620E+02 | 1.149883951E−02 |
| Surface # | 11 | 12 | 13 | 14 |
| k= | 5.92884E−01 | −2.17198E+00 | −3.25848E+01 | 8.75701E+00 |
| A4= | 8.553706350E−02 | −7.476612310E−02 | −1.614956559E−01 | −2.610498087E−01 |
| A6= | −4.920485990E−01 | 2.182396430E−01 | 5.644290873E−01 | 7.745216431E−01 |
| A8= | 1.540788385E+00 | −5.558336404E−01 | −8.997044241E−01 | −1.071631202E+00 |
| A10= | −3.405960314E+00 | 7.697552804E−01 | 8.731243645E−01 | 9.100760018E−01 |
| A12= | 6.464389507E+00 | −6.159150584E−01 | −5.583585522E−01 | −5.191420050E−01 |
| A14= | −9.828355720E+00 | 2.636416560E−01 | 2.436291545E−01 | 2.090679856E−01 |
| A16= | 1.098963784E+01 | −1.247710405E−02 | −7.352591143E−02 | −6.115669176E−02 |
| A18= | −8.773688681E+00 | −5.635347366E−02 | 1.524473819E−02 | 1.315709038E−02 |
| A20= | 4.964562135E+00 | 3.682772149E−02 | −2.106886595E−03 | −2.080491214E−03 |
| A22= | −1.971240144E+00 | −1.242920137E−02 | 1.798480354E−04 | 2.386389025E−04 |
| A24= | 5.357183931E−01 | 2.538969110E−03 | −7.396162409E−06 | −1.929108220E−05 |
| A26= | −9.454938065E−02 | −3.130825111E−04 | −8.858743279E−08 | 1.040753341E−06 |
| A28= | 9.708919431E−03 | 2.128842678E−05 | 2.118281797E−08 | −3.360056850E−08 |
| A30= | −4.365657420E−04 | −6.058838775E−07 | −6.010861984E−10 | 4.906307071E−10 |
| Surface # | 15 | 16 | 17 | 18 |
| k= | 0.00000E+00 | 0.00000E+00 | −3.97018E+01 | −6.39630E+00 |
| A4= | −2.936078359E−02 | 2.710551305E−02 | 6.489778701E−02 | 5.374623952E−02 |
| A6= | 9.722834313E−02 | −1.674332768E−02 | −5.245393392E−02 | −9.060284689E−02 |
| A8= | −1.120578098E−01 | −2.515449016E−03 | −5.894467601E−03 | 5.435570781E−02 |
| A10= | 7.157480508E−02 | 4.373585753E−03 | 1.618932042E−02 | −1.988515190E−02 |
| A12= | −2.905921212E−02 | −1.408139390E−03 | −7.100130248E−03 | 4.943787941E−03 |
| A14= | 7.957626872E−03 | 1.901836744E−04 | 1.707648725E−03 | −8.653656428E−04 |
| A16= | −1.521194456E−03 | −9.547088110E−07 | −2.676636601E−04 | 1.082789214E−04 |
| A18= | 2.070542460E−04 | −3.710031540E−06 | 2.911505497E−05 | −9.742991521E−06 |
| A20= | −2.021377095E−05 | 6.368214367E−07 | −2.251079522E−06 | 6.290303482E−07 |
| A22= | 1.406994763E−06 | −5.739880921E−08 | 1.238173120E−07 | −2.877627361E−08 |
| A24= | −6.824400882E−08 | 3.180108758E−09 | −4.746886652E−09 | 9.073251776E−10 |
| A26= | 2.194130004E−09 | −1.089345337E−10 | 1.207101778E−10 | −1.868720162E−11 |
| A28= | −4.206632135E−11 | 2.126777630E−12 | −1.830462382E−12 | 2.254215243E−13 |
| A30= | 3.642942188E−13 | −1.815518317E−14 | 1.252432910E−14 | −1.202240226E−15 |

In the 2nd embodiment, the equation of the aspheric surface profiles of the aforementioned lens elements is the same as the equation of the 1st embodiment. Also, the definitions of these parameters shown in the following Table 20 are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Values of Conditional Expressions

| | | | |
|---|---|---|---|
| f [mm] | 2.47 | \|f1/f2\| | 0.02 |
| Fno | 2.12 | \|f8/f6\| + \|f8/f7\| | 0.09 |
| HFOV [deg.] | 74.9 | f/f1 | −0.44 |
| (V1 + V3 + V5 + V7)/ (V2 + V4 + V6 + V8) | 2.51 | f/R3 | 0.77 |
| ΣAT/T23 | 2.40 | f12/f | −2.07 |
| CT2/T12 | 2.38 | f3/R6 | −1.04 |
| T23/T34 | 2.23 | f4/f5 | −3.65 |
| TL/EPD | 6.73 | ImgH/f | 2.07 |
| TL/ImgH | 1.53 | Y11/Y82 | 0.67 |
| R1/f | −2.12 | Ymax/Ymin | 5.79 |
| R5/f | 1.13 | Yc11/Y11 | 0.33 |
| R5/R4 | 0.96 | Yc81/Y81 | 0.33; 0.51; 0.77 |
| (R9/f) + (R10/f) | −1.87 | Yc82/Y82 | 0.66 |
| (R15/f) + (R16/f) | 1.28 | — | — |

3rd Embodiment

Figure 5:
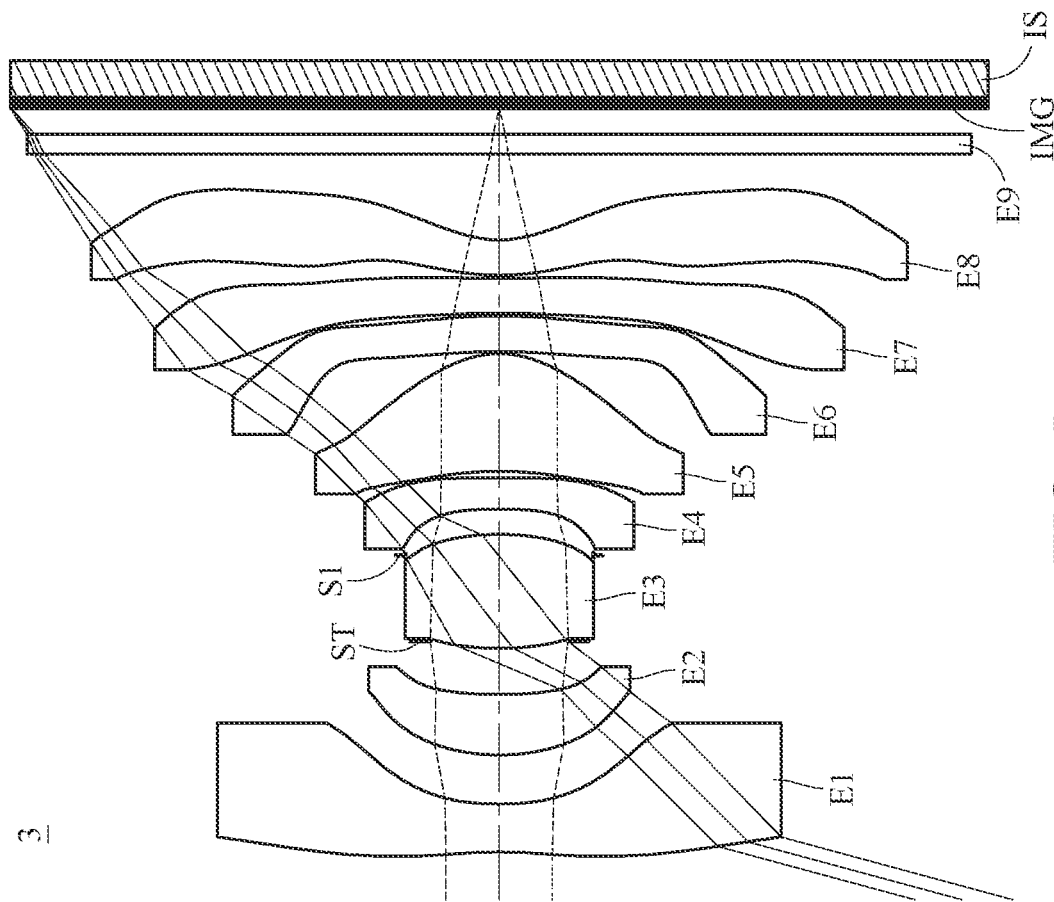
FIG. 5 is a schematic view of an image capturing unit according to the 3rd embodiment of the present disclosure.
Figure 6:
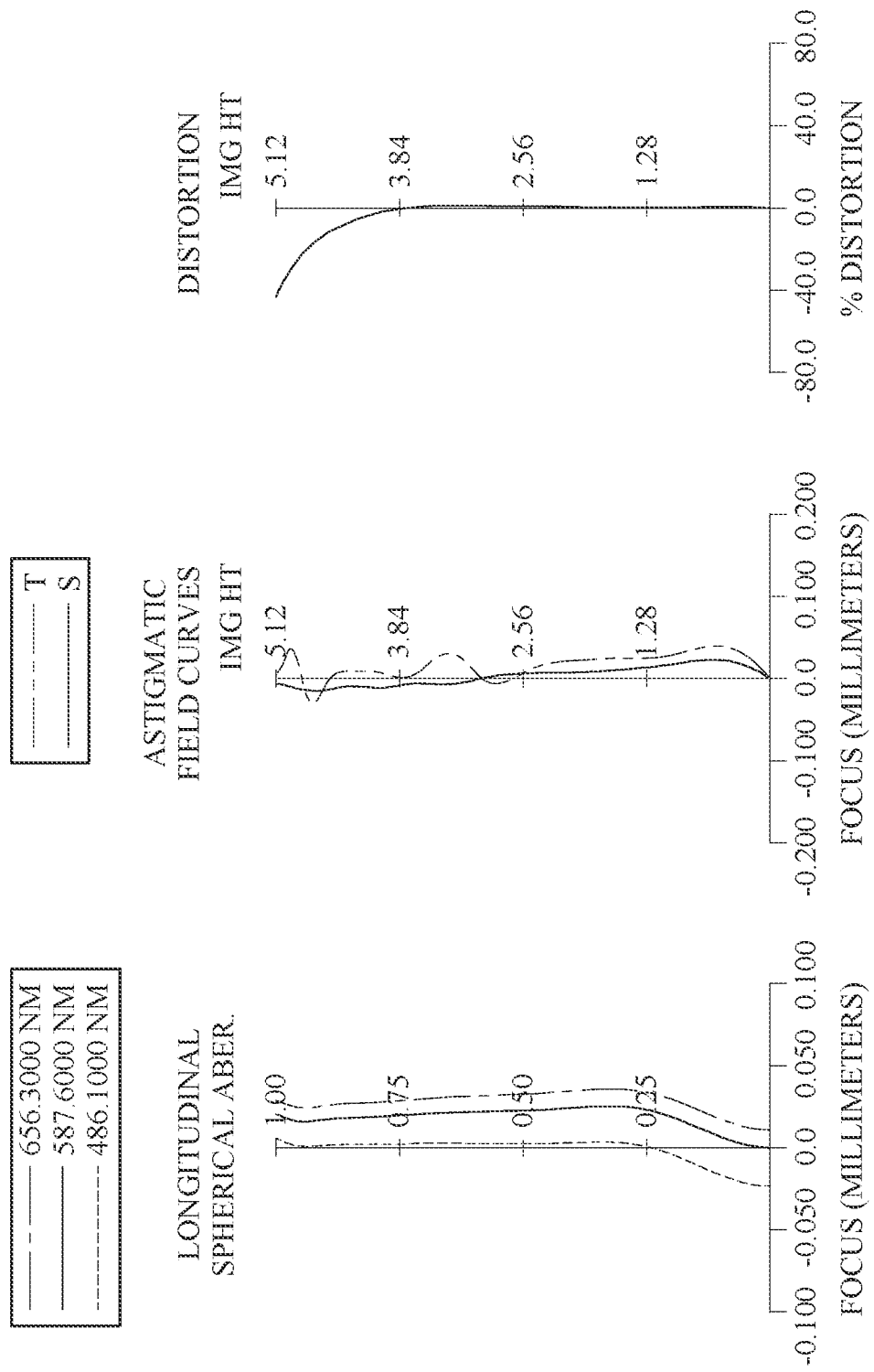
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a stop S1, a fourth lens element E4, a fifth lens element E5, a sixth lens element E6, a seventh lens element E7, an eighth lens element E8, a filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric. The image-side surface of the seventh lens element E7 has two critical points in an off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has three critical points in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 3rd embodiment are shown in Table 3A and the aspheric surface data are shown in Table 3B below.

TABLE 3A

3rd Embodiment
f = 2.43 mm, Fno = 2.18, HFOV = 74.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.0890 | (ASP) | 0.502 | Plastic | 1.545 | 56.1 | −3.23 |
| 2 | | 3.2175 | (ASP) | 0.516 | | | | |

TABLE 3A-continued

3rd Embodiment
f = 2.43 mm, Fno = 2.18, HFOV = 74.9 deg.

| Surface # | | Curvature Radius | | Thickness | Material | Index | Abbe # | Focal Length |
|---|---|---|---|---|---|---|---|---|
| 3 | Lens 2 | 2.1901 | (ASP) | 0.635 | Plastic | 1.587 | 28.3 | 5.97 |
| 4 | | 5.2038 | (ASP) | 0.557 | | | | |
| 5 | Ape. Stop | Plano | | −0.074 | | | | |
| 6 | Lens 3 | 2.8618 | (ASP) | 1.196 | Plastic | 1.544 | 56.0 | 2.87 |
| 7 | | −2.9412 | (ASP) | −0.219 | | | | |
| 8 | Stop | Plano | | 0.485 | | | | |
| 9 | Lens 4 | −5.4405 | (ASP) | 0.329 | Plastic | 1.660 | 20.4 | −8.34 |
| 10 | | −502.2602 | (ASP) | 0.068 | | | | |
| 11 | Lens 5 | −3.6422 | (ASP) | 1.234 | Plastic | 1.544 | 56.0 | 2.29 |
| 12 | | −1.0385 | (ASP) | 0.020 | | | | |
| 13 | Lens 6 | −10.5506 | (ASP) | 0.377 | Plastic | 1.639 | 23.5 | 69.45 |
| 14 | | −8.6417 | (ASP) | 0.028 | | | | |
| 15 | Lens 7 | −11.7058 | (ASP) | 0.370 | Plastic | 1.544 | 56.0 | −22.56 |
| 16 | | −255.7545 | (ASP) | 0.028 | | | | |
| 17 | Lens 8 | 2.1514 | (ASP) | 0.370 | Plastic | 1.639 | 23.5 | −3.58 |
| 18 | | 1.0347 | (ASP) | 0.900 | | | | |
| 19 | Filter | Plano | | 0.210 | Glass | 1.517 | 64.2 | — |
| 20 | | Plano | | 0.270 | | | | |
| 21 | Image | Plano | | — | | | | |

Note:
Reference wavelength is 587.6 nm (d-line).
An effective radius of the stop S1 (Surface 8) is 0.985 mm.

TABLE 3B

Aspheric Coefficients

| Surface # | 1 | 2 | 3 | 4 |
|---|---|---|---|---|
| k= | −6.56424E+01 | −3.66494E−02 | 0.00000E+00 | 1.16746E+01 |
| A4= | 4.182946154E−02 | 1.786824507E−01 | 2.428414811E−02 | 5.137282853E−02 |
| A6= | −1.018131637E−02 | −2.751841966E−01 | −3.114516277E−02 | 5.399716499E−02 |
| A8= | −9.028926071E−03 | 6.156821354E−01 | 1.045943824E−01 | −4.217695100E−02 |
| A10= | 1.245446587E−02 | −1.255610109E+00 | 1.146898341E−01 | 1.735262304E−01 |
| A12= | −7.935968149E−03 | 1.928596018E+00 | −1.545932238E+00 | −3.428157979E−01 |
| A14= | 3.294127598E−03 | −2.135585131E+00 | 5.567180148E+00 | 4.328280449E−01 |
| A16= | −9.628105630E−04 | 1.700093039E+00 | −1.186561509E+01 | −2.766913265E−01 |
| A18= | 2.034855296E−04 | −9.749506882E−01 | 1.680347508E+01 | 6.219060376E−02 |
| A20= | −3.126915002E−05 | 4.014127360E−01 | −1.636381813E+01 | — |
| A22= | 3.460715607E−06 | −1.172226031E−01 | 1.100310225E+01 | — |
| A24= | −2.686772184E−07 | 2.365297505E−02 | −5.013622809E+00 | — |
| A26= | 1.387935568E−08 | −3.132568628E−03 | 1.475109229E+00 | — |
| A28= | −4.282260478E−10 | 2.448550670E−04 | −2.522744832E−01 | — |
| A30= | 5.967773509E−12 | −8.556110803E−06 | 1.900364162E−02 | — |

| Surface # | 6 | 7 | 9 | 10 |
|---|---|---|---|---|
| k= | 6.18757E−01 | 3.52610E+00 | 0.00000E+00 | 0.00000E+00 |
| A4= | 1.770199813E−03 | −5.527917086E−02 | −2.777278657E−01 | −5.637014423E−02 |
| A6= | 4.159584070E−01 | 3.567919019E−02 | 1.596523734E+00 | −2.080875291E−01 |
| A8= | −4.534017793E+00 | −5.052944218E−01 | −1.870900602E+01 | 6.436364677E−01 |
| A10= | 2.810992009E+01 | 2.446377246E+00 | 1.333709694E+02 | −1.302416981E+00 |
| A12= | −8.115783150E+01 | −7.392813048E+00 | −6.404260038E+02 | 1.590752371E+00 |
| A14= | −1.181414785E+02 | 1.429479279E+01 | 2.150794563E+03 | 1.754131709E−01 |
| A16= | 2.044622230E+03 | −1.809948479E+01 | −5.170922883E+03 | −4.476333512E+00 |
| A18= | −8.712236580E+03 | 1.452060523E+01 | 9.004713633E+03 | 8.363554465E+00 |
| A20= | 2.083786186E+04 | −6.678676088E+00 | −1.137015522E+04 | −8.534355158E+00 |
| A22= | −3.074601969E+04 | 1.334281505E+00 | 1.029854235E+04 | 5.518281245E+00 |
| A24= | 2.765630195E+04 | — | −6.516380635E+03 | −2.320547272E+00 |
| A26= | −1.385640123E+04 | — | 2.733783199E+03 | 6.166884701E−01 |
| A28= | 2.948401920E+03 | — | −6.833354377E+02 | −9.418342085E−02 |
| A30= | — | — | 7.710170274E+01 | 6.300082454E−03 |

| Surface # | 11 | 12 | 13 | 14 |
|---|---|---|---|---|
| k= | 1.29435E+00 | −2.51108E+00 | −1.00723E+01 | 6.79375E+00 |
| A4= | 7.822484966E−02 | −9.824468592E−02 | −1.219130478E−01 | −2.076455339E−01 |
| A6= | −3.894417340E−01 | 2.161689261E−01 | 3.815864244E−01 | 6.568320838E−01 |
| A8= | 1.479836879E+00 | −5.701018124E−01 | −6.163905008E−01 | −9.934843406E−01 |
| A10= | −4.349023957E+00 | 1.027714121E+00 | 6.449617135E−01 | 9.375852641E−01 |
| A12= | 1.038152405E+01 | −1.215351546E+00 | −4.509939883E−01 | −6.033793998E−01 |
| A14= | −1.827865359E+01 | 1.010911936E+00 | 2.124761741E−01 | 2.769606209E−01 |

TABLE 3B-continued

| Aspheric Coefficients | | | | |
|---|---|---|---|---|
| A16= | 2.284785974E+01 | −6.204654231E−01 | −6.689190966E−02 | −9.260985400E−02 |
| A18= | −2.027453088E+01 | 2.852273657E−01 | 1.341305537E−02 | 2.270029864E−02 |
| A20= | 1.281822075E+01 | −9.731139781E−02 | −1.431498159E−03 | −4.062982702E−03 |
| A22= | −5.738714205E+00 | 2.407568366E−02 | −7.439400074E−06 | 5.236360426E−04 |
| A24= | 1.778273246E+00 | −4.168347447E−03 | 2.510511160E−05 | −4.724218301E−05 |
| A26= | −3.627266600E−01 | 4.766526180E−04 | −3.462778912E−06 | 2.828795332E−06 |
| A28= | 4.378890183E−02 | −3.224030688E−05 | 2.137623813E−07 | −1.009310319E−07 |
| A30= | −2.368062014E−03 | 9.746564351E−07 | −5.254284369E−09 | 1.623617588E−09 |

| Surface # | 15 | 16 | 17 | 18 |
|---|---|---|---|---|
| k= | 8.02555E+00 | 0.00000E+00 | −3.64139E+01 | −6.06460E+00 |
| A4= | −1.146408067E−02 | 6.510557650E−02 | 7.201970819E−02 | 2.996496903E−02 |
| A6= | 4.157953072E−02 | −1.378325684E−01 | −5.928431994E−02 | −4.519994877E−02 |
| A8= | −4.313726543E−02 | 1.329706611E−01 | −5.339042856E−03 | 1.795845038E−02 |
| A10= | 2.642047888E−02 | −7.787566708E−02 | 1.757453879E−02 | −3.111642092E−03 |
| A12= | −1.135581745E−02 | 2.999412011E−02 | −7.822272713E−03 | −6.737899998E−05 |
| A14= | 3.533094845E−03 | −7.934085139E−03 | 1.887482817E−03 | 1.631985380E−04 |
| A16= | −7.970428774E−04 | 1.482991263E−03 | −2.947569602E−04 | −4.125320592E−05 |
| A18= | 1.301743414E−04 | −1.990767003E−04 | 3.174994942E−05 | 5.880533547E−06 |
| A20= | −1.532028765E−05 | 1.927754479E−05 | −2.417315370E−06 | −5.471191483E−07 |
| A22= | 1.283368520E−06 | −1.335201896E−06 | 1.302702048E−07 | 3.440588522E−08 |
| A24= | −7.453468962E−08 | 6.450513173E−08 | −4.871993306E−09 | −1.453537349E−09 |
| A26= | 2.849856641E−09 | −2.063914895E−09 | 1.204357992E−10 | 3.957940525E−11 |
| A28= | −6.447814798E−11 | 3.928702187E−11 | −1.770762801E−12 | −6.280934134E−13 |
| A30= | 6.536323552E−13 | −3.366368199E−13 | 1.172743811E−14 | 4.415457246E−15 |

In the 3rd embodiment, the equation of the aspheric surface profiles of the aforementioned lens elements is the same as the equation of the 1st embodiment. Also, the definitions of these parameters shown in the following Table 30 are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Conditional Expressions | | | |
|---|---|---|---|
| f [mm] | 2.43 | \|f1/f2\| | 0.54 |
| Fno | 2.18 | \|f8/f6\| + \|f8/f7\| | 0.21 |
| HFOV [deg.] | 74.9 | f/f1 | −0.75 |
| (V1 + V3 + V5 + V7)/(V2 + V4 + V6 + V8) | 2.34 | f/R3 | 1.11 |
| ΣAT/T23 | 2.92 | f12/f | −3.36 |
| CT2/T12 | 1.23 | f3/R6 | −0.98 |
| T23/T34 | 1.82 | f4/f5 | −3.64 |
| TL/EPD | 7.01 | ImgH/f | 2.11 |
| TL/ImgH | 1.52 | Y11/Y82 | 0.69 |
| R1/f | −1.68 | Ymax/Ymin | 5.74 |
| R5/f | 1.18 | Yc11/Y11 | 0.37 |
| R5/R4 | 0.55 | Yc81/Y81 | 0.32; 0.51; 0.76 |
| (R9/f) + (R10/f) | −1.93 | Yc82/Y82 | 0.66 |
| (R15/f) + (R16/f) | 1.31 | — | — |

4th Embodiment

Figure 7:
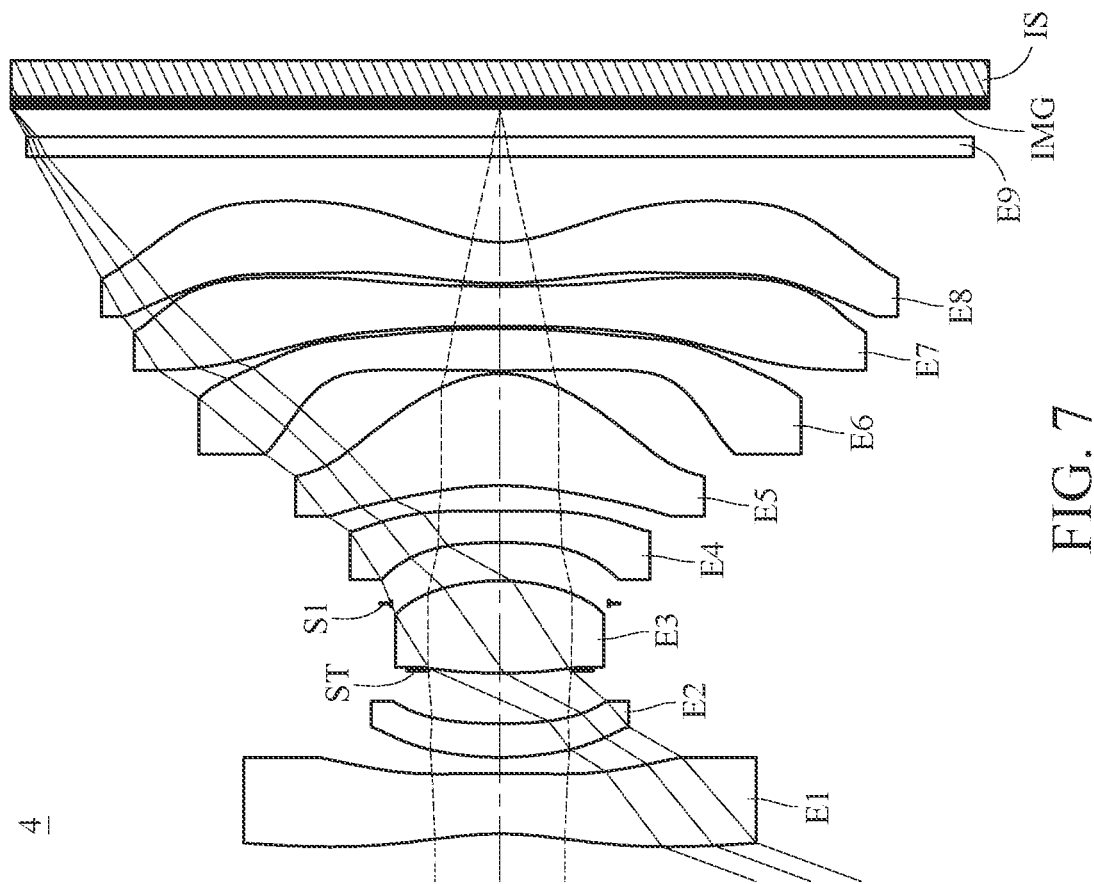
FIG. 7 is a schematic view of an image capturing unit according to the 4th embodiment of the present disclosure.
Figure 8:
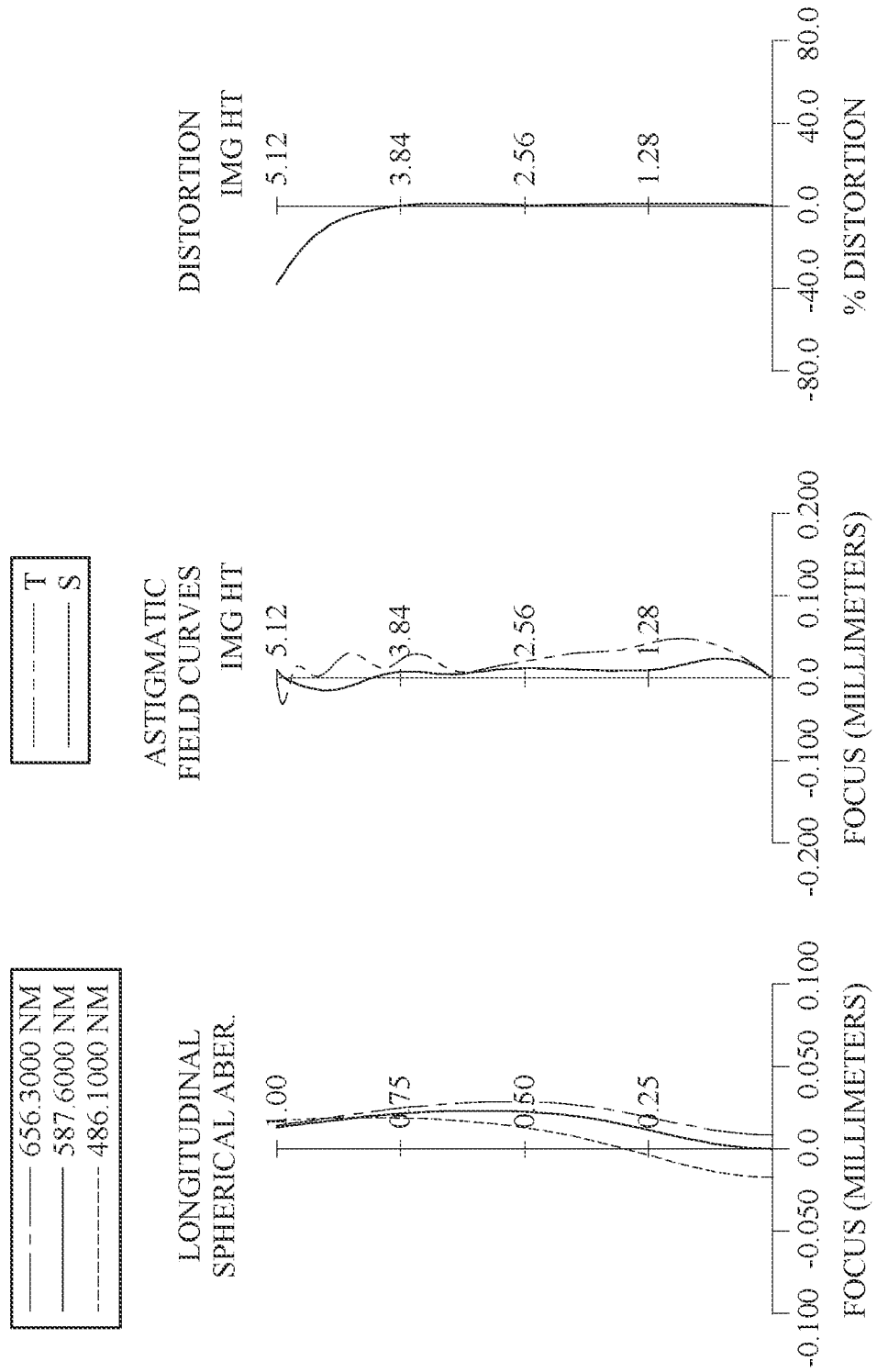
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a stop S1, a fourth lens element E4, a fifth lens element E5, a sixth lens element E6, a seventh lens element E7, an eighth lens element E8, a filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being convex in a paraxial region thereof. The first lens element E1 is made of plastic material and has the object-side surface and the image-side surface being both aspheric. The object-side surface of the first lens element E1 has one critical point in an off-axis region thereof. The image-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one critical point in an off-axis region thereof.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one critical point in an off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 4th embodiment are shown in Table 4A and the aspheric surface data are shown in Table 4B below.

TABLE 4A

4th Embodiment
f = 3.06 mm, Fno = 2.25, HFOV = 69.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.3840 | (ASP) | 0.636 | Plastic | 1.545 | 56.1 | −8.80 |
| 2 | | −12.2647 | (ASP) | 0.169 | | | | |
| 3 | Lens 2 | 3.3460 | (ASP) | 0.351 | Plastic | 1.686 | 18.4 | 17.67 |
| 4 | | 4.4247 | (ASP) | 0.559 | | | | |
| 5 | Ape. Stop | Plano | | −0.027 | | | | |
| 6 | Lens 3 | 5.2163 | (ASP) | 0.971 | Plastic | 1.534 | 56.0 | 3.23 |
| 7 | | −2.4125 | (ASP) | −0.237 | | | | |
| 8 | Stop | Plano | | 0.639 | | | | |
| 9 | Lens 4 | −6.4567 | (ASP) | 0.330 | Plastic | 1.686 | 18.4 | −7.35 |
| 10 | | 23.5482 | (ASP) | 0.268 | | | | |
| 11 | Lens 5 | −3.4854 | (ASP) | 1.178 | Plastic | 1.544 | 56.0 | 3.07 |
| 12 | | −1.2642 | (ASP) | 0.030 | | | | |
| 13 | Lens 6 | 15.8474 | (ASP) | 0.441 | Plastic | 1.686 | 18.4 | 9.60 |
| 14 | | −11.1516 | (ASP) | 0.030 | | | | |
| 15 | Lens 7 | −13.8383 | (ASP) | 0.417 | Plastic | 1.566 | 37.4 | −14.97 |
| 16 | | 22.0940 | (ASP) | 0.030 | | | | |
| 17 | Lens 8 | 3.0710 | (ASP) | 0.433 | Plastic | 1.686 | 18.4 | −3.61 |
| 18 | | 1.2930 | (ASP) | 0.900 | | | | |
| 19 | Filter | Plano | | 0.210 | Glass | 1.517 | 64.2 | — |
| 20 | | Plano | | 0.292 | | | | |
| 21 | Image | Plano | | — | | | | |

Note:
Reference wavelength is 587.6 nm (d-line).
An effective radius of the stop S1 (Surface 8) is 1.142 mm.

TABLE 4B

Aspheric Coefficients

| Surface # | 1 | 2 | 3 | 4 |
|---|---|---|---|---|
| k= | −2.13898E+01 | 0.00000E+00 | 1.81677E+00 | 5.81632E+00 |
| A4= | 2.228046423E−02 | 6.318434423E−02 | −3.644919511E−02 | −5.282021568E−03 |
| A6= | −4.715312409E−03 | −2.588719207E−02 | 6.028960221E−02 | 7.720951639E−02 |
| A8= | 8.249396276E−04 | 2.077787308E−02 | −1.499032942E−02 | −1.458907296E−02 |
| A10= | −1.478370907E−04 | −1.405961752E−02 | −7.169260755E−03 | −3.440188668E−02 |
| A12= | 1.951568286E−05 | 5.048690712E−03 | 3.312800386E−03 | 3.655533101E−02 |
| A14= | −1.408342606E−06 | −9.467564080E−04 | −7.825683142E−04 | −1.442668069E−02 |
| A16= | 4.137020536E−08 | 8.591370337E−05 | — | — |
| A18= | — | −2.745116912E−06 | — | — |

TABLE 4B-continued

Aspheric Coefficients

| Surface # | 6 | 7 | 9 | 10 |
|---|---|---|---|---|
| k= | −1.50213E+00 | 8.56103E−01 | 1.79570E+01 | 0.00000E+00 |
| A4= | 1.927346034E−03 | −2.548193817E−02 | −1.491553457E−01 | −1.113535531E−01 |
| A6= | 2.906053053E−02 | −1.426934622E−02 | 1.089446489E−01 | 7.507462836E−02 |
| A8= | −1.703153351E−01 | 1.437444733E−02 | −1.977001588E−01 | −6.360600085E−02 |
| A10= | 3.582126091E−01 | 5.180186003E−03 | 2.583812287E−01 | 3.266346302E−02 |
| A12= | −4.070663218E−01 | −5.388739297E−02 | −1.743397805E−01 | −2.899370685E−03 |
| A14= | 1.649941652E−01 | 4.915314243E−02 | 5.456880723E−02 | −2.580245131E−03 |
| A16= | — | −1.740622075E−02 | −6.288123346E−03 | −4.337533531E−04 |
| A18= | — | — | — | 6.992744437E−04 |
| A20= | — | — | — | −1.228290577E−04 |

| Surface # | 11 | 12 | 13 | 14 |
|---|---|---|---|---|
| k= | −2.76869E+00 | −2.75297E+00 | 0.00000E+00 | 7.40621E+00 |
| A4= | 5.906984396E−03 | −1.145453223E−01 | −4.073192416E−02 | −1.882628037E−03 |
| A6= | 1.845918139E−02 | 1.483882723E−01 | 2.620592269E−02 | −1.399747214E−02 |
| A8= | 1.485774290E−02 | −1.584218073E−01 | −8.140261183E−03 | 2.083116535E−02 |
| A10= | −5.312106048E−02 | 1.263241759E−01 | 3.840828232E−04 | −1.084161903E−02 |
| A12= | 4.758315716E−02 | −6.841910232E−02 | 1.887585315E−04 | 2.923957665E−03 |
| A14= | −2.127980596E−02 | 2.414091870E−02 | −7.100355789E−05 | −4.668038905E−04 |
| A16= | 5.158428367E−03 | −5.374545357E−03 | 1.528125523E−05 | 4.609904607E−05 |
| A18= | −6.417754077E−04 | 7.219016582E−04 | −1.541556691E−06 | −2.778757119E−06 |
| A20= | 3.185472327E−05 | −5.314414376E−05 | 5.382896163E−08 | 9.395281027E−08 |
| A22= | — | 1.639828118E−06 | — | −1.367158785E−09 |

| Surface # | 15 | 16 | 17 | 18 |
|---|---|---|---|---|
| k= | 3.80223E+00 | −5.54277E+01 | −7.21445E+01 | −7.49443E+00 |
| A4= | 5.485606271E−03 | 8.369681012E−04 | 2.319681945E−02 | 1.937732217E−02 |
| A6= | −2.441482421E−03 | 1.410537150E−02 | −2.919020262E−02 | −3.318037860E−02 |
| A8= | −1.905310979E−04 | −1.131583325E−02 | 1.130750409E−02 | 1.571437468E−02 |
| A10= | 1.979162606E−04 | 3.822136633E−03 | −2.284028506E−03 | −4.500341201E−03 |
| A12= | −3.969129497E−05 | −7.271149459E−04 | 2.796508719E−04 | 8.807686787E−04 |
| A14= | 4.271161871E−06 | 8.568922628E−05 | −2.258528272E−05 | −1.212189816E−04 |
| A16= | −2.743867087E−07 | −6.463098420E−06 | 1.280317650E−06 | 1.175319125E−05 |
| A18= | 9.928809514E−09 | 3.101256389E−07 | −5.321673125E−08 | −7.956664841E−07 |
| A20= | −1.555755483E−10 | −9.054009993E−09 | 1.609203735E−09 | 3.677828915E−08 |
| A22= | — | 1.444209568E−10 | −3.160554806E−11 | −1.106718816E−09 |
| A24= | — | −9.472134220E−13 | 2.929531567E−13 | 1.955688159E−11 |
| A26= | — | — | — | −1.541235634E−13 |

In the 4th embodiment, the equation of the aspheric surface profiles of the aforementioned lens elements is the same as the equation of the 1st embodiment. Also, the definitions of these parameters shown in the following Table 40 are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Values of Conditional Expressions

| f [mm] | 3.06 | |f1/f2| | 0.50 |
|---|---|---|---|
| Fno | 2.25 | |f8/f6| + |f8/f7| | 0.62 |
| HFOV [deg.] | 69.7 | f/f1 | −0.35 |
| (V1 + V3 + V5 + V7)/(V2 + V4 + V6 + V8) | 2.79 | f/R3 | 0.92 |
| ΣAT/T23 | 2.75 | f12/f | −5.84 |
| CT2/T12 | 2.08 | f3/R6 | −1.34 |
| T23/T34 | 1.32 | f4/f5 | −2.39 |
| TL/EPD | 5.59 | ImgH/f | 1.67 |
| TL/ImgH | 1.49 | Y11/Y82 | 0.64 |
| R1/f | −1.10 | Ymax/Ymin | 5.26 |

TABLE 4C-continued

Values of Conditional Expressions

| R5/f | 1.70 | Yc11/Y11 | 0.65 |
|---|---|---|---|
| R5/R4 | 1.18 | Yc81/Y81 | 0.38 |
| (R9/f) + (R10/f) | −1.55 | Yc82/Y82 | 0.53 |
| (R15/f) + (R16/f) | 1.42 | — | — |

5th Embodiment

Figure 9:
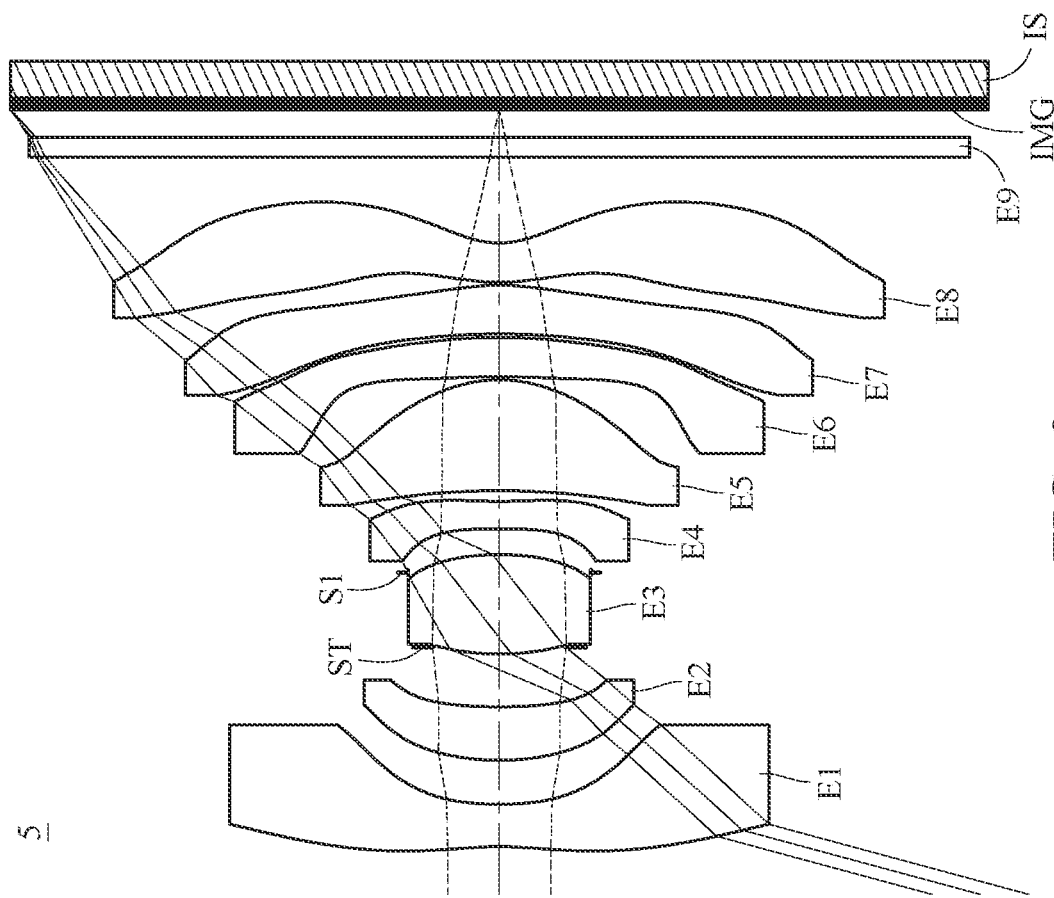
FIG. 9 is a schematic view of an image capturing unit according to the 5th embodiment of the present disclosure.
Figure 10:
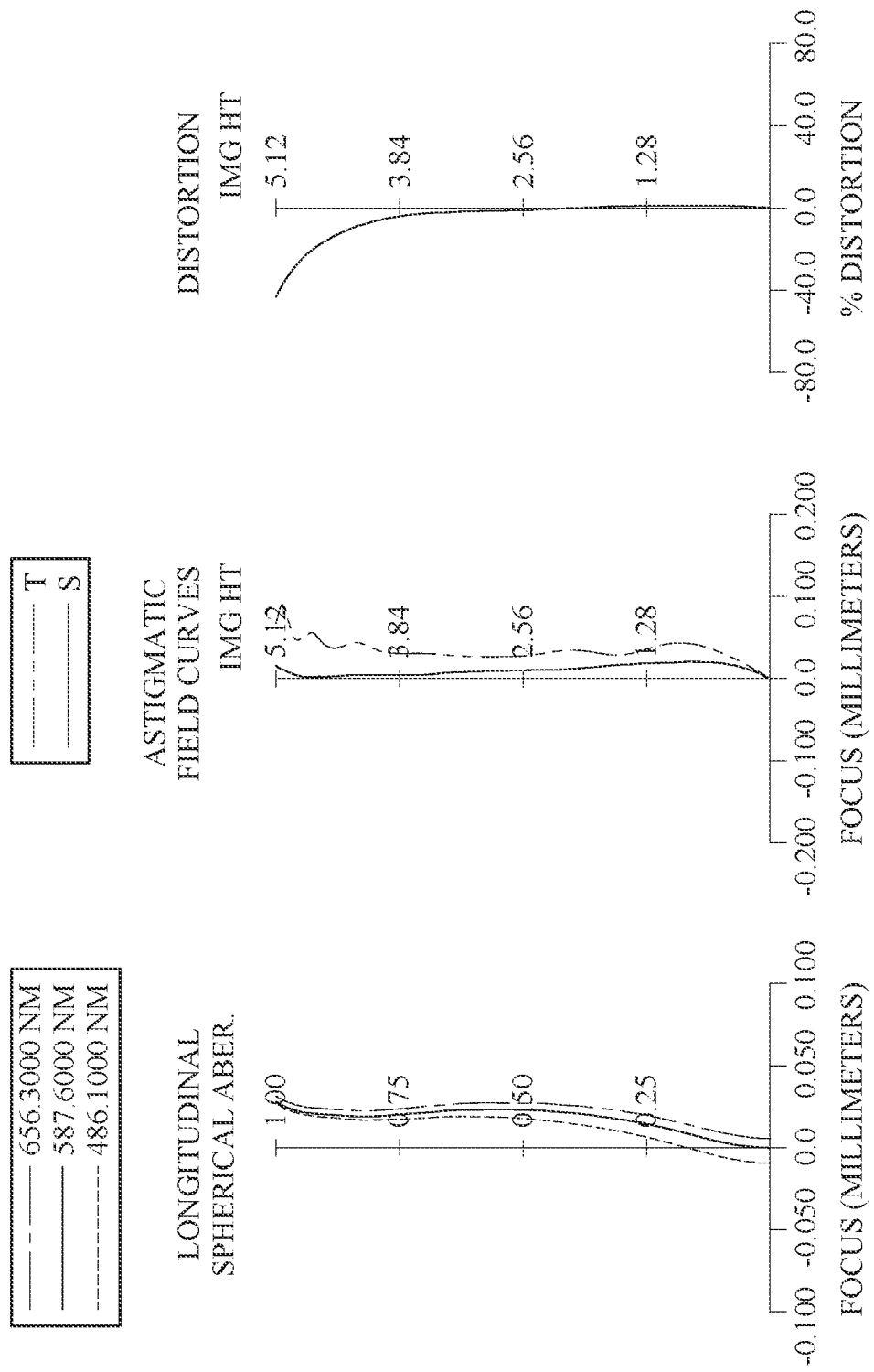
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a stop S1, a fourth lens element E4, a fifth lens element E5, a sixth lens element E6, a seventh lens element E7, an eighth lens element E8, a filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with positive refractive power has an object-side surface being concave in a paraxial region thereof and an image-side surface being convex in a paraxial region thereof. The seventh lens element E7 is made of plastic material and has the object-side surface and the image-side surface being both aspheric.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 5th embodiment are shown in Table 5A and the aspheric surface data are shown in Table 5B below.

TABLE 5A

5th Embodiment
f = 2.43 mm, Fno = 2.25, HFOV = 74.8 deg.

| Surface # |           | Curvature Radius |       | Thickness | Material | Index | Abbe # | Focal Length |
|-----------|-----------|------------------|-------|-----------|----------|-------|--------|--------------|
| 0         | Object    | Plano            |       | Infinity  |          |       |        |              |
| 1         | Lens 1    | −3.6504          | (ASP) | 0.447     | Plastic  | 1.545 | 56.1   | −3.46        |
| 2         |           | 4.0595           | (ASP) | 0.461     |          |       |        |              |
| 3         | Lens 2    | 2.7411           | (ASP) | 0.560     | Plastic  | 1.647 | 25.9   | 7.50         |
| 4         |           | 5.7948           | (ASP) | 0.623     |          |       |        |              |
| 5         | Ape. Stop | Plano            |       | −0.068    |          |       |        |              |
| 6         | Lens 3    | 2.8039           | (ASP) | 1.042     | Plastic  | 1.515 | 69.9   | 2.87         |
| 7         |           | −2.7366          | (ASP) | −0.188    |          |       |        |              |
| 8         | Stop      | Plano            |       | 0.458     |          |       |        |              |
| 9         | Lens 4    | −12.9112         | (ASP) | 0.290     | Plastic  | 1.697 | 24.5   | −6.05        |
| 10        |           | 6.3158           | (ASP) | 0.111     |          |       |        |              |
| 11        | Lens 5    | −7.1543          | (ASP) | 1.163     | Plastic  | 1.551 | 69.9   | 3.15         |
| 12        |           | −1.4761          | (ASP) | 0.030     |          |       |        |              |
| 13        | Lens 6    | −15.9150         | (ASP) | 0.413     | Plastic  | 1.697 | 24.5   | 20.29        |
| 14        |           | −7.5693          | (ASP) | 0.038     |          |       |        |              |
| 15        | Lens 7    | −7.1074          | (ASP) | 0.512     | Plastic  | 1.612 | 42.0   | 4.62         |
| 16        |           | −2.0800          | (ASP) | 0.030     |          |       |        |              |
| 17        | Lens 8    | 2.1234           | (ASP) | 0.410     | Plastic  | 1.697 | 24.5   | −2.21        |
| 18        |           | 0.8217           | (ASP) | 0.900     |          |       |        |              |
| 19        | Filter    | Plano            |       | 0.210     | Glass    | 1.517 | 64.2   | —            |
| 20        |           | Plano            |       | 0.289     |          |       |        |              |
| 21        | Image     | Plano            |       | —         |          |       |        |              |

Note:
Reference wavelength is 587.6 nm (d-line).
An effective radius of the stop S1 (Surface 8) is 0.961 mm.

TABLE 5B

| Aspheric Coefficients | | | | |
|---|---|---|---|---|
| Surface # | 1 | 2 | 3 | 4 |
| k= | −5.41514E+01 | 0.00000E+00 | 0.00000E+00 | 0.00000E+00 |
| A4= | 7.016283230E−02 | 2.251374623E−01 | 3.122148947E−02 | 4.655002496E−02 |
| A6= | −4.520122054E−02 | −2.542144949E−01 | −2.728960805E−02 | 9.009518125E−02 |
| A8= | 2.170017806E−02 | 3.012562727E−01 | 9.388626097E−02 | −4.000152085E−01 |
| A10= | −7.700730947E−03 | −2.944981565E−01 | −1.646465248E−01 | 1.551935574E+00 |
| A12= | 2.032483956E−03 | 2.058986619E−01 | 2.074738807E−01 | −3.674912096E+00 |
| A14= | −4.003379313E−04 | −8.906863254E−02 | −1.414539444E−01 | 5.712937770E+00 |
| A16= | 5.812423429E−05 | 1.944387439E−02 | 2.376281020E−02 | −5.898277268E+00 |
| A18= | −6.019689565E−06 | −3.385411516E−04 | 3.379591819E−02 | 3.985886315E+00 |
| A20= | 4.184617182E−07 | −7.634121821E−04 | −2.560540301E−02 | −1.678937790E+00 |
| A22= | −1.740253682E−08 | 1.463828694E−04 | 7.188466575E−03 | 3.939021032E−01 |
| A24= | 3.257896271E−10 | −8.650526179E−06 | −7.361164737E−04 | −3.862052258E−02 |
| Surface # | 6 | 7 | 9 | 10 |
| k= | −1.21235E+00 | 2.72496E+00 | 4.32581E+01 | 0.00000E+00 |
| A4= | 1.053838656E−02 | −5.652948684E−02 | −3.024870202E−01 | −1.731533327E−01 |
| A6= | 3.980671861E−01 | −8.916589428E−02 | 3.010623620E−01 | −1.431381296E−01 |
| A8= | −5.289437062E+00 | 1.309241575E+00 | −1.631316689E+00 | 1.173841757E+00 |
| A10= | 4.330423269E+01 | −8.623770826E+00 | 9.426797006E+00 | −3.673847219E+00 |
| A12= | −2.325157937E+02 | 3.426123521E+01 | −3.882372838E+01 | 7.581318846E+00 |
| A14= | 8.267847461E+02 | −8.966383343E+01 | 1.073950489E+02 | −1.118122509E+01 |
| A16= | −1.925965460E+03 | 1.571674894E+02 | −2.017751110E+02 | 1.216392407E+01 |
| A18= | 2.819564507E+03 | −1.827503937E+02 | 2.572182897E+02 | −9.921289061E+00 |
| A20= | −2.349413171E+03 | 1.351886900E+02 | −2.182656117E+02 | 6.081905462E+00 |
| A22= | 8.486469217E+02 | −5.756396158E+01 | 1.174869370E+02 | −2.762432554E+00 |
| A24= | — | 1.073314535E+01 | −3.610962057E+01 | 8.976932392E−01 |
| A26= | — | — | 4.803547111E+00 | −1.957283702E−01 |
| A28= | — | — | — | 2.540286426E−02 |
| A30= | — | — | — | −1.469929259E−03 |
| Surface # | 11 | 12 | 13 | 14 |
| k= | 5.40808E+00 | −2.57058E+00 | 0.00000E+00 | 0.00000E+00 |
| A4= | 6.638246487E−02 | −9.845711738E−02 | −1.106292655E−01 | −9.438864197E−02 |
| A6= | −3.673751851E−01 | 2.317135520E−01 | 4.676278564E−01 | 1.927273182E−01 |
| A8= | 1.268917663E+00 | −1.743019522E−01 | −8.409622424E−01 | −1.523134609E−01 |
| A10= | −2.987076681E+00 | −5.759088916E−01 | 9.414366542E−01 | 2.428661308E−02 |
| A12= | 4.952091018E+00 | 1.718088002E+00 | −7.745970527E−01 | 4.520849644E−02 |
| A14= | −5.839137898E+00 | −2.308869307E+00 | 4.992831696E−01 | −3.943812998E−02 |
| A16= | 4.926644587E+00 | 1.942825782E+00 | −2.533515859E−01 | 1.652515457E−02 |
| A18= | −2.978592660E+00 | −1.113031548E+00 | 9.886906389E−02 | −4.323586902E−03 |
| A20= | 1.281258004E+00 | 4.457499624E−01 | −2.878978795E−02 | 7.589416081E−04 |
| A22= | −3.841481616E−01 | −1.247516268E−01 | 6.051902097E−03 | −9.118358285E−05 |
| A24= | 7.697061749E−02 | 2.387604107E−02 | −8.814527627E−04 | 7.420687111E−06 |
| A26= | −9.500532868E−03 | −2.972732332E−03 | 8.366918583E−05 | −3.917379154E−07 |
| A28= | 6.082698490E−04 | 2.165851849E−04 | −4.626451678E−06 | 1.211412477E−08 |
| A30= | −1.240375009E−05 | −6.994832277E−06 | 1.125123948E−07 | −1.666238972E−10 |
| Surface # | 15 | 16 | 17 | 18 |
| k= | 1.36590E+00 | −1.82109E+01 | −1.73812E+01 | −4.12256E+00 |
| A4= | 1.277582340E−02 | 9.554141763E−02 | −3.367135713E−02 | −7.854265579E−02 |
| A6= | −2.393608359E−02 | −9.986769381E−02 | −4.736707244E−02 | 2.016793940E−02 |
| A8= | 3.443357497E−02 | 5.496052283E−02 | 3.594112306E−02 | 2.143068958E−04 |
| A10= | −3.238737607E−02 | −1.821217477E−02 | −1.078442387E−02 | −2.109453674E−03 |
| A12= | 1.913116114E−02 | 3.832814127E−03 | 1.487968668E−03 | 8.319355209E−04 |
| A14= | −7.543044789E−03 | −5.087503037E−04 | 2.000990951E−05 | −1.867051597E−04 |
| A16= | 2.082276038E−03 | 3.762280716E−05 | −4.800135383E−05 | 2.812863465E−05 |
| A18= | −4.130988119E−04 | −4.637141590E−07 | 9.840092135E−06 | −2.983138417E−06 |
| A20= | 5.938461961E−05 | −1.886697709E−07 | −1.138896782E−06 | 2.254973484E−07 |
| A22= | −6.136908890E−06 | 1.828719177E−08 | 8.587403438E−08 | −1.207996334E−08 |
| A24= | 4.441212567E−07 | −7.413778696E−10 | −4.311782189E−09 | 4.485956511E−10 |
| A26= | −2.133586425E−08 | 1.173572214E−11 | 1.396515025E−10 | −1.102305123E−11 |
| A28= | 6.102062084E−10 | — | −2.646858880E−12 | 1.623032324E−13 |
| A30= | −7.850851834E−12 | — | 2.233110217E−14 | −1.094931250E−15 |

In the 5th embodiment, the equation of the aspheric surface profiles of the aforementioned lens elements is the same as the equation of the 1 st embodiment. Also, the definitions of these parameters shown in the following Table 50 are the same as those stated in the 1 st embodiment with corresponding values for the 5th embodiment, so an explanation in this regard will not be provided again.

Moreover, these parameters can be calculated from Table 5A and Table 5B as the following values and satisfy the following conditions:

TABLE 5C

Values of Conditional Expressions

| | | | |
|---|---|---|---|
| f [mm] | 2.43 | \|f1/f2\| | 0.46 |
| Fno | 2.25 | \|f8/f6\| + \|f8/f7\| | 0.59 |
| HFOV [deg.] | 74.8 | f/f1 | −0.70 |
| (V1 + V3 + V5 + V7)/(V2 + V4 + V6 + V8) | 2.39 | f/R3 | 0.89 |
| ΣAT/T23 | 2.69 | f12/f | −2.86 |
| CT2/T12 | 1.21 | f3/R6 | −1.05 |
| T23/T34 | 2.06 | f4/f5 | −1.92 |
| TL/EPD | 7.15 | ImgH/f | 2.10 |
| TL/ImgH | 1.51 | Y11/Y82 | 0.70 |
| R1/f | −1.50 | Ymax/Ymin | 5.58 |
| R5/f | 1.15 | Yc11/Y11 | 0.35 |
| R5/R4 | 0.48 | Yc81/Y81 | 0.26 |
| (R9/f) + (R10/f) | −3.55 | Yc82/Y82 | 0.46 |
| (R15/f) + (R16/f) | 1.21 | — | — |

6th Embodiment

Figure 11:
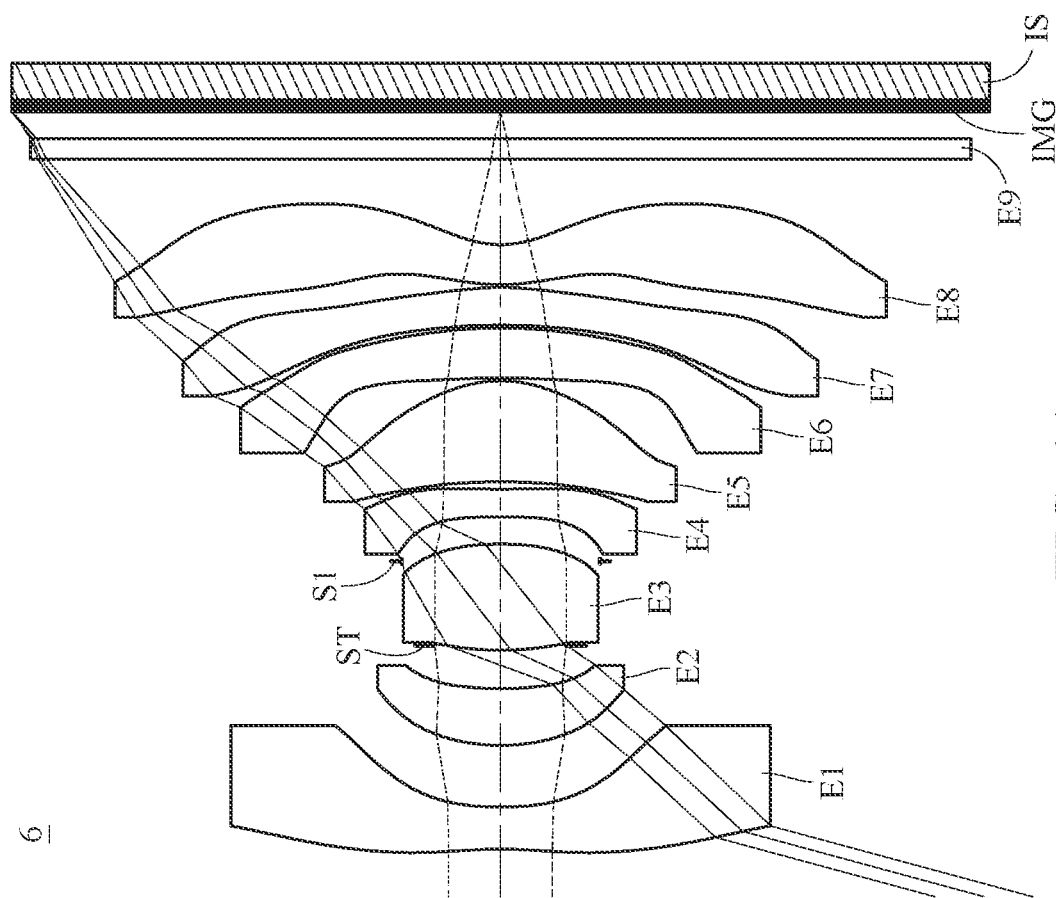
FIG. 11 is a schematic view of an image capturing unit according to the 6th embodiment of the present disclosure.
Figure 12:
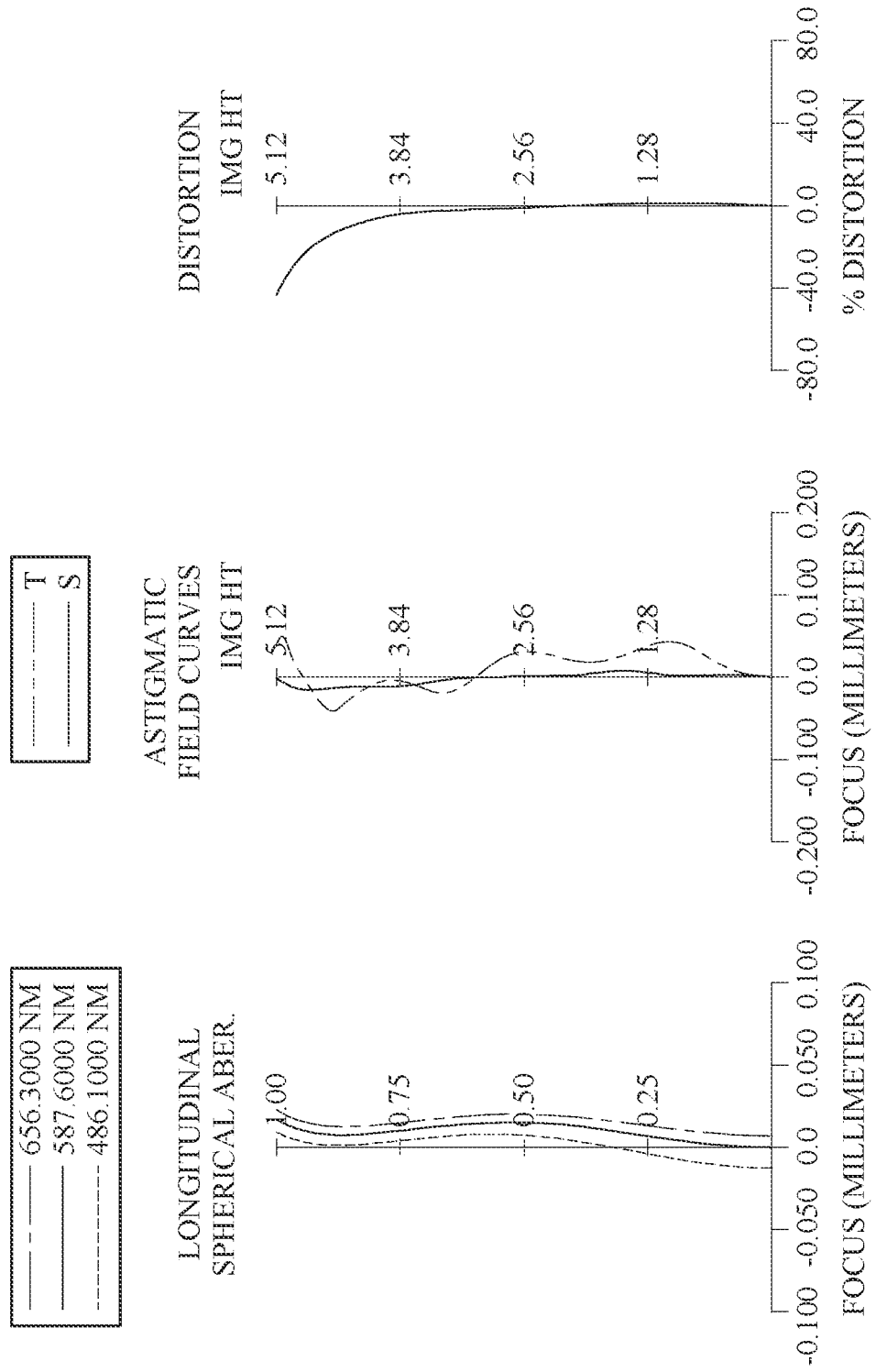
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a stop S1, a fourth lens element E4, a fifth lens element E5, a sixth lens element E6, a seventh lens element E7, an eighth lens element E8, a filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with positive refractive power has an object-side surface being concave in a paraxial region thereof and an image-side surface being convex in a paraxial region thereof. The seventh lens element E7 is made of plastic material and has the object-side surface and the image-side surface being both aspheric.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 6th embodiment are shown in Table 6A and the aspheric surface data are shown in Table 6B below.

TABLE 6A

6th Embodiment
f = 2.45 mm, Fno = 2.25, HFOV = 74.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.0843 | (ASP) | 0.441 | Plastic | 1.545 | 56.1 | −3.54 |
| 2 | | 3.7953 | (ASP) | 0.647 | | | | |

TABLE 6A-continued

6th Embodiment
f = 2.45 mm, Fno = 2.25, HFOV = 74.8 deg.

| Surface # | | Curvature Radius | | Thickness | Material | Index | Abbe # | Focal Length |
|---|---|---|---|---|---|---|---|---|
| 3 | Lens 2 | 2.1653 | (ASP) | 0.595 | Plastic | 1.614 | 25.6 | 6.75 |
| 4 | | 4.0612 | (ASP) | 0.453 | | | | |
| 5 | Ape. Stop | Plano | | −0.048 | | | | |
| 6 | Lens 3 | 3.4342 | (ASP) | 1.113 | Plastic | 1.544 | 56.0 | 3.03 |
| 7 | | −2.8000 | (ASP) | −0.182 | | | | |
| 8 | Stop | Plano | | 0.465 | | | | |
| 9 | Lens 4 | −15.6031 | (ASP) | 0.290 | Plastic | 1.686 | 18.4 | −6.34 |
| 10 | | 6.0812 | (ASP) | 0.079 | | | | |
| 11 | Lens 5 | −6.3193 | (ASP) | 1.059 | Plastic | 1.544 | 56.0 | 2.99 |
| 12 | | −1.3699 | (ASP) | 0.030 | | | | |
| 13 | Lens 6 | −11.5095 | (ASP) | 0.525 | Plastic | 1.686 | 18.4 | 20.04 |
| 14 | | −6.3820 | (ASP) | 0.030 | | | | |
| 15 | Lens 7 | −6.2016 | (ASP) | 0.395 | Plastic | 1.566 | 37.4 | 9.27 |
| 16 | | −2.9077 | (ASP) | 0.030 | | | | |
| 17 | Lens 8 | 2.1054 | (ASP) | 0.417 | Plastic | 1.686 | 18.4 | −2.99 |
| 18 | | 0.9559 | (ASP) | 0.900 | | | | |
| 19 | Filter | Plano | | 0.210 | Glass | 1.517 | 64.2 | — |
| 20 | | Plano | | 0.289 | | | | |
| 21 | Image | Plano | | — | | | | |

Note:
Reference wavelength is 587.6 nm (d-line).
An effective radius of the stop S1 (Surface 8) is 1.043 mm.

TABLE 6B

Aspheric Coefficients

| Surface # | 1 | 2 | 3 | 4 |
|---|---|---|---|---|
| k= | −6.28604E+01 | 0.00000E+00 | 0.00000E+00 | 0.00000E+00 |
| A4= | 6.679876723E−02 | 1.826631401E−01 | 2.675489646E−02 | 7.514930736E−02 |
| A6= | −3.756684338E−02 | −1.369827331E−01 | 2.894077521E−02 | 4.946491483E−02 |
| A8= | 1.491443498E−02 | 9.506570565E−02 | −6.056645186E−02 | −1.205291875E−01 |
| A10= | −4.136120117E−03 | −5.753009218E−02 | 1.227872349E−01 | 5.613445724E−01 |
| A12= | 7.857384705E−04 | 3.140872932E−02 | −1.144406679E−01 | −1.172813622E+00 |
| A14= | −9.981056897E−05 | −1.339186256E−02 | 4.862157180E−02 | 1.342773890E+00 |
| A16= | 8.078918077E−06 | 3.535078686E−03 | 8.411530355E−04 | −7.869204078E−01 |
| A18= | −3.760653776E−07 | −4.881392155E−04 | −8.090096386E−03 | 1.761583137E−01 |
| A20= | 7.655622397E−09 | 2.669964891E−05 | 1.856639825E−03 | — |

| Surface # | 6 | 7 | 9 | 10 |
|---|---|---|---|---|
| k= | −2.60140E+00 | 2.83649E+00 | −4.72359E+01 | 0.00000E+00 |
| A4= | 1.812473094E−02 | −7.229068576E−02 | −2.818477555E−01 | −2.017932559E−01 |
| A6= | 3.841572672E−02 | 5.548793916E−02 | 6.866118369E−02 | 4.766878036E−02 |
| A8= | −2.405638252E−01 | −1.864138584E−01 | 4.269354871E−01 | 1.993132758E−01 |
| A10= | 5.342199219E−01 | 2.692769953E−01 | −1.636871503E+00 | −4.130361415E−01 |
| A12= | −6.244924043E−01 | −2.323488131E−01 | 2.598083325E+00 | 4.058724514E−01 |
| A14= | 2.169232891E−01 | 2.073788937E−02 | −2.193194070E+00 | −2.262679835E−01 |
| A16= | — | 9.687478124E−02 | 8.977480660E−01 | 6.945853625E−02 |
| A18= | — | −4.757319939E−02 | −1.300320804E−01 | −1.002618612E−02 |
| A20= | — | — | — | 4.117002121E−04 |

| Surface # | 11 | 12 | 13 | 14 |
|---|---|---|---|---|
| k= | 8.55230E+00 | −2.78407E+00 | 0.00000E+00 | 0.00000E+00 |
| A4= | 2.840977363E−02 | −1.616027631E−01 | −1.709057313E−01 | −1.119543806E−01 |
| A6= | −1.750097625E−01 | 6.310265781E−01 | 7.946728684E−01 | 2.699362218E−01 |
| A8= | 3.591417404E−01 | −1.263305390E+00 | −1.590738090E+00 | −3.127185950E−01 |
| A10= | −3.785462629E−01 | 1.273217209E+00 | 1.936704324E+00 | 2.065613784E−01 |
| A12= | 2.110479255E−01 | −4.739639600E−01 | −1.625016816E+00 | −8.380402909E−02 |
| A14= | −3.529478882E−02 | −4.192676840E−01 | 9.880912094E−01 | 2.186441201E−02 |
| A16= | −2.938073378E−02 | 7.468607576E−01 | −4.437650078E−01 | −3.851196212E−03 |
| A18= | 2.142018614E−02 | −5.598190335E−01 | 1.476096879E−01 | 5.110171228E−04 |
| A20= | −6.179374711E−03 | 2.608698232E−01 | −3.609616343E−02 | −6.425644746E−05 |

TABLE 6B-continued

| Aspheric Coefficients | | | | |
|---|---|---|---|---|
| A22= | 8.557375537E−04 | −8.089459596E−02 | 6.374425171E−03 | 8.577448037E−06 |
| A24= | −4.762443722E−05 | 1.669883293E−02 | −7.868529522E−04 | −9.720074223E−07 |
| A26= | — | −2.202728705E−03 | 6.408680633E−05 | 7.380189400E−08 |
| A28= | — | 1.677598097E−04 | −3.080590648E−06 | −3.186089777E−09 |
| A30= | — | −5.602810182E−06 | 6.595142925E−08 | 5.889057963E−11 |

| Surface # | 15 | 16 | 17 | 18 |
|---|---|---|---|---|
| k= | 9.01160E−01 | −1.50660E+01 | −1.35894E+01 | −3.41645E+00 |
| A4= | 7.384094519E−03 | 7.469247933E−02 | −2.864285198E−02 | −8.483208808E−02 |
| A6= | 1.339591227E−03 | −5.653730466E−02 | −3.793974045E−02 | 1.727428779E−02 |
| A8= | −1.113495255E−02 | 1.340367215E−02 | 1.475366350E−02 | 4.471580981E−03 |
| A10= | 1.266419732E−02 | 4.248814410E−03 | 4.712804150E−03 | −4.395546471E−03 |
| A12= | −8.722312217E−03 | −3.752505588E−03 | −4.719219029E−03 | 1.572224739E−03 |
| A14= | 3.999888697E−03 | 1.186878915E−03 | 1.598399123E−03 | −3.428681165E−04 |
| A16= | −1.253630010E−03 | −2.201894791E−04 | −3.205724304E−04 | 5.003807831E−05 |
| A18= | 2.733420346E−04 | 2.632456164E−05 | 4.289878236E−05 | −5.019036065E−06 |
| A20= | −4.182846514E−05 | −2.058859815E−06 | −3.992703145E−06 | 3.458039085E−07 |
| A22= | 4.476400855E−06 | 1.020283835E−07 | 2.606542761E−07 | −1.598343812E−08 |
| A24= | −3.282046710E−07 | −2.909616790E−09 | −1.174313606E−08 | 4.676419404E−10 |
| A26= | 1.571404141E−08 | 3.636449460E−11 | 3.484349203E−10 | −7.539847076E−12 |
| A28= | −4.426860746E−10 | — | −6.134623355E−12 | 4.026666326E−14 |
| A30= | 5.564869721E−12 | — | 4.857756105E−14 | 2.706682443E−16 |

In the 6th embodiment, the equation of the aspheric surface profiles of the aforementioned lens elements is the same as the equation of the 1st embodiment. Also, the definitions of these parameters shown in the following Table 60 are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Values of Conditional Expressions | | | |
|---|---|---|---|
| f [mm] | 2.45 | |f1/f2| | 0.52 |
| Fno | 2.25 | |f8/f6| + |f8/f7| | 0.47 |
| HFOV [deg.] | 74.8 | f/f1 | −0.69 |
| (V1 + V3 + V5 + V7)/ (V2 + V4 + V6 + V8) | 2.54 | f/R3 | 1.13 |
| ΣAT/T23 | 3.71 | f12/f | −3.49 |
| CT2/T12 | 0.92 | f3/R6 | −1.08 |
| T23/T34 | 1.43 | f4/f5 | −2.12 |
| TL/EPD | 7.12 | ImgH/f | 2.09 |
| TL/ImgH | 1.51 | Y11/Y82 | 0.70 |
| R1/f | −1.67 | Ymax/Ymin | 5.60 |
| R5/f | 1.40 | Yc11/Y11 | 0.33 |
| R5/R4 | 0.85 | Yc81/Y81 | 0.27 |
| (R9/f) + (R10/f) | −3.14 | Yc82/Y82 | 0.47 |
| (R15/f) + (R16/f) | 1.25 | — | — |

7th Embodiment

Figure 13:
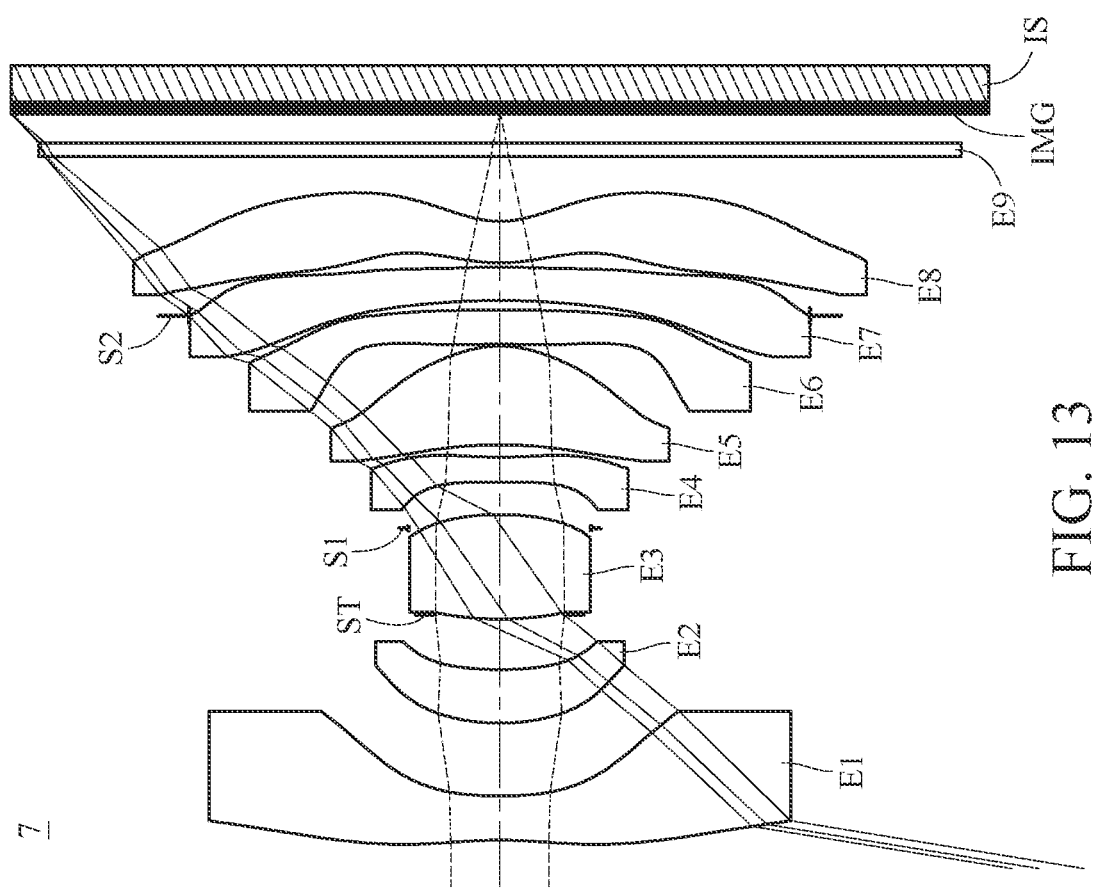
FIG. 13 is a schematic view of an image capturing unit according to the 7th embodiment of the present disclosure.
Figure 14:
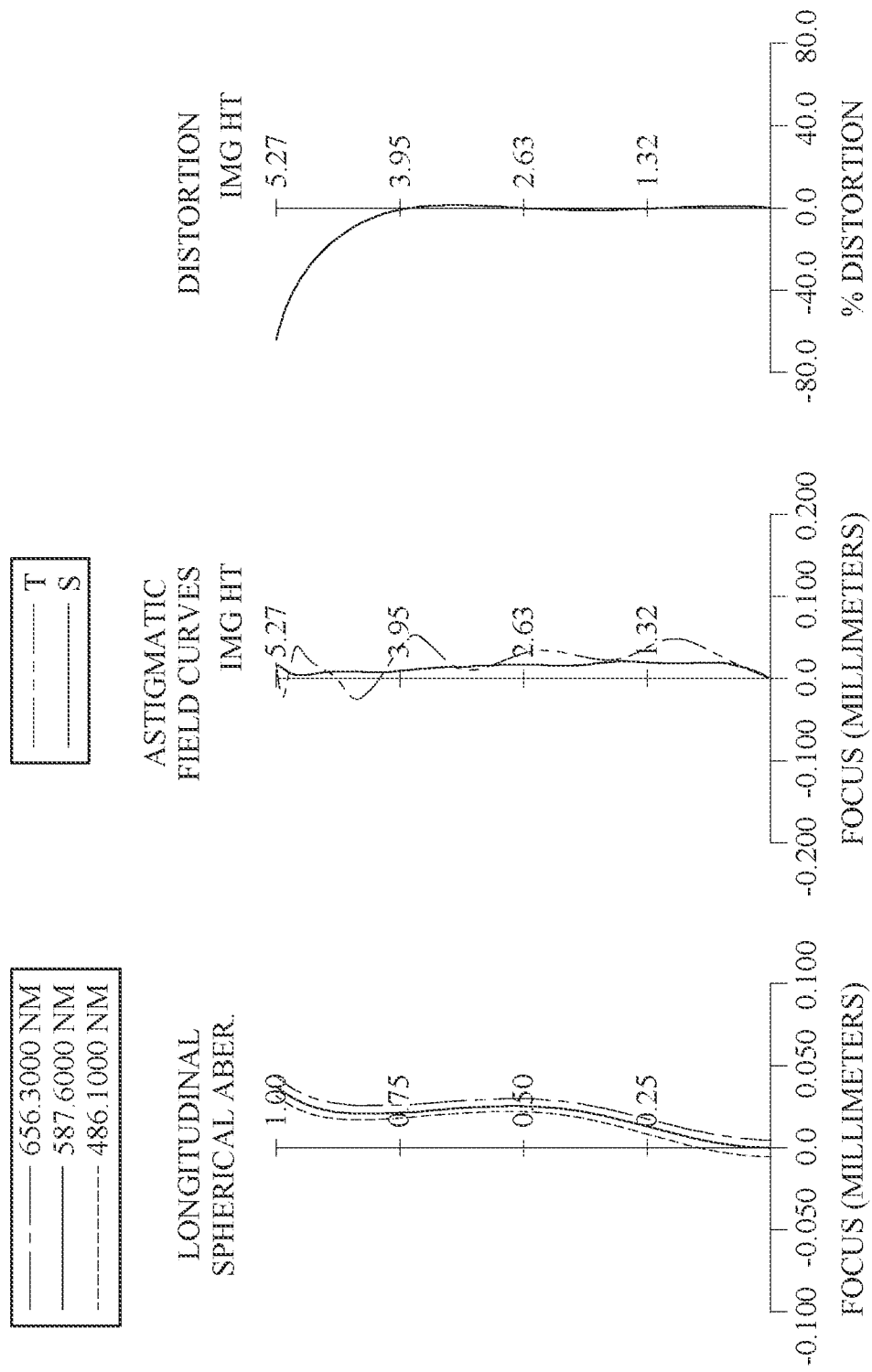
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a stop S1, a fourth lens element E4, a fifth lens element E5, a sixth lens element E6, a seventh lens element E7, a stop S2, an eighth lens element E8, a filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of glass material and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric. The object-side surface of the sixth lens element E6 has two critical points in an off-axis region thereof. The image-side surface of the sixth lens element E6 has one critical point in an off-axis region thereof.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens system. The image sensor IS is disposed on or near the image surface MG of the imaging optical lens system.

The detailed optical data of the 7th embodiment are shown in Table 7A and the aspheric surface data are shown in Table 7B below.

TABLE 7A

7th Embodiment
f = 2.39 mm, Fno = 2.25, HFOV = 80.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.2915 | (ASP) | 0.476 | Plastic | 1.545 | 56.1 | −3.95 |
| 2 | | 4.4965 | (ASP) | 0.789 | | | | |
| 3 | Lens 2 | 2.3878 | (ASP) | 0.577 | Plastic | 1.587 | 28.3 | 8.78 |
| 4 | | 4.0510 | (ASP) | 0.591 | | | | |
| 5 | Ape. Stop | Plano | | −0.046 | | | | |
| 6 | Lens 3 | 3.4102 | (ASP) | 1.130 | Glass | 1.589 | 61.2 | 2.85 |
| 7 | | −2.9112 | (ASP) | −0.148 | | | | |
| 8 | Stop | Plano | | 0.498 | | | | |
| 9 | Lens 4 | 50.4870 | (ASP) | 0.270 | Plastic | 1.660 | 20.4 | −7.39 |
| 10 | | 4.4358 | (ASP) | 0.132 | | | | |
| 11 | Lens 5 | −6.0899 | (ASP) | 1.068 | Plastic | 1.544 | 56.0 | 2.67 |
| 12 | | −1.2457 | (ASP) | 0.020 | | | | |
| 13 | Lens 6 | −16.7917 | (ASP) | 0.371 | Plastic | 1.686 | 18.4 | −22.86 |
| 14 | | 239.8082 | (ASP) | 0.102 | | | | |
| 15 | Lens 7 | −7.9596 | (ASP) | 0.360 | Plastic | 1.614 | 25.6 | −206.79 |
| 16 | | −8.6379 | (ASP) | −0.527 | | | | |
| 17 | Stop | Plano | | 0.572 | | | | |
| 18 | Lens 8 | 1.6630 | (ASP) | 0.449 | Plastic | 1.705 | 14.0 | −4.68 |
| 19 | | 0.9824 | (ASP) | 0.700 | | | | |
| 20 | Filter | Plano | | 0.145 | Glass | 1.517 | 64.2 | — |
| 21 | | Plano | | 0.317 | | | | |
| 22 | Image | Plano | | — | | | | |

Note:
Reference wavelength is 587.6 nm (d-line).
An effective radius of the stop S1 (Surface 8) is 0.986 mm.
An effective radius of the stop S2 (Surface 17) is 3.349 mm.

TABLE 7B

Aspheric Coefficients

| Surface # | 1 | 2 | 3 | 4 |
|---|---|---|---|---|
| k= | −4.40074E+01 | 0.00000E+00 | 0.00000E+00 | 0.00000E+00 |
| A4= | 5.495316075E−02 | 1.204388229E−01 | 3.231216126E−02 | 8.683631278E−02 |
| A6= | −2.531061989E−02 | −2.867290552E−02 | 6.518250521E−02 | 5.275828358E−02 |
| A8= | 8.485800567E−03 | −2.480568239E−02 | −1.431966180E−01 | −9.033162663E−02 |
| A10= | −2.072164185E−03 | 3.919678391E−02 | 2.697130286E−01 | 3.413520413E−01 |
| A12= | 3.517048386E−04 | −2.443754693E−02 | −3.070658399E−01 | −6.082944377E−01 |
| A14= | −3.999021856E−05 | 7.950659252E−03 | 2.136215894E−01 | 6.418491838E−01 |
| A16= | 2.895438640E−06 | −1.403323864E−03 | −8.470230396E−02 | −3.716369107E−01 |
| A18= | −1.204524341E−07 | 1.264916554E−04 | 1.590215088E−02 | 8.328107015E−02 |
| A20= | 2.188290683E−09 | −4.519288481E−06 | −9.057535074E−04 | — |

| Surface # | 6 | 7 | 9 | 10 |
|---|---|---|---|---|
| k= | −3.17174E+00 | 1.81150E+00 | −9.00000E+01 | 0.00000E+00 |
| A4= | 1.562376108E−02 | −4.347563374E−02 | −2.237654847E−01 | −2.114800220E−01 |
| A6= | 3.348946623E−02 | −5.796115307E−02 | −1.466802594E−02 | 1.570895526E−01 |

TABLE 7B-continued

| Aspheric Coefficients | | | | |
|---|---|---|---|---|
| A8= | −2.327864319E−01 | 2.280509581E−01 | 3.485519210E−01 | −1.459001692E−01 |
| A10= | 5.172101292E−01 | −7.158316054E−01 | −1.105100807E+00 | 1.264205213E−01 |
| A12= | −5.964350369E−01 | 1.268998478E+00 | 1.597878930E+00 | −7.142498101E−02 |
| A14= | 2.226659496E−01 | −1.354767268E+00 | −1.250888735E+00 | 1.988644409E−02 |
| A16= | — | 7.885223095E−01 | 4.695204323E−01 | −2.295833761E−03 |
| A18= | — | −1.931039824E−01 | −5.763513651E−02 | 6.086716172E−04 |
| A20= | — | — | — | −1.799791197E−04 |

| Surface # | 11 | 12 | 13 | 14 |
|---|---|---|---|---|
| k= | 5.00046E+00 | −3.24580E+00 | 0.00000E+00 | 0.00000E+00 |
| A4= | −8.994400729E−02 | −1.355360795E−01 | −8.363011316E−02 | −1.887407066E−01 |
| A6= | 2.861097809E−01 | 6.895660045E−01 | 8.090720074E−01 | 5.518974231E−01 |
| A8= | −7.768335370E−01 | −1.710785235E+00 | −1.877223600E+00 | −8.499269209E−01 |
| A10= | 1.462819129E+00 | 2.245536507E+00 | 2.392186178E+00 | 7.688226004E−01 |
| A12= | −1.733318401E+00 | −1.748474642E+00 | −2.024312318E+00 | −4.449941207E−01 |
| A14= | 1.336528967E+00 | 7.790425908E−01 | 1.231113418E+00 | 1.739943717E−01 |
| A16= | −6.887893564E−01 | −1.053379841E−01 | −5.580996495E−01 | −4.752506225E−02 |
| A18= | 2.369486533E−01 | −1.016868722E−01 | 1.906416349E−01 | 9.221764787E−03 |
| A20= | −5.238340505E−02 | 7.898656012E−02 | −4.875519311E−02 | −1.273509091E−03 |
| A22= | 6.727624136E−03 | −2.920766096E−02 | 9.143516052E−03 | 1.234370281E−04 |
| A24= | −3.801456022E−04 | 6.588640376E−03 | −1.212072677E−03 | −8.113599595E−06 |
| A26= | — | −9.193871089E−04 | 1.067879347E−04 | 3.378907347E−07 |
| A28= | — | 7.307607350E−05 | −5.576053296E−06 | −7.756778034E−09 |
| A30= | — | −2.532589509E−06 | 1.299306473E−07 | 6.863132873E−11 |

| Surface # | 15 | 16 | 18 | 19 |
|---|---|---|---|---|
| k= | 1.77186E+00 | −1.17855E+01 | −1.61792E+01 | −4.73689E+00 |
| A4= | −2.154245830E−03 | 5.952809113E−02 | −1.713013295E−02 | −7.696557131E−02 |
| A6= | 1.160457595E−02 | −9.654714381E−03 | −1.000114370E−01 | 1.932454107E−04 |
| A8= | −1.403999743E−03 | −3.464890223E−02 | 8.069483113E−02 | 1.761859919E−02 |
| A10= | −1.001608287E−02 | 2.915636779E−02 | −3.215336703E−02 | −9.954531977E−03 |
| A12= | 8.576786252E−03 | −1.145358960E−02 | 8.532734129E−03 | 3.079907138E−03 |
| A14= | −3.418614983E−03 | 2.722800434E−03 | −1.706287074E−03 | −6.235886311E−04 |
| A16= | 7.773840930E−04 | −4.252382536E−04 | 2.707969057E−04 | 8.711786882E−05 |
| A18= | −9.985403439E−05 | 4.484738505E−05 | −3.410568253E−05 | −8.540696746E−06 |
| A20= | 4.987279453E−06 | −3.176866212E−06 | 3.310223959E−06 | 5.858345673E−07 |
| A22= | 4.917815069E−07 | 1.452193540E−07 | −2.380862061E−07 | −2.750648797E−08 |
| A24= | −1.052015960E−07 | −3.875400912E−09 | 1.212835003E−08 | 8.414964281E−10 |
| A26= | 8.065150067E−09 | 4.587524123E−11 | −4.109525823E−10 | −1.511356016E−11 |
| A28= | −3.048652729E−10 | — | 8.276506272E−12 | 1.217496860E−13 |
| A30= | 4.715023533E−12 | — | −7.480680846E−14 | −3.081015453E−17 |

In the 7th embodiment, the equation of the aspheric surface profiles of the aforementioned lens elements is the same as the equation of the 1 st embodiment. Also, the definitions of these parameters shown in the following Table 70 are the same as those stated in the 1 st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Values of Conditional Expressions | | | |
|---|---|---|---|
| f [mm] | 2.39 | \|f1/f2\| | 0.45 |
| Fno | 2.25 | \|f8/f6\| + \|f8/f7\| | 0.23 |
| HFOV [deg.] | 80.8 | f/f1 | −0.60 |
| (V1 + V3 + V5 + V7)/ (V2 + V4 + V6 + V8) | 2.45 | f/R3 | 1.00 |
| ΣAT/T23 | 3.64 | f12/f | −3.35 |
| CT2/T12 | 0.73 | f3/R6 | −0.98 |
| T23/T34 | 1.56 | f4/f5 | −2.77 |
| TL/EPD | 7.40 | ImgH/f | 2.21 |
| TL/ImgH | 1.49 | Y11/Y82 | 0.79 |
| R1/f | −1.80 | Ymax/Ymin | 5.52 |

TABLE 7C-continued

| Values of Conditional Expressions | | | |
|---|---|---|---|
| R5/f | 1.43 | Yc11/Y11 | 0.33 |
| R5/R4 | 0.84 | Yc81/Y81 | 0.26 |
| (R9/f) + (R10/f) | −3.08 | Yc82/Y82 | 0.40 |
| (R15/f) + (R16/f) | 1.11 | — | — |

8th Embodiment

Figure 15:
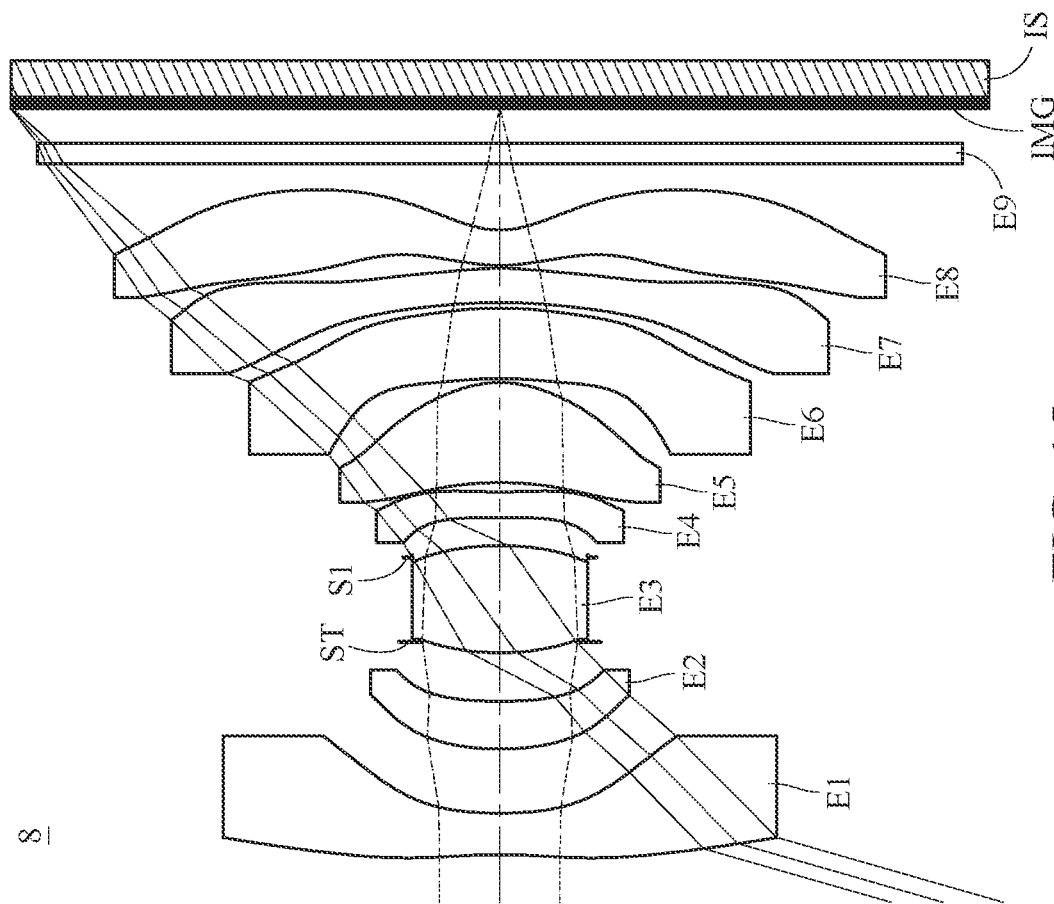
FIG. 15 is a schematic view of an image capturing unit according to the 8th embodiment of the present disclosure.
Figure 16:
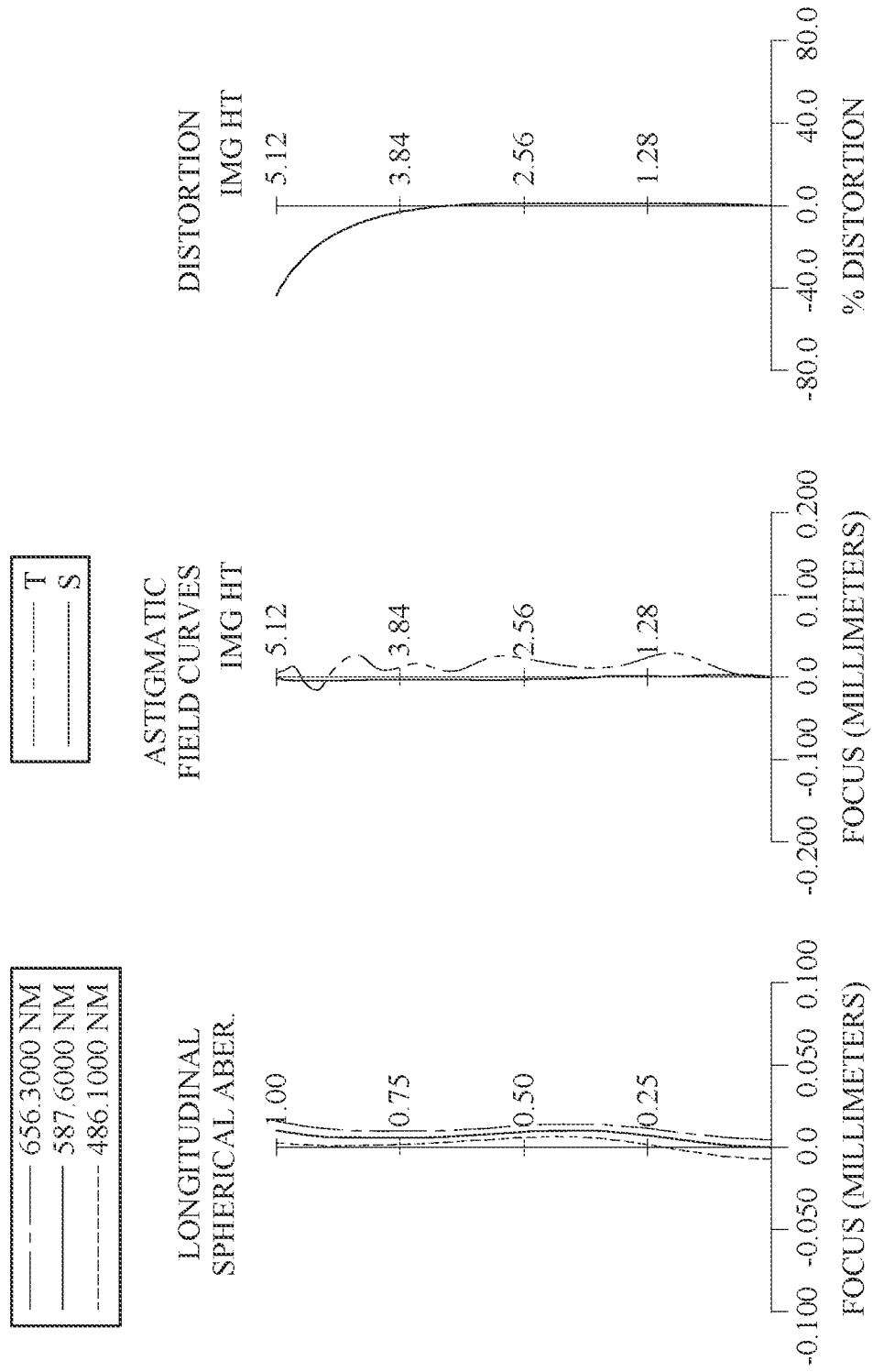
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a stop S1, a fourth lens element E4, a fifth lens element E5, a sixth lens element E6, a seventh lens element E7, an eighth lens element E8, a filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with positive refractive power has an object-side surface being concave in a paraxial region thereof and an image-side surface being convex in a paraxial region thereof. The seventh lens element E7 is made of plastic material and has the object-side surface and the image-side surface being both aspheric. The image-side surface of the seventh lens element E7 has two critical points in an off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has one critical point in an off-axis region thereof. The image-side surface of the eighth lens element E8 has one critical point in an off-axis region thereof.

The filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 8th embodiment are shown in Table 8A and the aspheric surface data are shown in Table 8B below.

TABLE 8A

8th Embodiment
f = 2.60 mm, Fno = 2.06, HFOV = 74.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.9239 | (ASP) | 0.435 | Plastic | 1.545 | 56.1 | −4.31 |
| 2 | | 4.6341 | (ASP) | 0.674 | | | | |
| 3 | Lens 2 | 2.9436 | (ASP) | 0.500 | Plastic | 1.614 | 25.6 | 10.32 |
| 4 | | 5.1385 | (ASP) | 0.619 | | | | |
| 5 | Ape. Stop | Plano | | −0.110 | | | | |
| 6 | Lens 3 | 2.7514 | (ASP) | 1.124 | Plastic | 1.544 | 56.0 | 2.84 |
| 7 | | −3.0251 | (ASP) | −0.122 | | | | |
| 8 | Stop | Plano | | 0.416 | | | | |
| 9 | Lens 4 | 146.8109 | (ASP) | 0.270 | Plastic | 1.686 | 18.4 | −9.17 |
| 10 | | 6.0290 | (ASP) | 0.098 | | | | |
| 11 | Lens 5 | −3.8295 | (ASP) | 1.050 | Plastic | 1.544 | 56.0 | 3.07 |
| 12 | | −1.2765 | (ASP) | 0.041 | | | | |
| 13 | Lens 6 | −5.4177 | (ASP) | 0.738 | Plastic | 1.686 | 18.4 | −267.69 |
| 14 | | −5.8918 | (ASP) | 0.061 | | | | |
| 15 | Lens 7 | −6.3533 | (ASP) | 0.360 | Plastic | 1.587 | 28.3 | 8.95 |
| 16 | | −2.9364 | (ASP) | 0.030 | | | | |
| 17 | Lens 8 | 1.7549 | (ASP) | 0.370 | Plastic | 1.686 | 18.4 | −2.90 |
| 18 | | 0.8530 | (ASP) | 0.700 | | | | |
| 19 | Filter | Plano | | 0.210 | Glass | 1.517 | 64.2 | — |
| 20 | | Plano | | 0.364 | | | | |
| 21 | Image | Plano | | — | | | | |

Note:
Reference wavelength is 587.6 nm (d-line).
An effective radius of the stop S1 (Surface 8) is 0.919 mm.

TABLE 8B

Aspheric Coefficients

| Surface # | 1 | 2 | 3 | 4 |
|---|---|---|---|---|
| k= | −6.89576E+01 | 0.00000E+00 | 0.00000E+00 | 0.00000E+00 |
| A4= | 5.179882542E−02 | 1.342488344E−01 | 5.580856239E−02 | 9.873322786E−02 |
| A6= | −2.366624037E−02 | −6.818369543E−02 | 3.526740318E−02 | 4.927595991E−02 |
| A8= | 7.472626318E−03 | 3.238228200E−02 | −5.939315725E−02 | −3.162884022E−02 |
| A10= | −1.769588162E−03 | −8.062710270E−03 | 1.280315704E−01 | 5.949947148E−02 |
| A12= | 3.077127646E−04 | −3.062249962E−03 | −1.759551255E−01 | −4.596026102E−02 |
| A14= | −3.726726170E−05 | 2.590623475E−03 | 1.487432450E−01 | 4.604537339E−02 |
| A16= | 2.932745336E−06 | −6.689080854E−04 | −7.325712137E−02 | −4.554445654E−02 |
| A18= | −1.338182498E−07 | 7.591769740E−05 | 1.813301328E−02 | 1.449445610E−02 |
| A20= | 2.675364783E−09 | −3.176209759E−06 | −1.678819048E−03 | — |

| Surface # | 6 | 7 | 9 | 10 |
|---|---|---|---|---|
| k= | −1.91206E−02 | −7.56567E−01 | 0.00000E+00 | 0.00000E+00 |
| A4= | 2.944570913E−02 | −5.425156597E−02 | −2.607665863E−01 | −2.560220073E−01 |
| A6= | 2.994725360E−02 | 5.116858006E−02 | 1.766270578E−01 | 2.683075900E−01 |
| A8= | −1.162198969E−01 | −1.614899191E−01 | −3.842751654E−01 | −3.268994508E−01 |
| A10= | 2.126791157E−01 | 3.567661954E−01 | 4.681438655E−01 | 2.404102990E−01 |
| A12= | −2.072117079E−01 | −5.457769683E−01 | −3.934516340E−01 | −7.914146905E−02 |
| A14= | 7.424754047E−02 | 4.868357158E−01 | 2.181548407E−01 | −4.455783146E−03 |
| A16= | — | −2.360259451E−01 | −1.145661213E−01 | 6.778344136E−03 |
| A18= | — | 4.682193385E−02 | 4.079761706E−02 | 1.686365004E−03 |
| A20= | — | — | — | −9.095131684E−04 |

| Surface # | 11 | 12 | 13 | 14 |
|---|---|---|---|---|
| k= | 1.13750E+00 | −2.51635E+00 | 0.00000E+00 | 0.00000E+00 |
| A4= | −8.167908069E−02 | −2.763764946E−01 | −2.112419496E−01 | −1.919973911E−01 |
| A6= | 1.017398491E−01 | 1.301855817E+00 | 1.275288911E+00 | 5.477566014E−01 |
| A8= | 2.868240884E−01 | −3.318301977E+00 | −3.184066361E+00 | −7.462414602E−01 |
| A10= | −1.112319139E+00 | 5.089366480E+00 | 4.863982147E+00 | 6.195787194E−01 |
| A12= | 1.815529855E+00 | −5.127938121E+00 | −5.115986298E+00 | −3.452260704E−01 |
| A14= | −1.768113005E+00 | 3.486391439E+00 | 3.858195767E+00 | 1.341833700E−01 |
| A16= | 1.107918779E+00 | −1.582760607E+00 | −2.124054552E+00 | −3.708610840E−02 |
| A18= | −4.505561096E−01 | 4.522238632E−01 | 8.576343627E−01 | 7.355774929E−03 |
| A20= | 1.148189131E−01 | −6.560250747E−02 | −2.524896956E−01 | −1.046740704E−03 |
| A22= | −1.662952568E−02 | −1.607395375E−03 | 5.329747000E−02 | 1.056109563E−04 |
| A24= | 1.040378909E−03 | 2.234572302E−03 | −7.816716259E−03 | −7.345528594E−06 |
| A26= | — | −3.030809301E−04 | 7.528501206E−04 | 3.332550545E−07 |
| A28= | — | 8.525762487E−06 | −4.264484340E−05 | −8.816629737E−09 |
| A30= | — | 6.661261502E−07 | 1.073163678E−06 | 1.021545449E−10 |

| Surface # | 15 | 16 | 17 | 18 |
|---|---|---|---|---|
| k= | 1.26527E+00 | −2.53420E+01 | −1.40867E+01 | −4.11811E+00 |
| A4= | −4.823062730E−02 | 1.362786041E−01 | −4.837019219E−02 | −8.526042873E−02 |
| A6= | 1.945881358E−01 | −1.814644642E−01 | −2.631271047E−02 | 3.000271264E−02 |
| A8= | −3.037734337E−01 | 1.192214080E−01 | 1.556271497E−02 | −6.456142922E−03 |
| A10= | 2.677207184E−01 | −4.593402364E−02 | 4.678711404E−04 | 2.480817090E−04 |
| A12= | −1.506071131E−01 | 1.142172262E−02 | −2.320069542E−03 | 4.197051275E−04 |
| A14= | 5.744477239E−02 | −1.927325963E−03 | 8.646946633E−04 | −1.746554442E−04 |
| A16= | −1.539482009E−02 | 2.255067104E−04 | −1.760206928E−04 | 3.833338617E−05 |
| A18= | 2.956118213E−03 | −1.829405132E−05 | 2.339578415E−05 | −5.431215815E−06 |
| A20= | −4.092100058E−04 | 1.006836117E−06 | −2.148466576E−06 | 5.242381179E−07 |
| A22= | 4.053063485E−05 | −3.570437546E−08 | 1.383003116E−07 | −3.489117191E−08 |
| A24= | −2.802655095E−06 | 7.314958129E−10 | −6.158416237E−09 | 1.578666350E−09 |
| A26= | 1.285117239E−07 | −6.527525581E−12 | 1.813313183E−10 | −4.641867477E−11 |
| A28= | −3.510525258E−09 | — | −3.183681235E−12 | 8.004646976E−13 |
| A30= | 4.322619864E−11 | — | 2.527388504E−14 | −6.146004581E−15 |

In the 8th embodiment, the equation of the aspheric surface profiles of the aforementioned lens elements is the same as the equation of the 1st embodiment. Also, the definitions of these parameters shown in the following Table 8C are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

Values of Conditional Expressions

| f [mm] | 2.60 | |f1/f2| | 0.42 |
|---|---|---|---|
| Fno | 2.06 | |f8/f6| + |f8/f7| | 0.34 |
| HFOV [deg.] | 74.0 | f/f1 | −0.60 |
| (V1 + V3 + V5 + V7)/(V2 + V4 + V6 + V8) | 2.43 | f/R3 | 0.88 |
| ΣAT/T23 | 3.35 | f12/f | −3.06 |
| CT2/T12 | 0.74 | f3/R6 | −0.94 |
| T23/T34 | 1.73 | f4/f5 | −2.98 |
| TL/EPD | 6.20 | ImgH/f | 1.97 |

TABLE 8C-continued

Values of Conditional Expressions

| | | | |
|---|---|---|---|
| TL/ImgH | 1.53 | Y11/Y82 | 0.72 |
| R1/f | −1.89 | Ymax/Ymin | 4.90 |
| R5/f | 1.06 | Yc11/Y11 | 0.33 |
| R5/R4 | 0.54 | Yc81/Y81 | 0.27 |
| (R9/f) + (R10/f) | −1.96 | Yc82/Y82 | 0.47 |
| (R15/f) + (R16/f) | 1.00 | — | — |

9th Embodiment

Figure 17:
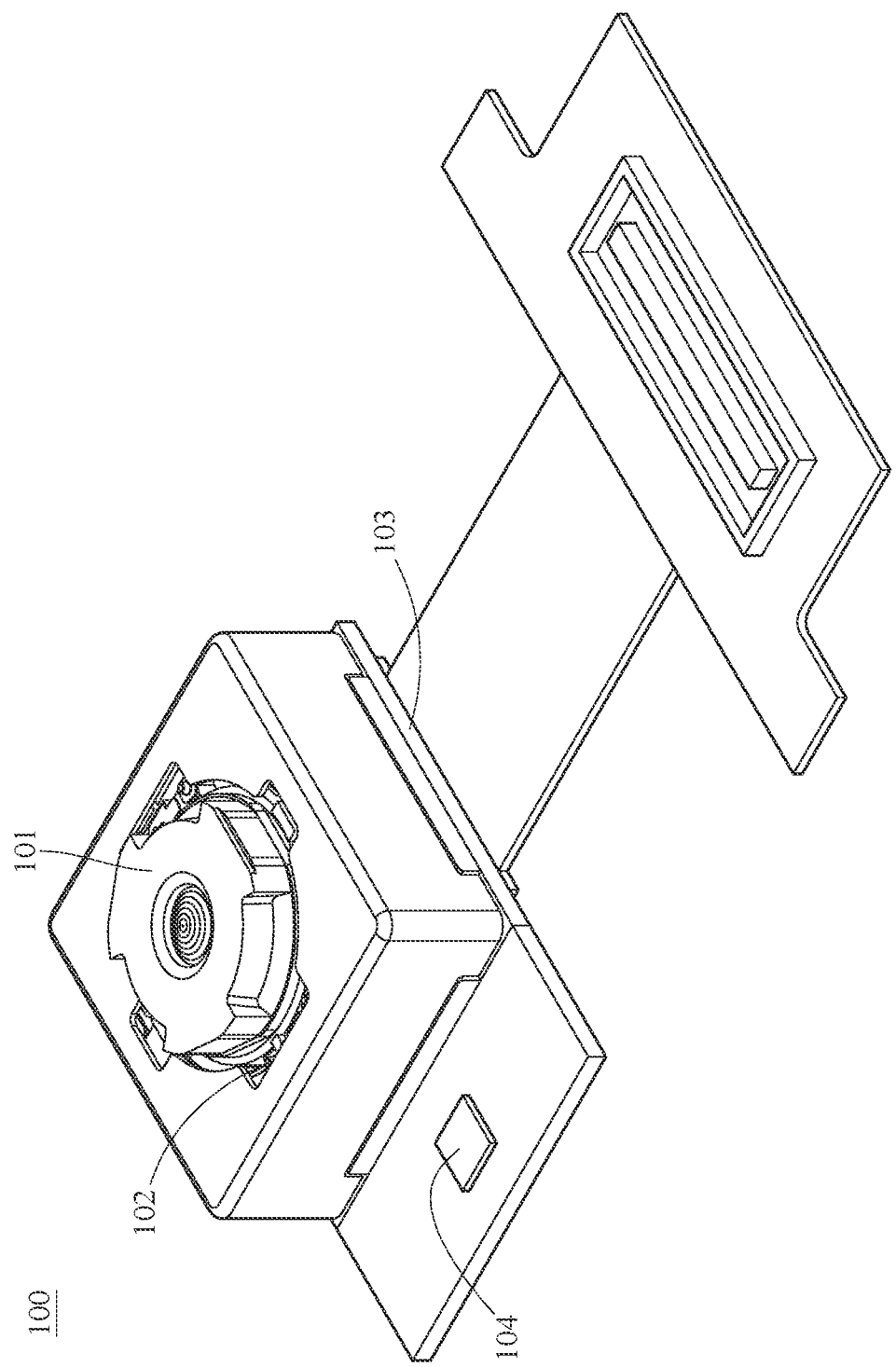
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 100 is a camera module including a lens unit 101, a driving device 102, an image sensor 103 and an image stabilizer 104. The lens unit 101 includes the imaging optical lens system disclosed in the 1st embodiment, a barrel and a holder member (their reference numerals are omitted) for holding the imaging optical lens system. However, the lens unit 101 may alternatively be provided with the imaging optical lens system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, shape memory alloy materials, or liquid lens systems. The driving device 102 is favorable for obtaining a better imaging position of the lens unit 101, so that a clear image of the imaged object can be captured by the lens unit 101 with different object distances or at different ambient temperatures. The image sensor 103 (for example, CCD or CMOS), which can feature high photosensitivity and low noise, is disposed on the image surface of the imaging optical lens system to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

10th Embodiment

Figure 18:
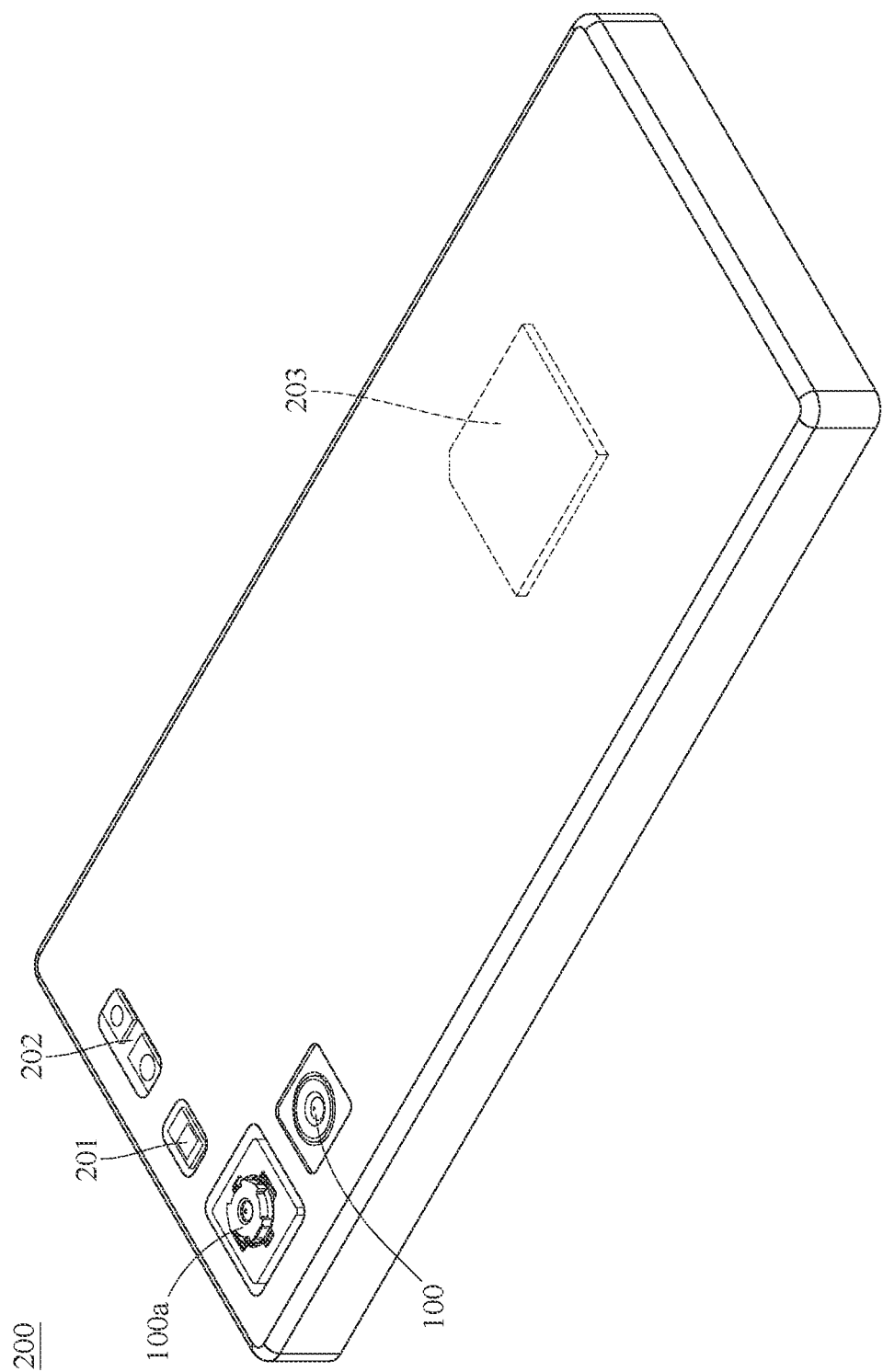
FIG. 18 is one perspective view of an electronic device according to the 10th embodiment of the present disclosure.
Figure 19:
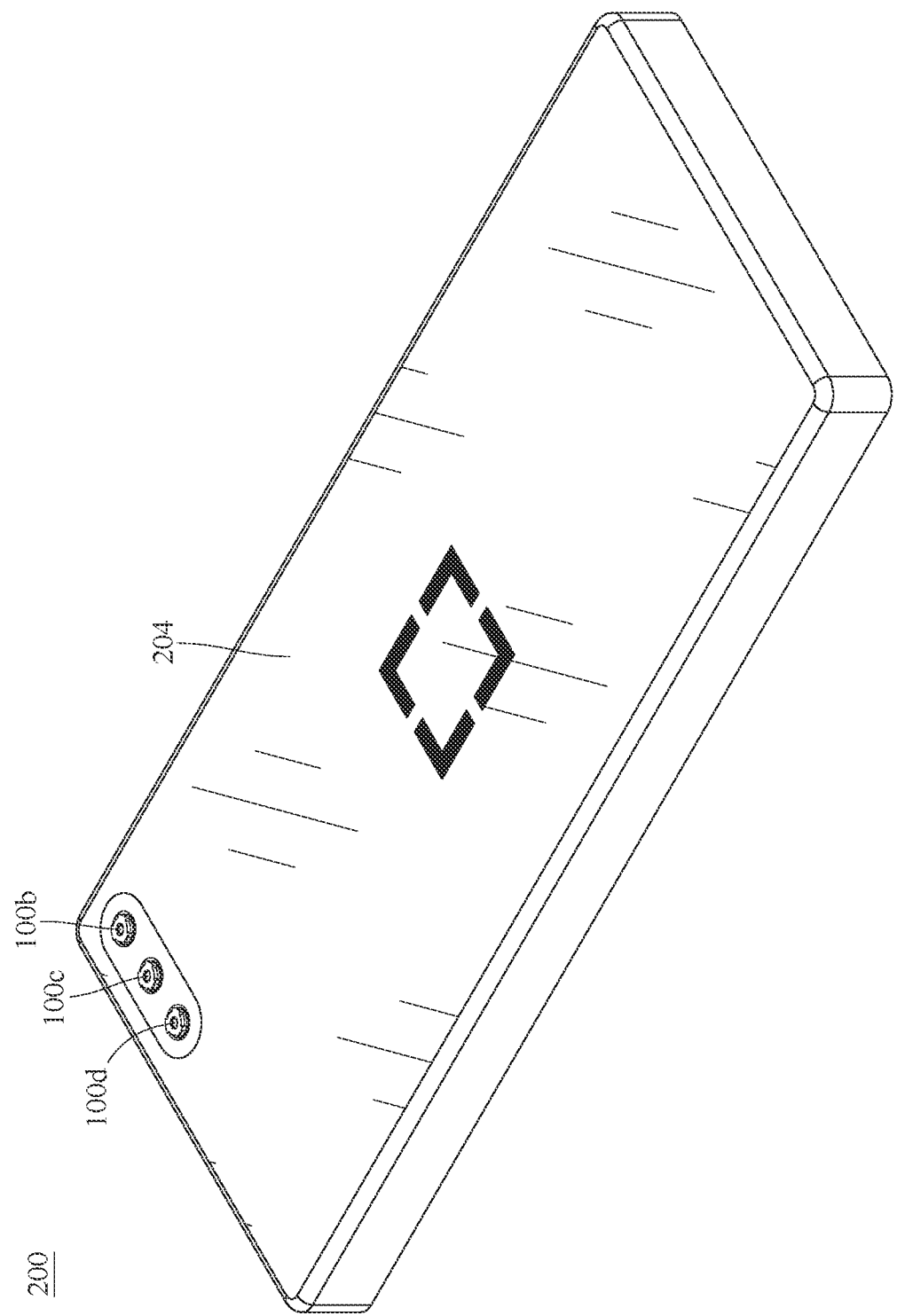
FIG. 19 is another perspective view of the electronic device in FIG. 18.
Figure 20:
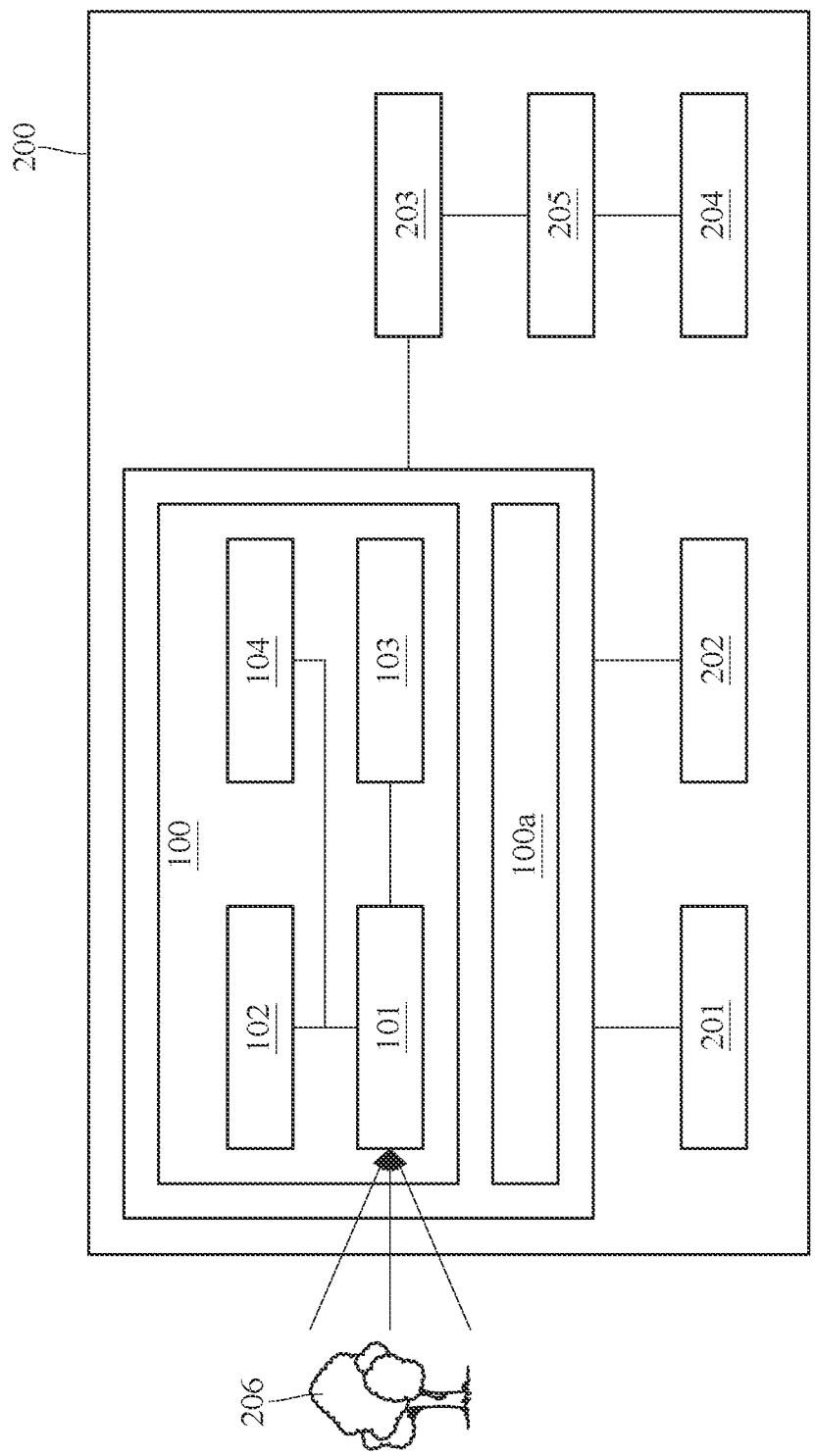
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18.

In this embodiment, an electronic device 200 is a smartphone including the image capturing unit 100 disclosed in the 9th embodiment, an image capturing unit 100a, an image capturing unit 100b, an image capturing unit 100c, an image capturing unit 100d, a flash module 201, a focus assist module 202, an image signal processor 203, a display module 204 and an image software processor 205. The image capturing unit 100 and the image capturing unit 100a are disposed on the same side of the electronic device 200. The focus assist module 202 can be a laser rangefinder or a ToF (time of flight) module, but the present disclosure is not limited thereto. The image capturing unit 100b, the image capturing unit 100c, the image capturing unit 100d and the display module 204 are disposed on the opposite side of the electronic device 200, and the display module 204 can be a user interface, such that the image capturing units 100b, 100c, 100d can be front-facing cameras of the electronic device 200 for taking selfies, but the present disclosure is not limited thereto. Furthermore, each of the image capturing units 100a, 100b, 100c and 100d can include the imaging optical lens system of the present disclosure and can have a configuration similar to that of the image capturing unit 100. In detail, each of the image capturing units 100a, 100b, 100c and 100d can include a lens unit, a driving device, an image sensor and an image stabilizer, and each of the lens unit can include an imaging optical lens system such as the imaging optical lens system of the present disclosure, a barrel and a holder member for holding the imaging optical lens system.

The image capturing unit 100 is an ultra-wide-angle image capturing unit, the image capturing unit 100a is a wide-angle image capturing unit, the image capturing unit 100b is a wide-angle image capturing unit, the image capturing unit 100c is an ultra-wide-angle image capturing unit, and the image capturing unit 100d is a ToF image capturing unit. In this embodiment, the image capturing units 100 and 100a have different fields of view, such that the electronic device 200 can have various magnification ratios so as to meet the requirement of optical zoom functionality. In addition, the image capturing unit 100d can determine depth information of the imaged object. In this embodiment, the electronic device 200 includes multiple image capturing units 100, 100a, 100b, 100c and 100d, but the present disclosure is not limited to the number and arrangement of image capturing units.

When a user captures images of an object 206, the light rays converge in the image capturing unit 100 or the image capturing unit 100a to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100b, 100c or 100d to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

11th Embodiment

Figure 21:
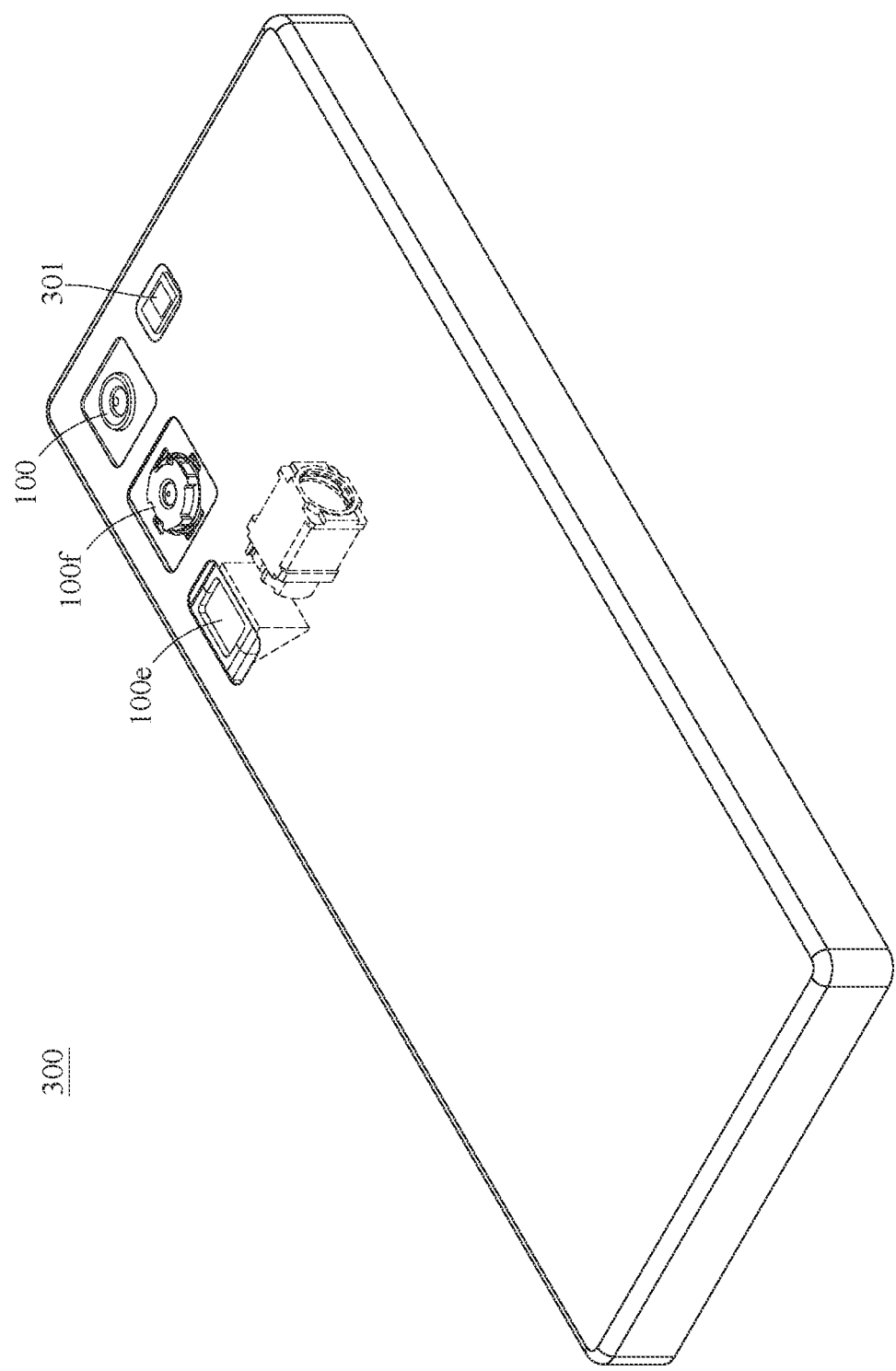
FIG. 21 is one perspective view of an electronic device according to the 11th embodiment of the present disclosure.

FIG. 21 is one perspective view of an electronic device according to the 11th embodiment of the present disclosure.

In this embodiment, an electronic device 300 is a smartphone including the image capturing unit 100 disclosed in the 9th embodiment, an image capturing unit 100e, an image capturing unit 100f, a flash module 301, a focus assist module, an image signal processor, a display module and an image software processor (not shown). The image capturing unit 100, the image capturing unit 100e and the image capturing unit 100f are disposed on the same side of the electronic device 300, while the display module is disposed on the opposite side of the electronic device 300. Furthermore, each of the image capturing units 100e and 100f can include the imaging optical lens system of the present disclosure and can have a configuration similar to that of the image capturing unit 100, and the details in this regard will not be provided again.

The image capturing unit 100 is an ultra-wide-angle image capturing unit, the image capturing unit 100e is a telephoto image capturing unit, and the image capturing unit 100f is a wide-angle image capturing unit. In this embodiment, the image capturing units 100, 100e and 100f have different fields of view, such that the electronic device 300 can have various magnification ratios so as to meet the requirement of optical zoom functionality. Moreover, the image capturing unit 100e can be a telephoto image capturing unit having a light-folding element configuration, such that the total track length of the image capturing unit 100e is not limited by the thickness of the electronic device 300. Moreover, the light-folding element configuration of the image capturing unit 100e can be similar to, for example, one of the structures shown in FIG. 24 to FIG. 26, which can be referred to foregoing descriptions corresponding to FIG. 24 to FIG. 26, and the details in this regard will not be provided again. In this embodiment, the electronic device 300 includes multiple image capturing units 100, 100e and 100f, but the present disclosure is not limited to the number and arrangement of image capturing units. When a user captures images of an object, light rays converge in the image capturing unit 100, 100e or 100f to generate images, and the flash module 301 is activated for light supplement. Further, the subsequent processes are performed in a manner similar to the abovementioned embodiment, so the details in this regard will not be provided again.

12th Embodiment

Figure 22:
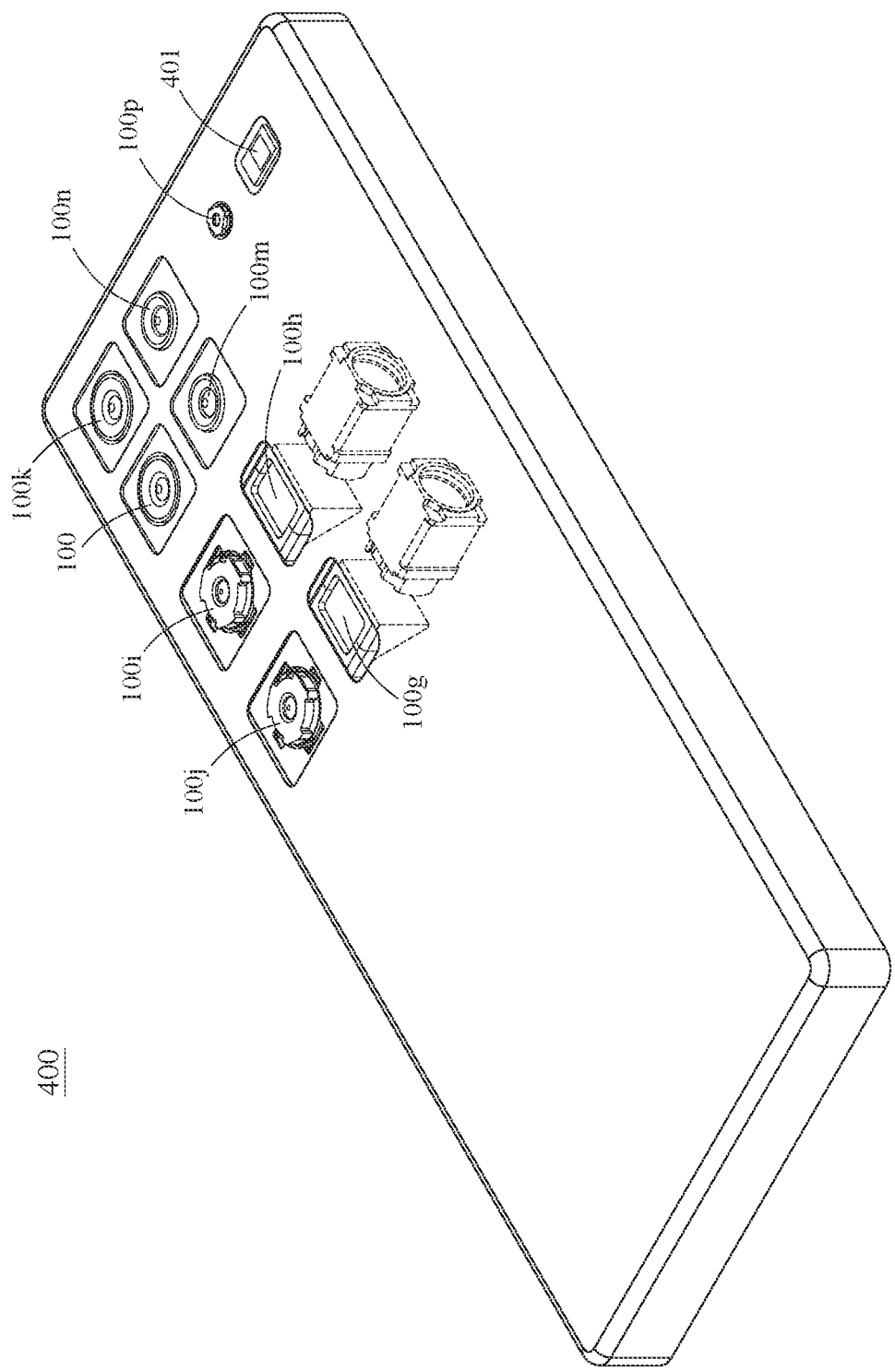
FIG. 22 is one perspective view of an electronic device according to the 12th embodiment of the present disclosure.

FIG. 22 is one perspective view of an electronic device according to the 12th embodiment of the present disclosure.

In this embodiment, an electronic device 400 is a smartphone including the image capturing unit 100 disclosed in the 9th embodiment, an image capturing unit 100g, an image capturing unit 100h, an image capturing unit 100i, an image capturing unit 100j, an image capturing unit 100k, an image capturing unit 100m, an image capturing unit 100n, an image capturing unit 100p, a flash module 401, a focus assist module, an image signal processor, a display module and an image software processor (not shown). The image capturing units 100, 100g, 100h, 100i, 100j, 100k, 100m, 100n and 100p are disposed on the same side of the electronic device 400, while the display module is disposed on the opposite side of the electronic device 400. Furthermore, each of the image capturing units 100g, 100h, 100i, 100j, 100k, 100m, 100n and 100p can include the imaging optical lens system of the present disclosure and can have a configuration similar to that of the image capturing unit 100, and the details in this regard will not be provided again.

The image capturing unit 100 is an ultra-wide-angle image capturing unit, the image capturing unit 100g is a telephoto image capturing unit, the image capturing unit 100h is a telephoto image capturing unit, the image capturing unit 100i is a wide-angle image capturing unit, the image capturing unit 100j is a wide-angle image capturing unit, the image capturing unit 100k is an ultra-wide-angle image capturing unit, the image capturing unit 100m is a telephoto image capturing unit, the image capturing unit 100n is a telephoto image capturing unit, and the image capturing unit 100p is a ToF image capturing unit. In this embodiment, the image capturing units 100, 100g, 100h, 100i, 100j, 100k, 100m and 100n have different fields of view, such that the electronic device 400 can have various magnification ratios so as to meet the requirement of optical zoom functionality. Moreover, each of the image capturing units 100g and 100h can be a telephoto image capturing unit having a light-folding element configuration. Moreover, the light-folding element configuration of each of the image capturing unit 100g and 100k can be similar to, for example, one of the structures shown in FIG. 24 to FIG. 26, which can be referred to foregoing descriptions corresponding to FIG. 24 to FIG. 26, and the details in this regard will not be provided again. In addition, the image capturing unit 100p can determine depth information of the imaged object. In this embodiment, the electronic device 400 includes multiple image capturing units 100, 100g, 100h, 100i, 100j, 100k, 100m, 100n and 100p, but the present disclosure is not limited to the number and arrangement of image capturing units. When a user captures images of an object, the light rays converge in the image capturing unit 100, 100g, 100h, 100i, 100j, 100k, 100m, 100n or 100p to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the imaging optical lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-8C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;

wherein the object-side surface of the first lens element is concave in a paraxial region thereof, the fourth lens element has negative refractive power, the fifth lens element has positive refractive power, the object-side surface of the fifth lens element is concave in a paraxial region thereof, the image-side surface of the fifth lens element is convex in a paraxial region thereof, the image-side surface of the eighth lens element is concave in a paraxial region thereof, and at least one of the object-side surface and the image-side surface of at least one lens element of the imaging optical lens system has at least one critical point in an off-axis region thereof;

wherein a focal length of the first lens element is f1, a focal length of the second lens element is f2, a focal length of the imaging optical lens system is f, a curvature radius of the object-side surface of the fifth lens element is R9, a curvature radius of the image-side surface of the fifth lens element is R10, and the following conditions are satisfied:

$|f1/f2|<0.80$; and $-15<(R9/f)+(R10/f)<-1.2$.

2. The imaging optical lens system of claim 1, wherein the first lens element has negative refractive power, the focal length of the first lens element is f1, the focal length of the second lens element is f2, and the following condition is satisfied:

$|f1/f2|<0.70$.

3. The imaging optical lens system of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, and the following condition is satisfied:

$1.8<(V1+V3+V5+V7)/(V2+V4+V6+V8)<6.0$.

4. The imaging optical lens system of claim 1, wherein a sum of axial distances between each of all adjacent lens elements of the imaging optical lens system is ΣAT, an axial distance between the second lens element and the third lens element is T23, and the following condition is satisfied:

$2.0<\Sigma AT/T23<4.0$.

5. The imaging optical lens system of claim 1, wherein the focal length of the imaging optical lens system is f, the curvature radius of the object-side surface of the fifth lens element is R9, the curvature radius of the image-side surface of the fifth lens element is R10, and the following condition is satisfied:

$-10<(R9/f)+(R10/f)<-1.3$.

6. The imaging optical lens system of claim 1, wherein a focal length of the sixth lens element is f6, a focal length of the seventh lens element is f7, a focal length of the eighth lens element is f8, and the following condition is satisfied:

$|f8/f6|+|f8/f7|<1.5$.

7. The imaging optical lens system of claim 1, wherein half of a maximum field of view of the imaging optical lens system is HFOV, a maximum effective radius of the object-side surface of the first lens element is Y11, a maximum effective radius of the image-side surface of the eighth lens element is Y82, and the following conditions are satisfied:

$60.0 \text{ [deg.]}<\text{HFOV}$; and $0.50<Y11/Y82<0.95$.

8. The imaging optical lens system of claim 1, wherein the eighth lens element has negative refractive power, a vertical distance between a critical point on the image-side surface of the eighth lens element and an optical axis is Yc82, a maximum effective radius of the image-side surface of the eighth lens element is Y82, and the image-side surface of the eighth lens element has at least one critical point in an off-axis region thereof satisfying the following condition:

$0.25<Yc82/Y82<0.80$.

9. An image capturing unit, comprising:
the imaging optical lens system of claim 1; and
an image sensor disposed on an image surface of the imaging optical lens system.

10. An electronic device, comprising:
the image capturing unit of claim 9.

* * * * *